United States Patent [19]
Kato et al.

[11] Patent Number: 5,259,041
[45] Date of Patent: Nov. 2, 1993

[54] IMAGE PROCESSING METHOD AND APPARATUS

[75] Inventors: Hiroshi Kato; Masahiko Matsunawa; Hiroyuki Yamamoto; Takashi Hasebe; Yoshinori Abe; Tetsuo Kimoto, all of Hachioji, Japan

[73] Assignee: Konica Corporation, Tokyo, Japan

[21] Appl. No.: 977,747

[22] Filed: Nov. 16, 1992

Related U.S. Application Data

[63] Continuation of Ser. No. 728,018, Jul. 8, 1991, abandoned, which is a continuation of Ser. No. 295,598, Dec. 28, 1988, abandoned.

[30] Foreign Application Priority Data

| Date | | | |
|---|---|---|---|
| May 12, 1987 | [JP] | Japan | 62-113570 |
| May 13, 1987 | [JP] | Japan | 62-116457 |
| May 19, 1987 | [JP] | Japan | 62-121737 |
| May 19, 1987 | [JP] | Japan | 62-121738 |
| May 19, 1987 | [JP] | Japan | 62-121740 |
| May 22, 1987 | [JP] | Japan | 62-125586 |
| May 22, 1987 | [JP] | Japan | 62-125587 |
| May 26, 1987 | [JP] | Japan | 62-128697 |

[51] Int. Cl.$^5$ .............................. G06K 9/00
[52] U.S. Cl. ...................... 382/48; 382/26; 382/17
[58] Field of Search .............. 382/48, 26, 58, 60, 382/19, 17; 358/453, 462

[56] References Cited

U.S. PATENT DOCUMENTS

| | | | |
|---|---|---|---|
| 4,183,013 | 1/1980 | Agrawala et al. | 382/26 |
| 4,476,497 | 10/1984 | Oshikoshi et al. | 358/298 |
| 4,538,182 | 8/1985 | Saito et al. | 358/453 |
| 4,558,374 | 12/1985 | Kurata et al. | 358/453 |
| 4,718,090 | 1/1988 | Cooper, Jr. | 382/26 |
| 4,791,676 | 12/1988 | Flickner et al. | 382/26 |

FOREIGN PATENT DOCUMENTS

| | | |
|---|---|---|
| 0167359 | 1/1986 | European Pat. Off. |
| 55583 | 3/1984 | Japan |
| 231268 | 11/1985 | Japan |
| 175877 | 8/1986 | Japan |
| 2153181A | 8/1985 | United Kingdom |

OTHER PUBLICATIONS

Patent Abstract of Japan, vol. 009, No. 069 (E-305) Mar. 29, 1985, Picture Processing Device.

Primary Examiner—Michael T. Razavi
Assistant Examiner—Yon J. Couso
Attorney, Agent, or Firm—Frishauf, Holtz, Goodman & Woodward

[57] ABSTRACT

An image processing method and apparatus for detecting at least one region designated by at least one line of at least one closed loop on an original, wherein the original is scanned and an image formation is generated; the image information is processed for generating image data and region data which represent said at least one designated region; and the region data is processed for each scanning line. The processing of the region data comprises detecting a right end margin and a left end margin of the designated region for generating a marginal signal for the present scanning line corresponding to an interval from the right end margin to the left end margin; detecting a portion of the marginal signal continuous to a region signal for a preceding scanning line to generate a provisional region signal; detecting a portion of the provisional region signal which indicates an outside of the designated region for the present scanning line for generating an outside region signal for the present scanning line; detecting a region-designating signal for the present scanning line which is not continuous to the region signal for the preceding scanning line to generate a new region-designating signal for the present scanning line; and adding the new region-designating signal to, and for subtracting the outside region signal from, the provisional region signal to generate a region signal for the present scanning line.

9 Claims, 57 Drawing Sheets

→ MAIN SCANNING DIRECTION

→ MAIN SCANNING DIRECTION

→ MAIN SCANNING DIRECTION

F I G. 15E
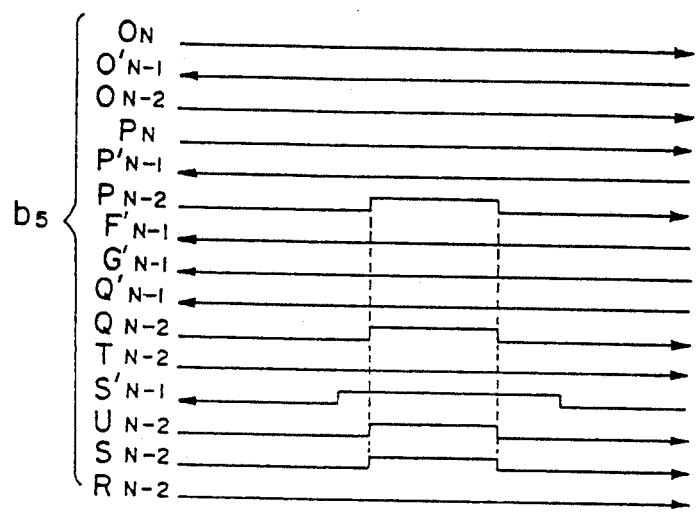
F I G. 15F
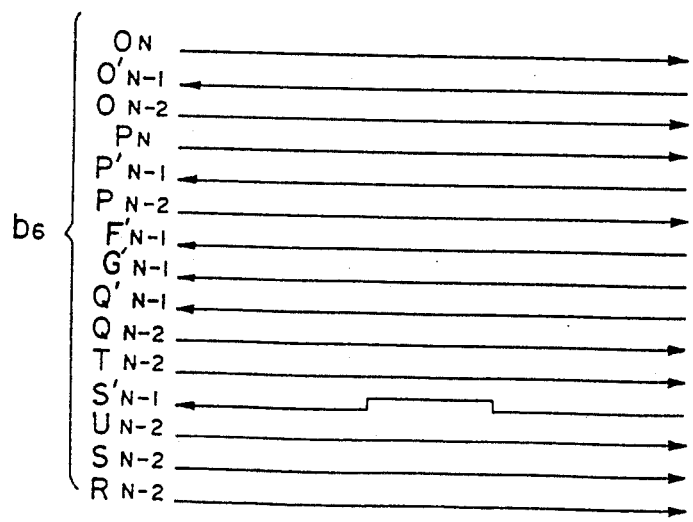

F I G. 18
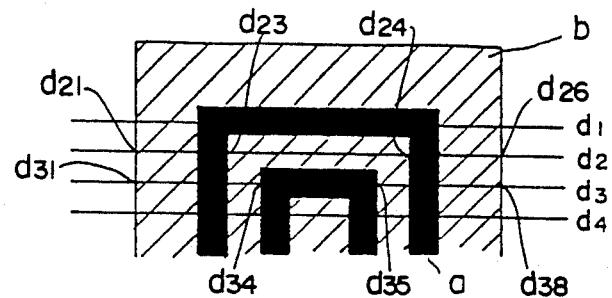
F I G. 19A
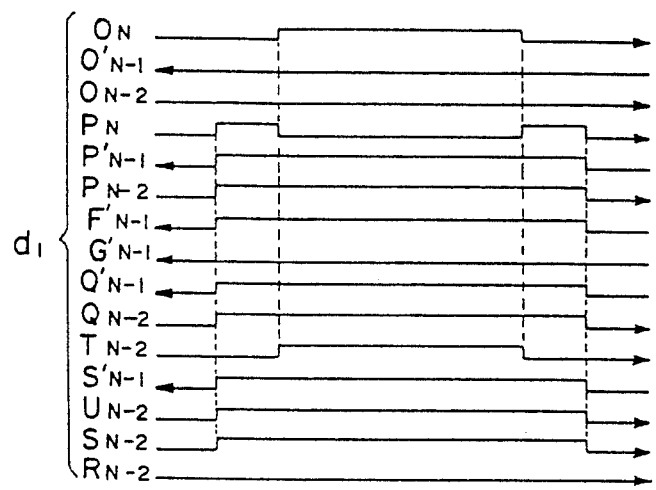
F I G. 19B
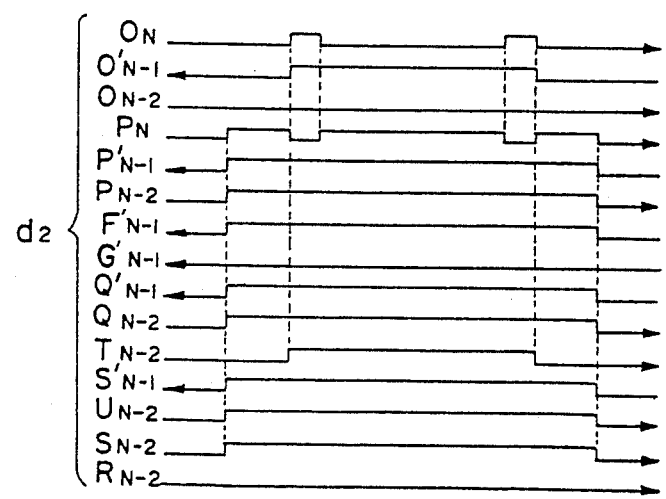

F I G. 19C
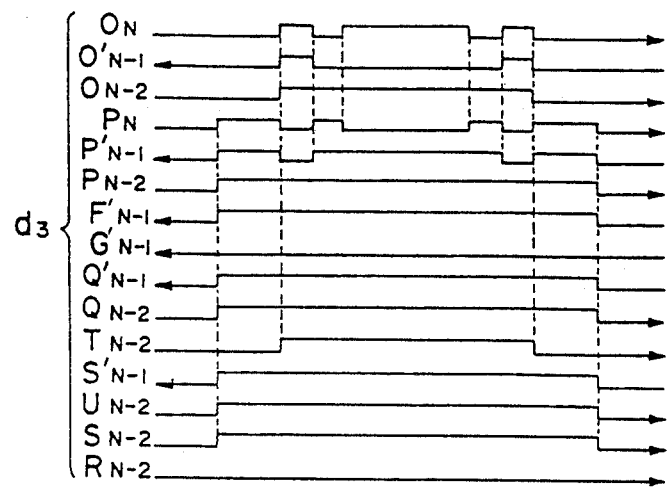
F I G. 19D
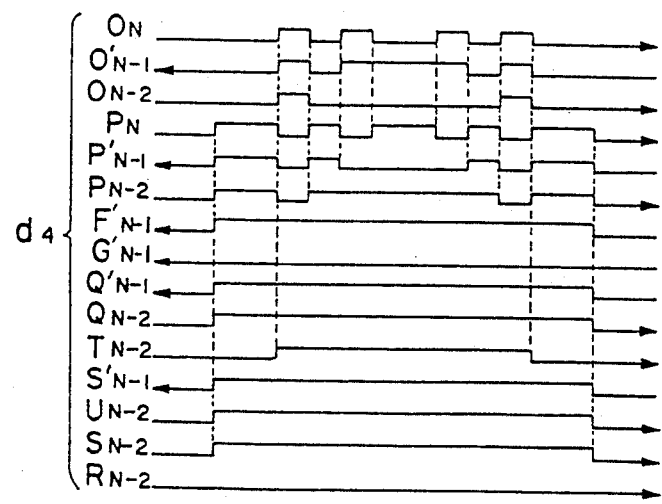

F I G. 22
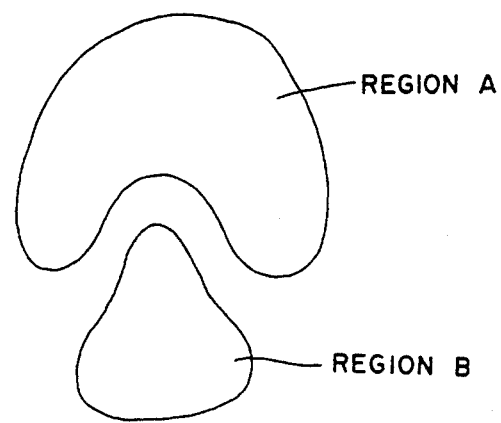
F I G. 23
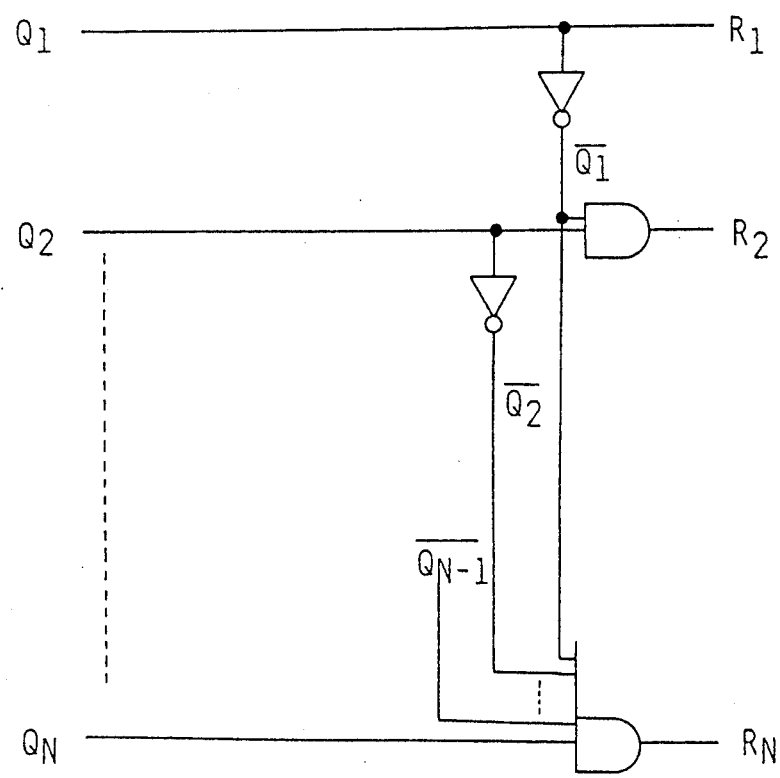

F I G. 27

| POSITIVE GRADIENT | | | NEGATIVE GRADIENT | | |
|---|---|---|---|---|---|
| 0F0 | 0.00000 | 0 | F00 | 15.00000 | F |
| 0F1 | 0.93750 | 1 | F01 | 14.06250 | E |
| 0F2 | 1.87500 | 2 | F02 | 13.12500 | D |
| 0F3 | 2.81250 | 3 | F03 | 12.18750 | C |
| 0F4 | 3.75000 | 4 | F04 | 11.25000 | B |
| 0F5 | 4.68750 | 5 | F05 | 10.31250 | A |
| 0F6 | 5.62500 | 6 | F06 | 9.37500 | 9 |
| 0F7 | 6.56250 | 7 | F07 | 8.43750 | 8 |
| 0F8 | 7.50000 | 8 | F08 | 7.50000 | 8 |
| 0F9 | 8.43750 | 8 | F09 | 6.56250 | 7 |
| 0FA | 9.37500 | 9 | F0A | 5.62500 | 6 |
| 0FB | 10.31250 | A | F0B | 4.68750 | 5 |
| 0FC | 11.25000 | B | F0C | 3.75000 | 4 |
| 0FD | 12.18750 | C | F0D | 2.81250 | 3 |
| 0FE | 13.12500 | D | F0E | 1.87500 | 2 |
| 0FF | 14.06250 | E | F0F | 0.93750 | 1 |

IMAGE DATA D0  IMAGE DATA D1  INTERPOLATION DATA S

INTERPOLATION SELECTION DATA SD

FIG. 28

CONTENT OF INTERPOLATION MEMORY 155

INTERPOLATION SELECTION DATA SD → STEP NUMBER

| ADRS | +0 | +1 | +2 | +3 | +4 | +5 | +6 | +7 | +8 | +9 | +A | +B | +C | +D | +E | +F |
|------|----|----|----|----|----|----|----|----|----|----|----|----|----|----|----|----|
| 400  | 4  | 4  | 4  | 3  | 3  | 3  | 3  | 2  | 2  | 2  | 2  | 1  | 1  | 1  | 1  | 0  |
| 410  | 4  | 4  | 4  | 3  | 3  | 3  | 3  | 3  | 3  | 2  | 2  | 2  | 2  | 2  | 1  | 1  |
| 420  | 4  | 4  | 4  | 4  | 4  | 3  | 3  | 3  | 3  | 3  | 3  | 3  | 3  | 2  | 2  | 1  |
| 430  | 4  | 4  | 4  | 4  | 4  | 4  | 4  | 4  | 4  | 3  | 3  | 3  | 3  | 3  | 3  | 2  |
| 440  | 4  | 4  | 4  | 4  | 4  | 4  | 4  | 4  | 5  | 4  | 4  | 4  | 4  | 4  | 4  | 3  |
| 450  | 4  | 4  | 4  | 4  | 4  | 5  | 5  | 5  | 5  | 5  | 5  | 5  | 5  | 5  | 5  | 4  |
| 460  | 4  | 4  | 5  | 5  | 5  | 5  | 5  | 5  | 6  | 5  | 5  | 6  | 6  | 6  | 6  | 5  |
| 470  | 4  | 5  | 5  | 5  | 5  | 5  | 6  | 6  | 6  | 6  | 6  | 6  | 6  | 6  | 7  | 6  |
| 480  | 4  | 5  | 5  | 5  | 5  | 6  | 6  | 7  | 7  | 7  | 7  | 7  | 7  | 7  | 8  | 7  |
| 490  | 4  | 5  | 5  | 5  | 5  | 6  | 7  | 7  | 7  | 7  | 7  | 7  | 8  | 8  | 8  | 8  |
| 4A0  | 4  | 5  | 5  | 5  | 7  | 7  | 7  | 8  | 8  | 8  | 8  | 8  | 8  | 9  | 9  | 9  |
| 4B0  | 4  | 5  | 5  | 5  | 7  | 7  | 8  | 8  | 8  | 9  | 9  | 9  | 9  | 9  | A  | A  |
| 4C0  | 4  | 5  | 5  | 7  | 7  | 8  | 8  | 9  | 9  | A  | A  | A  | A  | A  | B  | B  |
| 4D0  | 4  | 5  | 5  | 7  | 7  | 8  | 9  | A  | A  | A  | A  | B  | B  | B  | B  | C  |
| 4E0  | 4  | 5  | 5  | 7  | 7  | 8  | 9  | A  | B  | A  | B  | C  | C  | C  | C  | C  |
| 4F0  | 4  | 5  | 5  | 7  | 7  | 8  | 9  | A  | B  | C  | C  | C  | C  | D  | D  | D  |

IMAGE DATA D0  
IMAGE DATA D1  
INTERPOLATION DATA S

FIG. 29

| ORIGINAL IMAGE DATA | SAMPLING POSITION | | INTERPOLATION SELECTION DATA SD | ORIGINAL IMAGE DATA | SAMPLING POSITION | | INTERPOLATION SELECTION DATA SD |
|---|---|---|---|---|---|---|---|
| 0 | 0.00000 | | 0A | 33 | 33.12500 | 33.75000 | 2C |
| 1 | 1.25000 | 0.62500 | 4E | 34 | 34.37500 | | 6 |
| 2 | 2.50000 | 1.87500 | 8 | 35 | 35.00000 | 35.62500 | 0A |
| 3 | 3.12500 | 3.75000 | 2C | 36 | 36.25000 | 36.87500 | 4E |
| 4 | 4.37500 | | 6 | 37 | 37.50000 | | 8 |
| 5 | 5.00000 | 5.62500 | 0A | 38 | 38.12500 | 38.75000 | 2C |
| 6 | 6.25000 | 6.87500 | 4E | 39 | 39.37500 | | 6 |
| 7 | 7.50000 | | 8 | 40 | 40.00000 | 40.62500 | 0A |
| 8 | 8.12500 | 8.75000 | 2C | 41 | 41.25000 | 41.87500 | 4E |
| 9 | 9.37500 | | 6 | 42 | 42.50000 | | 8 |
| 10 | 10.00000 | 10.62500 | 0A | 43 | 43.12500 | 43.75000 | 2C |
| 11 | 11.25000 | 11.87500 | 4E | 44 | 44.37500 | | 6 |
| 12 | 12.50000 | | 8 | 45 | 45.00000 | 45.62500 | 0A |
| 13 | 13.12500 | 13.75000 | 2C | 46 | 46.25000 | 46.87500 | 4E |
| 14 | 14.37500 | | 6 | 47 | 47.50000 | | 8 |
| 15 | 15.00000 | 15.62500 | 0A | 48 | 48.12500 | 48.75000 | 2C |
| 16 | 16.25000 | 16.87500 | 4E | 49 | 49.37500 | | 6 |
| 17 | 17.50000 | | 8 | 50 | 50.00000 | 50.62500 | 0A |
| 18 | 18.12500 | 18.75000 | 2C | 51 | 51.25000 | 51.87500 | 4E |
| 19 | 19.37500 | | 6 | 52 | 52.50000 | | 8 |
| 20 | 20.00000 | 20.62500 | 0A | 53 | 53.12500 | 53.75000 | 2C |
| 21 | 21.25000 | 21.87500 | 4E | 54 | 54.37500 | | 6 |
| 22 | 22.50000 | | 8 | 55 | 55.00000 | 55.62500 | 0A |
| 23 | 23.12500 | 23.75000 | 2C | 56 | 56.25000 | 56.87500 | 4E |
| 24 | 24.37500 | | 6 | 57 | 57.50000 | | 8 |
| 25 | 25.00000 | 25.62500 | 0A | 58 | 58.12500 | 58.75000 | 2C |
| 26 | 26.25000 | 26.87500 | 4E | 59 | 59.37500 | | 6 |
| 27 | 27.50000 | | 8 | 60 | 60.00000 | 60.62500 | 0A |
| 28 | 28.12500 | 28.75000 | 2C | 61 | 61.25000 | 61.87500 | 4E |
| 29 | 29.37500 | | 6 | 62 | 62.50000 | | 8 |
| 30 | 30.00000 | 30.62500 | 0A | 63 | 63.12500 | 63.75000 | 2C |
| 31 | 31.25000 | 31.87500 | 4E | 64 | 64.37500 | | 6 |
| 32 | 32.50000 | | 8 | 65 | 65.00000 | 65.62500 | 0A |

| ORIGINAL IMAGE DATA | SAMPLING POSITION | | INTERPOLATION SELECTION DATA SD |
|---|---|---|---|
| 66 | 66.25000 | 66.87500 | 4E |
| 67 | 67.50000 | | 8 |
| 68 | 68.12500 | 68.75000 | 2C |
| 69 | 69.37500 | | 6 |
| 70 | 70.00000 | 70.62500 | 0A |
| 71 | 71.25000 | 71.87500 | 4E |
| 72 | 72.50000 | | 8 |
| 73 | 73.12500 | 73.75000 | 2C |
| 74 | 74.37500 | | 6 |
| 75 | 75.00000 | 75.62500 | 0A |
| 76 | 76.25000 | 76.87500 | 4E |
| 77 | 77.50000 | | 8 |
| 78 | 78.12500 | 78.75000 | 2C |
| 79 | 79.37500 | | 6 |
| 80 | 80.00000 | 80.62500 | 0A |
| 81 | 81.25000 | 81.875000 | 4E |
| 82 | 82.50000 | | 8 |
| 83 | 83.12500 | 83.75000 | 2C |
| 84 | 84.37500 | | 6 |
| 85 | 85.00000 | 85.62500 | 0A |
| 86 | 86.25000 | 86.87500 | 4E |
| 87 | 87.50000 | | 8 |
| 88 | 88.12500 | 88.75000 | 2C |
| 89 | 89.37500 | | 6 |
| 90 | 90.00000 | 90.62500 | 0A |
| 91 | 91.25000 | 91.87500 | 4E |
| 92 | 92.50000 | | 8 |
| 93 | 93.12500 | 93.75000 | 2C |
| 94 | 94.37500 | | 6 |
| 95 | 95.00000 | 95.62500 | 0A |
| 96 | 96.25000 | 96.87500 | 4E |
| 97 | 97.50000 | | 8 |
| 98 | 98.12500 | 98.75000 | 2C |
| 99 | 99.37500 | | 6 |

MAGNIFICATION OF 160%

FIG. 30

| ADRS | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|
| 00 | 07 | A6 | 47 | E6 | 87 | 27 | C6 | 67 | 07 | A6 | 47 | E6 | 87 | 27 | C6 | 67 |
| 10 | 07 | A6 | 47 | E6 | 87 | 27 | C6 | 67 | 07 | A6 | 47 | E6 | 87 | 27 | C6 | 67 |
| 20 | 07 | A6 | 47 | E6 | 87 | 27 | C6 | 67 | 07 | A6 | 47 | E6 | 87 | 27 | C6 | 67 |
| 30 | 07 | A6 | 47 | E6 | 87 | 27 | C6 | 67 | 07 | A6 | 47 | E6 | 87 | 27 | C6 | 67 |
| 40 | 07 | A6 | 47 | E6 | 87 | 27 | C6 | 67 | 07 | A6 | 47 | E6 | 87 | 27 | C6 | 67 |
| 50 | 07 | A6 | 47 | E6 | 87 | 27 | C6 | 67 | 07 | A6 | 47 | E6 | 87 | 27 | C6 | 67 |
| 60 | 07 | A6 | 47 | E6 | 87 | 27 | C6 | 67 | 07 | A6 | 47 | E6 | 87 | 27 | C6 | 67 |
| 70 | 07 | A6 | 47 | E6 | 87 | 27 | C6 | 67 | 07 | A6 | 47 | E6 | 87 | 27 | C6 | 67 |
| 80 | 07 | A6 | 47 | E6 | 87 | 27 | C6 | 67 | 07 | A6 | 47 | E6 | 87 | 27 | C6 | 67 |
| 90 | 07 | A6 | 47 | E6 | 87 | 27 | C6 | 67 | 07 | A6 | 47 | E6 | 87 | 27 | C6 | 63 |
| A0 | 08 | 08 | 08 | 08 | 08 | 08 | 08 | 08 | 08 | 08 | 08 | 08 | 08 | 08 | 08 | 08 |
| B0 | 08 | 08 | 08 | 08 | 08 | 08 | 08 | 08 | 08 | 08 | 08 | 08 | 08 | 08 | 08 | 08 |
| C0 | 08 | 08 | 08 | 08 | 08 | 08 | 08 | 08 | 08 | 08 | 08 | 08 | 08 | 08 | 08 | 08 |
| D0 | 08 | 08 | 08 | 08 | 08 | 08 | 08 | 08 | 08 | 08 | 08 | 08 | 08 | 08 | 08 | 08 |
| E0 | 08 | 08 | 08 | 08 | 08 | 08 | 08 | 08 | 08 | 08 | 08 | 08 | 08 | 08 | 08 | 08 |
| F0 | 08 | 08 | 08 | 08 | 08 | 08 | 08 | 08 | 08 | 08 | 08 | 08 | 08 | 08 | 08 | 08 |

INTERPOLATION SELECTION DATA SD

PROCESSING TIMING SIGNAL TD

REPETITION SIGNAL

CONTENT OF DATA ROM (IN THE CASE OF MAGNIFICATION OF 160%)

FIG. 31

| ORIGINAL IMAGE DATA | | | SAMPLING POSITION | | | INTERPOLATION SELECTION DATA SD | | |
|---|---|---|---|---|---|---|---|---|
| 0 | 0.00000 | 0 | 33 | 33.75000 | C | 66 | 66.25000 | 4 |
| 1 | 1.25000 | 4 | 34 | 35.00000 | * | 67 | 67.50000 | 8 |
| 2 | 2.50000 | 8 | 35 | 35.00000 | 0 | 68 | 68.75000 | C |
| 3 | 3.75000 | C | 36 | 36.25000 | 4 | 69 | 70.00000 | * |
| 4 | 5.00000 | * | 37 | 37.50000 | 8 | 70 | 70.00000 | 0 |
| 5 | 5.00000 | 0 | 38 | 38.75000 | C | 71 | 71.25000 | 4 |
| 6 | 6.25000 | 4 | 39 | 40.00000 | * | 72 | 72.50000 | 8 |
| 7 | 7.50000 | 8 | 40 | 40.00000 | 0 | 73 | 73.76000 | C |
| 8 | 8.75000 | C | 41 | 41.25000 | 4 | 74 | 75.00000 | * |
| 9 | 10.00000 | * | 42 | 42.50000 | 8 | 75 | 75.00000 | 0 |
| 10 | 10.00000 | 0 | 43 | 43.75000 | C | 76 | 76.25000 | 4 |
| 11 | 11.25000 | 4 | 44 | 45.00000 | * | 77 | 77.50000 | 8 |
| 12 | 12.50000 | 8 | 45 | 45.00000 | 0 | 78 | 78.75000 | C |
| 13 | 13.75000 | C | 46 | 46.25000 | 4 | 79 | 80.00000 | * |
| 14 | 15.00000 | * | 47 | 47.50000 | 8 | 80 | 80.00000 | 0 |
| 15 | 15.00000 | 0 | 48 | 48.75000 | C | 81 | 81.25000 | 4 |
| 16 | 16.25000 | 4 | 49 | 50.00000 | * | 82 | 82.50000 | 8 |
| 17 | 17.50000 | 8 | 50 | 50.00000 | 0 | 83 | 83.75000 | C |
| 18 | 18.75000 | C | 51 | 51.25000 | 4 | 84 | 85.00000 | * |
| 19 | 20.00000 | * | 52 | 52.50000 | 8 | 85 | 85.00000 | 0 |
| 20 | 20.00000 | 0 | 53 | 53.75000 | C | 86 | 86.25000 | 4 |
| 21 | 21.25000 | 4 | 54 | 55.00000 | * | 87 | 87.50000 | 8 |
| 22 | 22.50000 | 8 | 55 | 55.00000 | 0 | 88 | 88.75000 | C |
| 23 | 23.75000 | C | 56 | 56.25000 | 4 | 89 | 90.00000 | * |
| 24 | 25.00000 | * | 57 | 57.50000 | 8 | 90 | 90.00000 | 0 |
| 25 | 25.00000 | 0 | 58 | 58.75000 | C | 91 | 91.25000 | 4 |
| 26 | 26.25000 | 4 | 59 | 60.00000 | * | 92 | 92.50000 | 8 |
| 27 | 27.50000 | 8 | 60 | 60.00000 | 0 | 93 | 93.75000 | C |
| 28 | 28.75000 | C | 61 | 61.25000 | 4 | 94 | 95.00000 | * |
| 29 | 30.00000 | * | 62 | 62.50000 | 8 | 95 | 95.00000 | 0 |
| 30 | 30.00000 | 0 | 63 | 63.75000 | C | 96 | 96.25000 | 4 |
| 31 | 31.25000 | 4 | 64 | 65.00000 | * | 97 | 97.50000 | 8 |
| 32 | 32.50000 | 8 | 65 | 65.00000 | 0 | 98 | 98.75000 | C |
| | | | | | | 99 | 100.00000 | * |

REDUCTION OF 80%

FIG. 32

INTERPOLATION SELECTION DATA SD

PROCESSING TIMING SIGNAL TD

| ADRS | +0 | +1 | +2 | +3 | +4 | +5 | +6 | +7 | +8 | +9 | +A | +B | +C | +D | +E | +F |
|------|----|----|----|----|----|----|----|----|----|----|----|----|----|----|----|----|
| 00 | 07 | 47 | 87 | C7 | 05 | 07 | 47 | 87 | C7 | 05 | 07 | 47 | 87 | C7 | 05 | 07 |
| 10 | 47 | 87 | C7 | 05 | 07 | 47 | 87 | C7 | 05 | 07 | 47 | 87 | C7 | 05 | 07 | 47 |
| 20 | 87 | C7 | 05 | 07 | 47 | 87 | C7 | 05 | 07 | 47 | 87 | C7 | 05 | 07 | 47 | 87 |
| 30 | C7 | 05 | 07 | 47 | 87 | C7 | 05 | 07 | 47 | 87 | C7 | 05 | 07 | 47 | 87 | C7 |
| 40 | 05 | 07 | 47 | 87 | C7 | 05 | 07 | 47 | 87 | C7 | 05 | 07 | 47 | 87 | C7 | 05 |
| 50 | 07 | 47 | 87 | C7 | 05 | 07 | 47 | 87 | C7 | 05 | 07 | 47 | 87 | C7 | 05 | 07 |
| 60 | 47 | 87 | C7 | 01 | 00 | 00 | 00 | 00 | 00 | 00 | 00 | 00 | 00 | 00 | 00 | 00 |
| 70 | 00 | 00 | 00 | 00 | 00 | 00 | 00 | 00 | 00 | 00 | 00 | 00 | 00 | 00 | 00 | 00 |
| 80 | 00 | 00 | 00 | 00 | 00 | 00 | 00 | 00 | 00 | 00 | 00 | 00 | 00 | 00 | 00 | 00 |
| 90 | 00 | 00 | 00 | 00 | 00 | 00 | 00 | 00 | 00 | 00 | 00 | 00 | 00 | 00 | 00 | 00 |
| A0 | 00 | 00 | 00 | 00 | 00 | 00 | 00 | 00 | 00 | 00 | 00 | 00 | 00 | 00 | 00 | 00 |
| B0 | 00 | 00 | 00 | 00 | 00 | 00 | 00 | 00 | 00 | 00 | 00 | 00 | 00 | 00 | 00 | 00 |
| C0 | 00 | 00 | 00 | 00 | 00 | 00 | 00 | 00 | 00 | 00 | 00 | 00 | 00 | 00 | 00 | 00 |
| D0 | 00 | 00 | 00 | 00 | 00 | 00 | 00 | 00 | 00 | 00 | 00 | 00 | 00 | 00 | 00 | 00 |
| E0 | 00 | 00 | 00 | 00 | 00 | 00 | 00 | 00 | 00 | 00 | 00 | 00 | 00 | 00 | 00 | 00 |
| F0 | 00 | 00 | 00 | 00 | 00 | 00 | 00 | 00 | 00 | 00 | 00 | 00 | 00 | 00 | 00 | 00 |

INEFFECTIVE DATA

REPETITION SIGNAL

CONTENT OF DATA ROM ( IN THE CASE OF REDUCTION OF 80% )

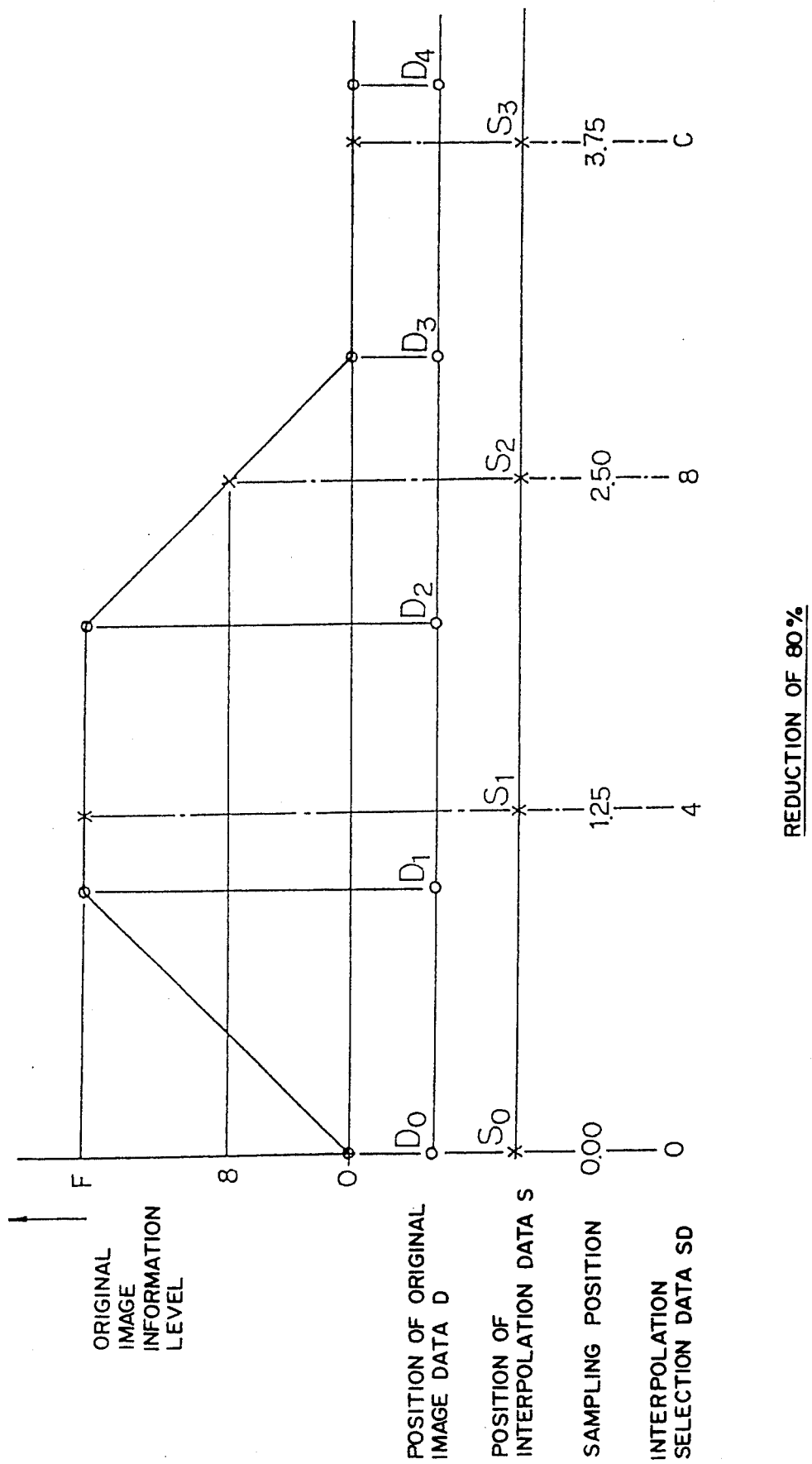
F I G. 35
REDUCTION OF 80%

F I G. 38
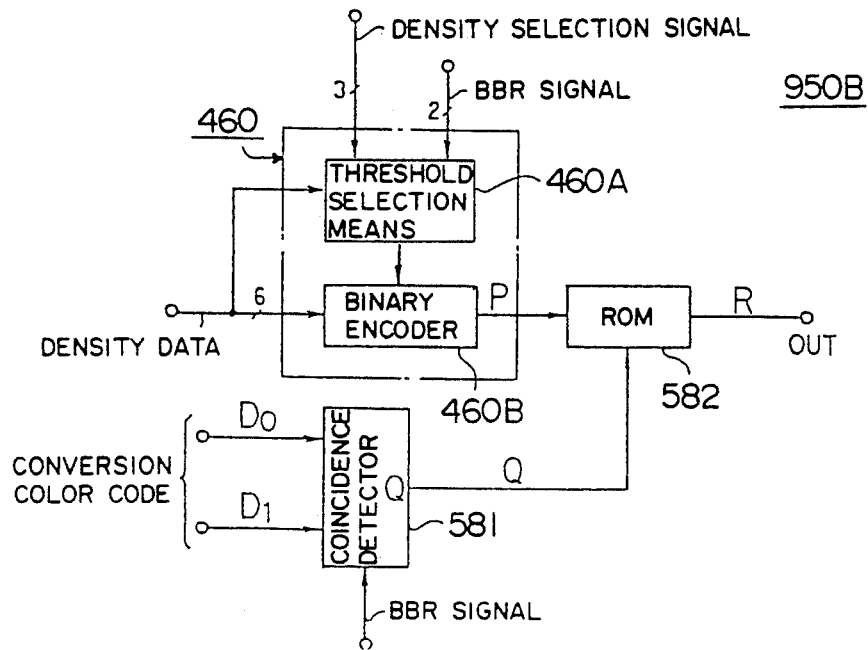
F I G. 39
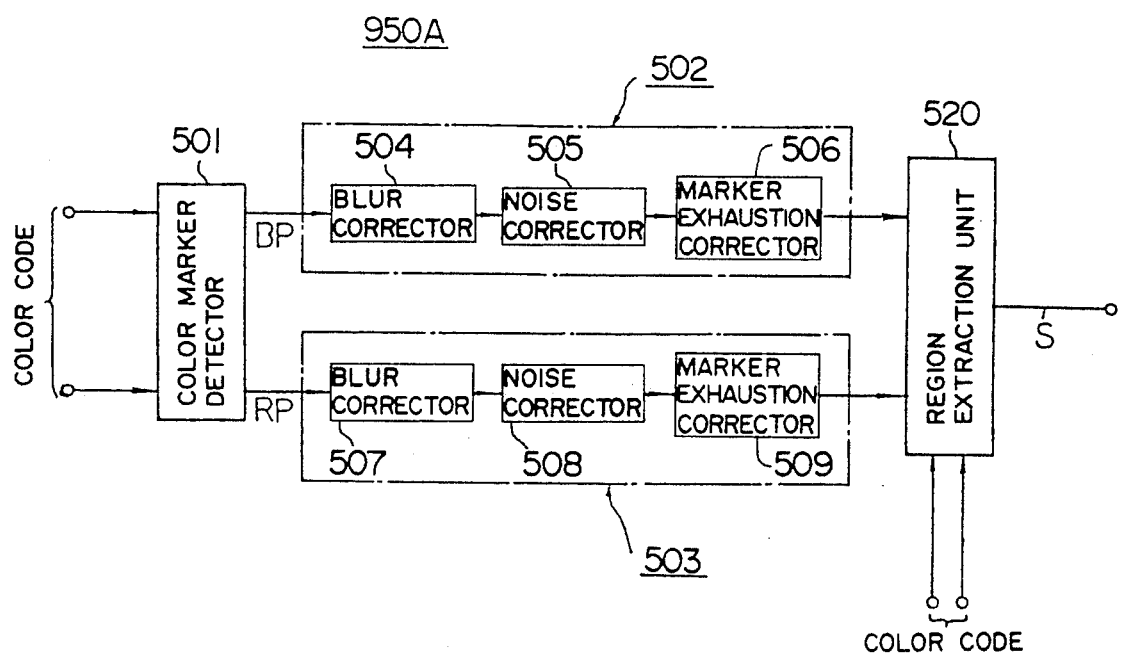

FIG. 41A
FIG. 41B
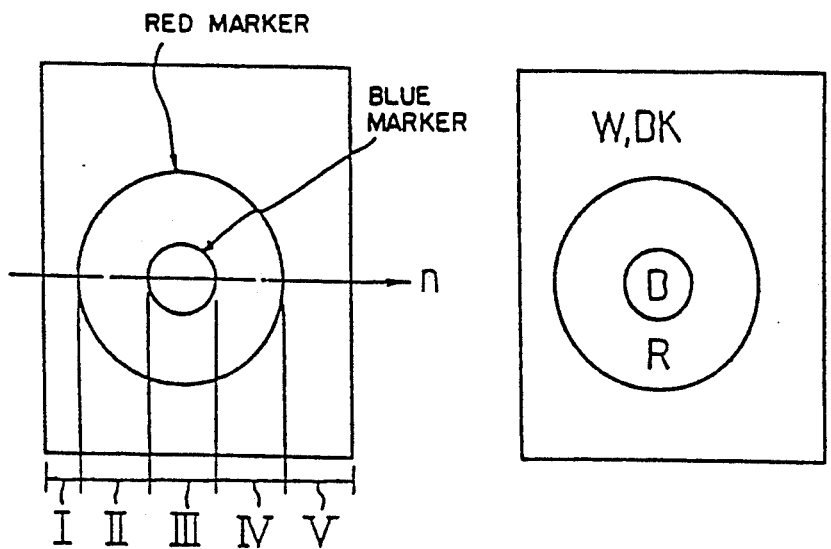
FIG. 42
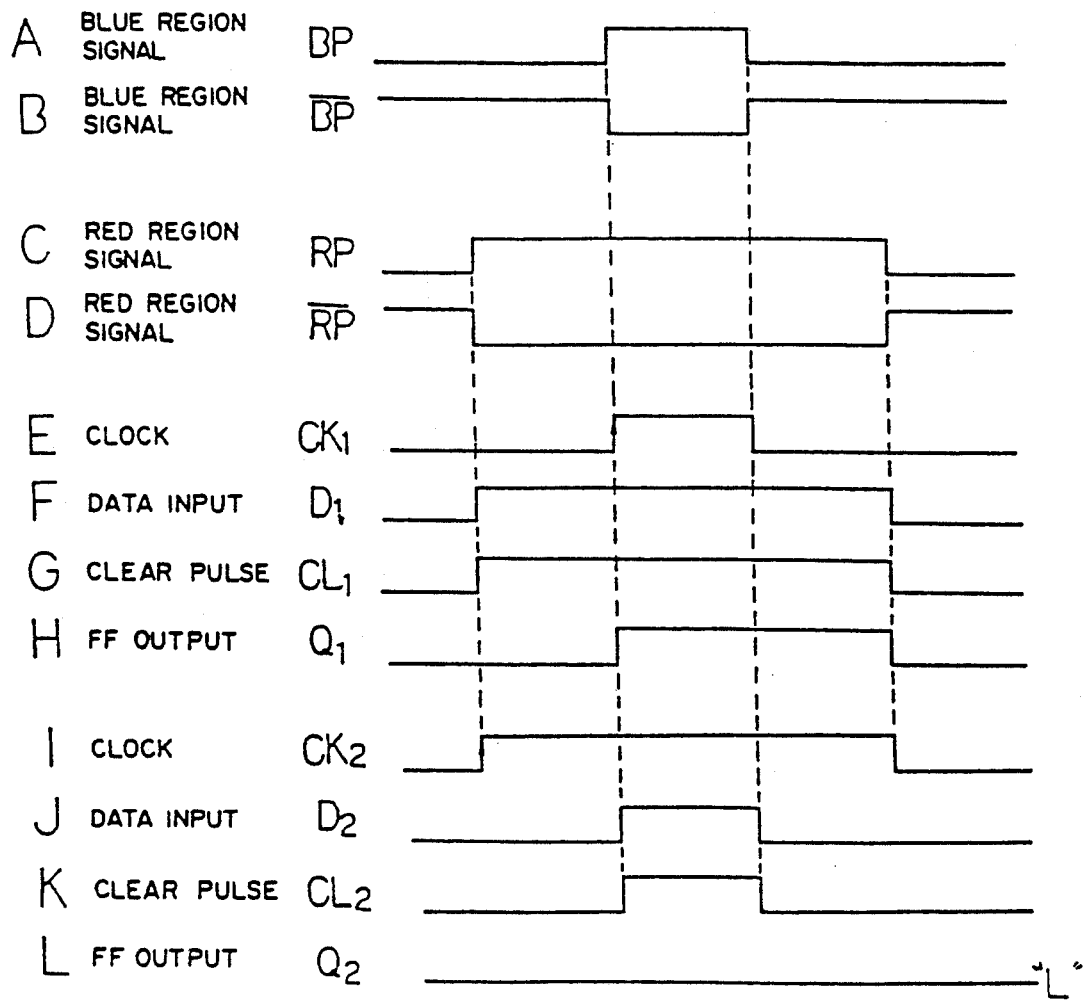

F I G. 43
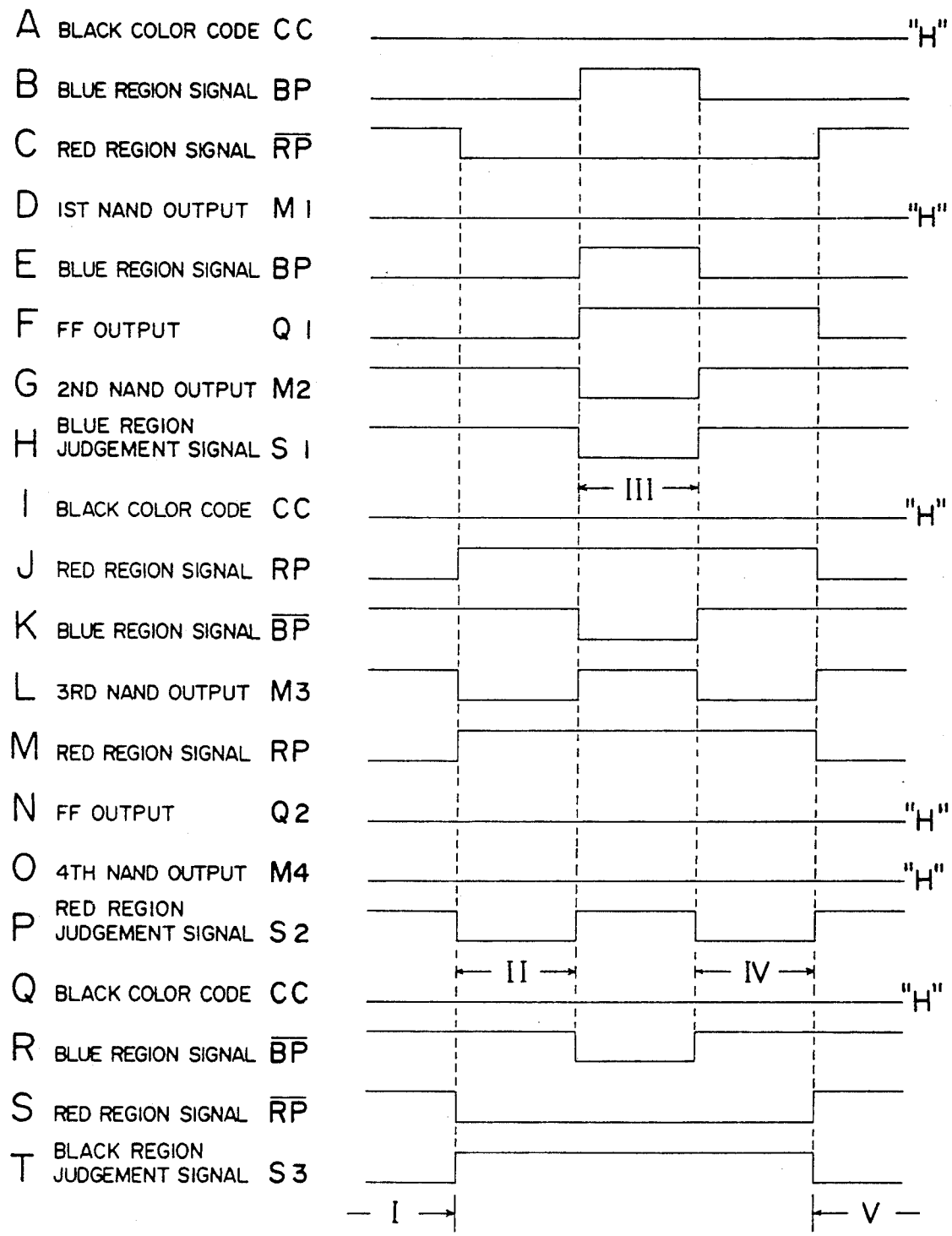

FIG. 44

| COLOR CODE | CORRESPONDING COLOR |
|---|---|
| 0 0 | BLUE |
| 0 1 | BLUE |
| 1 0 | RED |
| 1 1 | WHITE |

FIG. 45

| INPUT ADDRESS | | | | | CONVERSION COLOR CODE | |
|---|---|---|---|---|---|---|
| A0 | A1 | A2 | A3 | A4 | D0 | D1 |
| 0 | 1 | 1 | 0 | 0 | 1 | 0 |
| 0 | 1 | 1 | 0 | 1 | 1 | 1 |
| 0 | 1 | 1 | 1 | 0 | 1 | 1 |
| 0 | 1 | 1 | 1 | 1 | 1 | 1 |
| 1 | 0 | 1 | 0 | 0 | 0 | 1 |
| 1 | 0 | 1 | 0 | 1 | 1 | 1 |
| 1 | 0 | 1 | 1 | 0 | 1 | 1 |
| 1 | 0 | 1 | 1 | 1 | 1 | 1 |
| 1 | 1 | 0 | 0 | 0 | 0 | 0 |
| 1 | 1 | 0 | 0 | 1 | 1 | 1 |
| 1 | 1 | 0 | 1 | 0 | 1 | 1 |
| 1 | 1 | 0 | 1 | 1 | 1 | 1 |

FIG. 46

| BBR SIGNAL | CONVERSION COLOR CODE | OUTPUT SIGNAL Q |
|---|---|---|
| 0  0 | 0  0 | 1 |
|      | 0  1 | 0 |
|      | 1  0 | 0 |
|      | 1  1 | 0 |
| 0  1 | 0  0 | 0 |
|      | 0  1 | 1 |
|      | 1  0 | 0 |
|      | 1  1 | 0 |
| 1  0 | 0  0 | 0 |
|      | 0  1 | 0 |
|      | 1  0 | 1 |
|      | 1  1 | 0 |

FIG. 47

| P | Q | R |
|---|---|---|
| 0 | 0 | 0 |
| 0 | 1 | 0 |
| 1 | 0 | 0 |
| 1 | 1 | 1 |

F I G. 48
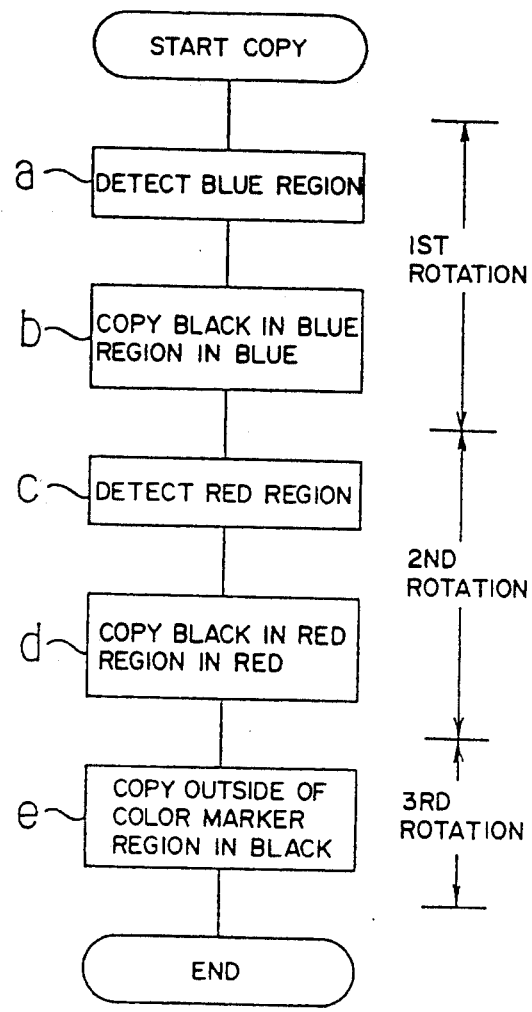
F I G. 49
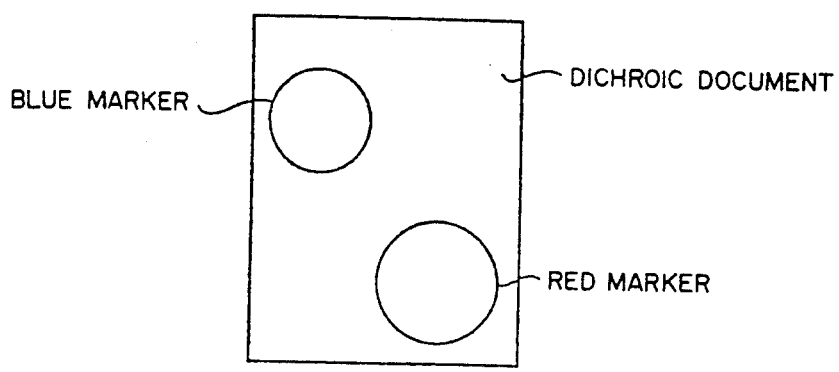

F I G. 54
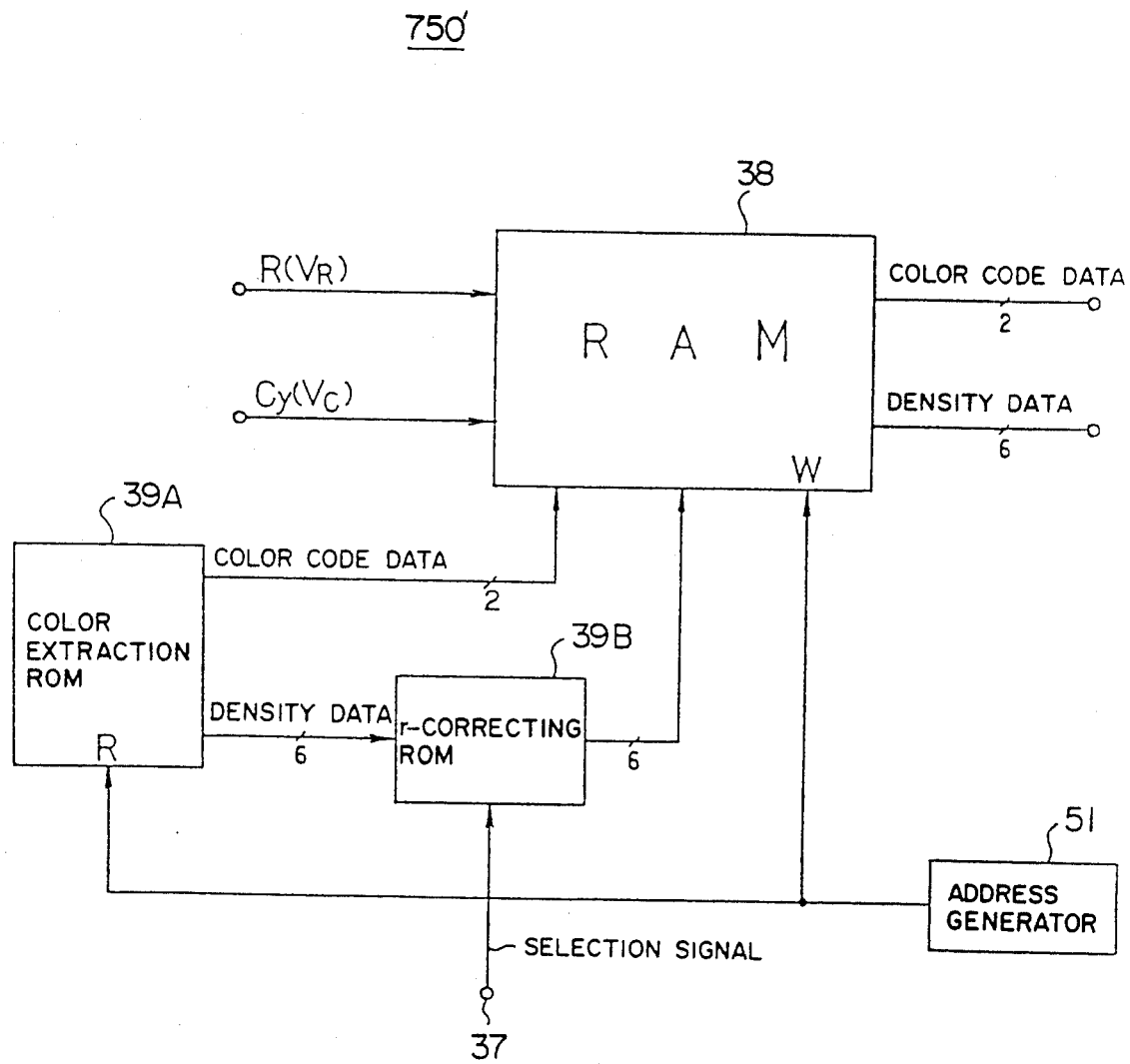

F I G. 59
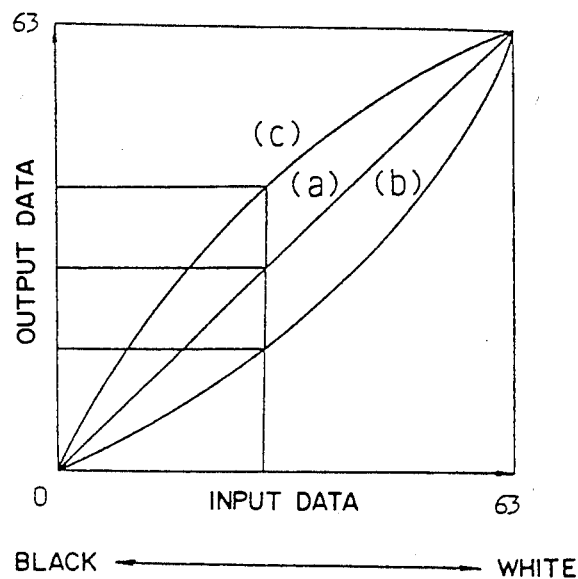
F I G. 60
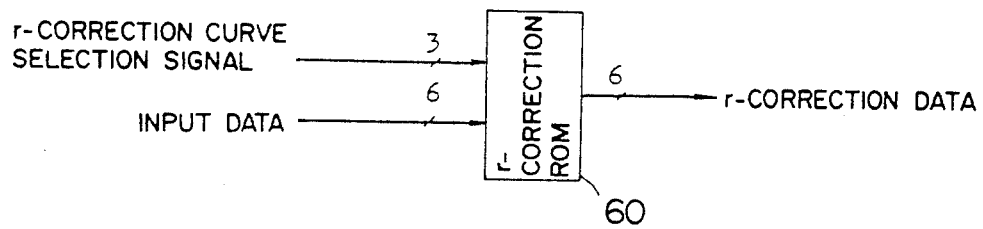
F I G. 61
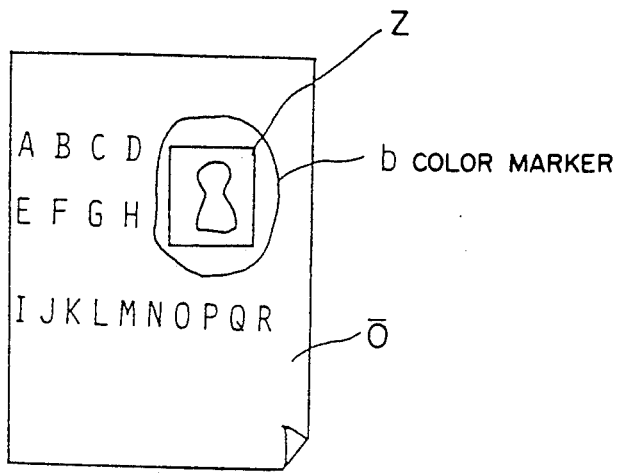

| 3   | 4 7 | 1 9 | 7   |
|-----|-----|-----|-----|
| 3 1 | 6 3 | 5 9 | 3 5 |
| 4 3 | 5 5 | 5 1 | 2 3 |
| 1 5 | 2 7 | 3 9 | 1 1 |

| 3 6 | 3 6 | 3 6 | 3 6 |
|-----|-----|-----|-----|
| 3 6 | 3 6 | 3 6 | 3 6 |
| 3 6 | 3 6 | 3 6 | 3 6 |
| 3 6 | 3 6 | 3 6 | 3 6 |

FIG. 64A
| 2 5 | 2 5 | 2 5 | 2 5 |
|---|---|---|---|
| 2 5 | 2 5 | 2 5 | 2 5 |
| 2 5 | 2 5 | 2 5 | 2 5 |
| 2 5 | 2 5 | 2 5 | 2 5 |
FIG. 64B
| 4 0 | 4 0 | 4 0 | 4 0 |
|---|---|---|---|
| 4 0 | 4 0 | 4 0 | 4 0 |
| 4 0 | 4 0 | 4 0 | 4 0 |
| 4 0 | 4 0 | 4 0 | 4 0 |
FIG. 64C
| 6 3 | 3 1 | 5 5 | 2 3 |
|---|---|---|---|
| 1 5 | 4 7 | 7 | 3 9 |
| 5 1 | 1 9 | 5 9 | 2 7 |
| 3 | 3 5 | 1 1 | 4 3 |
FIG. 64D
| 3 9 | 3 5 | 3 1 | 2 7 |
|---|---|---|---|
| 4 3 | 6 3 | 5 9 | 2 3 |
| 4 7 | 5 1 | 5 5 | 1 9 |
| 3 | 7 | 1 1 | 1 5 |
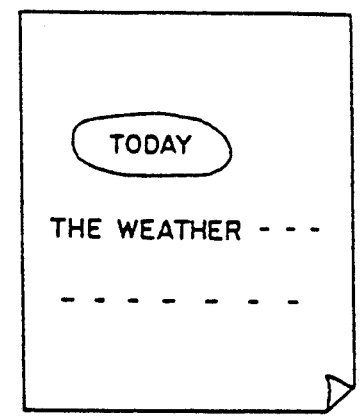
FIG. 65
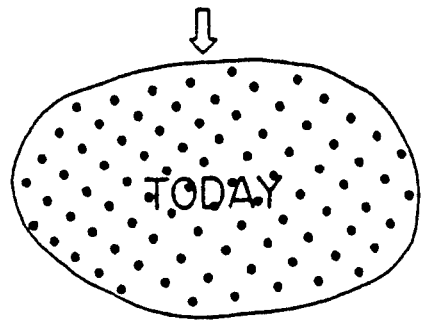

FIG.68

| 0 | 0 | 0 | 0 |
|---|---|---|---|
| 0 | 6 3 | 6 3 | 0 |
| 0 | 6 3 | 6 3 | 0 |
| 0 | 0 | 0 | 0 |

FIG.69

| 0 | 0 | 0 | 0 | 0 | 0 | 0 | 0 |
|---|---|---|---|---|---|---|---|
| 0 | 6 3 | 6 3 | 0 | 0 | 0 | 0 | 0 |
| 0 | 6 3 | 6 3 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 6 3 | 6 3 | 0 |
| 0 | 0 | 0 | 0 | 0 | 6 3 | 6 3 | 0 |
| 0 | 0 | 0 | 0 | 0 | 0 | 0 | 0 |

F I G. 70
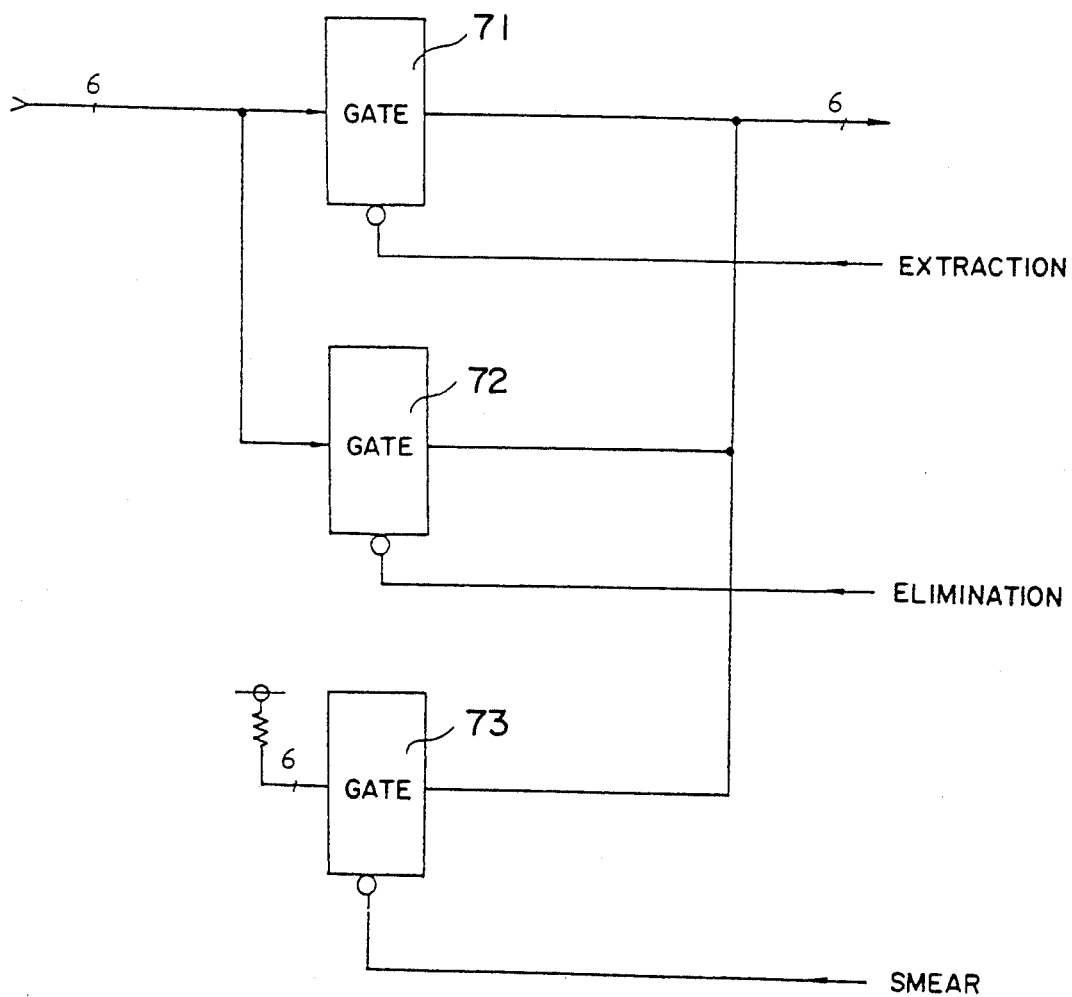

IMAGE PROCESSING METHOD AND APPARATUS

This application is a continuation of application Ser. No. 07/728,018, filed Jul. 8, 1991, (abandoned) which is a continuation of Ser. No. 07/295,598, filed Dec. 28, 1988 (abandoned).

TECHNICAL FIELD

The present invention relates to an image processing method and apparatus for detecting a designated region (or area) of a document on a real time basis (at a unit of scanning lines).

BACKGROUND ART

For example, a reproducing apparatus accomplishes a masking process for removing the designated region of a document to be reproduced from the reproduced image and a trimming process for reproducing the designated region only.

In case a certain region is to be designated on the document for those processes, a small region such as a region of a few letters or a letter itself is usually smeared out for the designations, and a large region difficult to smear out is conveniently designated by a closed loop. These methods are frequently used.

The latter image processing method for detecting a designated region with the closed loop, as described above, is proposed in Japanese Patent Laid-Open Nos. 57 - 68371, 57 - 194668 and 57 - 194670, for example. On the other hand, the former image processing method for detecting the designated region by smearing is proposed in Japanese Patent Laid-Open No. 58 - 60876, for example.

According to the method disclosed in Japanese Patent Laid-Open No. 57 - 89371, however, the "outside region section", as defined in the present invention, is used to detect the "continuous" "designated section". Therefore, in case the regions are designated, as shown in FIG. 22, the region A can be correctly detected, but the region B cannot.

According to the above-specified technique, moreover, what can be detected either the region designated by the closed loop or the region designated to be smeared out can be detected. In other words, in a document having the regions designated by the closed loop and to be smeared out, these individual designated regions cannot be accurately detected.

This is because the designated region detecting method detects the region by processing the information of a designated point only. Let it be considered to detect the region of an image smeared out, as shown in FIG. 1A, and the region designated by a closed loop, as shown in FIG. 1B. For example, it is necessary for a scanning line Lb to detect a region section extending from a point Pa to a point Pb in the case of FIG. 1A but region sections extending from a point Pc to a point Pd and from a point Pe to a point Pf in the case of FIG. 1B. Despite this necessity, however, the information of the designated points is absolutely identical from a scanning line La to a scanning line Lc so that they cannot be discriminated. In the present invention, therefore, the "region portion (or region section)" is used for detecting the "continuous" "designated section". In addition to the information of the designated points, the information of the image points is preferably used, too, for detecting the "designated section".

Thus, even in the designation of the region shown in FIG. 22, the designated region can be correctly detected even if the designations by the closed loop and by the image smeared out coexist.

SUMMARY OF THE INVENTION

An object of the present invention is to provide an image processing method and an apparatus therefor, which can detect a region designated by a closed loop of an arbitrary shape.

Another object of the present invention is to provide an image processing method and an apparatus therefor, which can detect the designated region no matter whether the region might be designated by the closed loop or smeared out.

A further object of the present invention is to provide an image processing method and an apparatus therefor, which can accomplish different image processings inside and outside of the designated region detected.

A further object of the present invention is to provide an image processing method and an apparatus therefor, which can accomplish different image processings in accordance with the color having designated the region.

A further object of the present invention is to provide an image processing method and an apparatus therefor, which can set a priority in case a plurality of regions are designated.

BRIEF DESCRIPTION OF THE DRAWINGS

FIGS. 15A to 15F are waveform charts for detecting the region of the portion shown in FIG. 14;

FIG. 18 is an enlarged diagram showing the portion (IV) of the document of FIG. 11;

FIGS. 19A to 19D are waveform charts for detecting the region of the portion shown in FIG. 18;

FIG. 22 is a diagram showing an example of the region designation;

FIG. 23 is a circuit diagram for setting the priority of the region detections;

FIGS. 27 and 28 are diagrams showing the relations among image data, interpolation selection data and interpolation data;

FIGS. 29 and 30 are diagrams showing concrete numerical values exemplifying the sampling positions and the interpolation selection data when an image is magnified;

FIGS. 31 and 32 are diagrams showing concrete numerical values exemplifying the sampling positions and the interpolation selection data when an image is reduced;

FIG. 35 is a diagram showing an image signal to be used for explaining the image reduction;

FIG. 38 is a block diagram showing a data selector;

FIG. 39 is a block diagram showing a region extractor;

FIGS. 41A and 41B are diagrams for explaining the region designation;

FIG. 42 and FIG. 43 are waveform charts to be used for explaining the region designation, respectively;

FIG. 44 is a diagram for explaining the color code data;

FIG. 45 is a diagram for explaining the converted color code data;

FIG. 46 is a diagram showing the relations between a BBR signal and an output signal;

FIG. 47 is a diagram showing one example of a data selection;

FIG. 48 is a flow chart showing a copy mode;

FIG. 49 is a diagram for explaining the operations of the copy mode;

FIGS. 53 and 54 are block diagrams showing the essential portions of the concrete examples of color extraction means, respectively;

FIG. 59 is a characteristic diagram showing the gamma characteristics;

FIG. 60 is a circuit diagram showing a gamma corrector;

FIG. 61 is a diagram showing a document including a photographic portion;

FIGS. 64A to 64D are diagrams showing other threshold values for the binary coding;

FIG. 65 is a diagram for explaining the case of screening;

FIG. 68 is a diagram showing the internal data of a net generator;

FIG. 69 is a diagram showing other internal data when the networks are established;

FIG. 70 is a diagram showing a circuit for extracting-/erasing/smearing operations;

BEST MODE FOR CARRYING OUT THE INVENTION

Figure 1A:
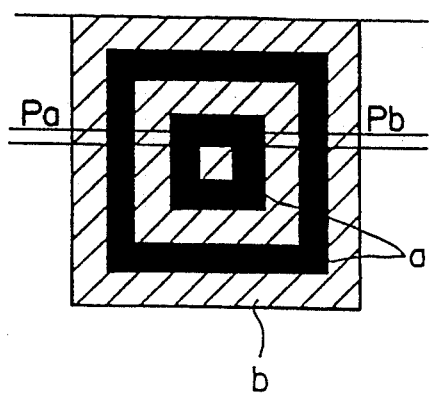
FIGS. 1A and 1B are diagrams for explaining the kinds of region designations.

The present invention will be described in the following in connection with one embodiment thereof. For region detections, in the present embodiment, a region designation color and a document color are detected and suitably processed so that a document having regions designated with a closed loop of arbitrary shape and by a smearing operation in an arbitrary shape can have its designated regions detected accurately. Here, it is assumed that a region designation color b be marked in a red color, for example, and that the drawing width in the case of a closed loop be equal to or larger than the pitch between the adjoining scanning lines for reading operations. This will be described in detail in the following.

(a) Region Detecting Method

First of all, there are prepared a memory (Q), a memory (R) and a memory (S) which have at least capacities corresponding to the pixel number of one scanning line for storing a region section data (signal) Q, a region divisible section data (signal) R and a region division inhibition section data (signal) S.

(1) Initialization

All the memories (Q), (R) and (S) are written with "0".

(2) Read of Signals

Figure 11:
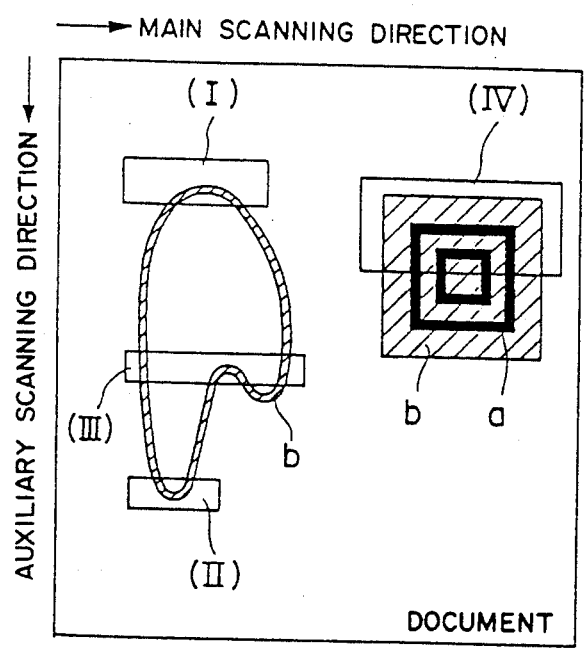
FIG. 11 is a diagram showing one example of the document.

While the document is being scanned in the main scanning direction by a line sensor such as a CCD, the line sensor and the document are moved relative to each other in the auxiliary scanning direction so that a document color signal 0 and a region designation color signal P of one line are read in (as shown in FIG. 11) from the document. At this time, it is assumed in the document color signal 0 that a document color a have a detected portion at "1" and other portions at "0". In the region designation color signal P, too, it is assumed that the region designation color b have its detected portion at "1" and other portions at "0".

(3) Extraction of Region Section by Present Line

① There is extracted a temporary region signal Q' which indicates a region section by a present line continuing from the section (which is stored as the signal Q in the region section memory (Q)) detected as the region by the preceding line. This is accomplished by setting: at "1" such a region section from the rise of the "1" section of the first region color signal P in the main scanning direction to the last drop of the same signal, as belongs to the "1" section of the region color signal P having a common portion shared among the individual "1" sections (i.e., the region sections of the preceding line); and the other sections at "0".

② Since the region having newly appeared cannot be detected by the operation ①, a region signal Q", in which a new region section is added to the region obtained by the operation ① and continuing from the preceding line, is extracted by taking a logical sum of the temporary region signal Q' and the region designation color signal P.

$$Q'' = Q' \vee P.$$

Figure 2:
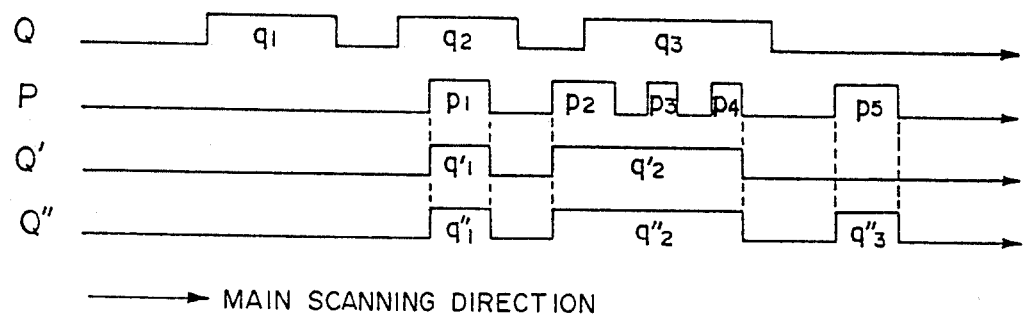
FIG. 2 shows waveforms explaining extraction of a region section.

FIG. 2 shows waveforms for one example of the operations ① and ②. Since the "1" section of the region designation color signal P having a common portion does not exist in the "1" section $q_1$ of the region signal Q of the preceding line, the region section $q_1$ ends on the preceding line so that the "1" section of the temporary region signal Q' corresponding to the section $q_1$ is not formed by the present line.

Next, because of the "1" section $p_1$ of the region designation color signal P having a common portion shared with the section $q_2$ of the preceding line, a "1" section q' is formed by setting at "1" the portion of the temporary region signal Q' corresponding to the section extending from the rise to the break of the section $p_1$.

Next, there exists three "1" sections $p_2$, $p_3$ and $p_4$ of the region designation color signal P having a common portion shared with the section $q_3$ of the preceding line, a "1" section $q_2$ of the region signal Q' is formed by setting at "1" the section extending from the rise of the first section $p_2$ in the main scanning direction to the break of the last section $p_4$ in the same direction.

By taking a logical sum of the temporary region signal Q' and the region designation color signal P, moreover, the "1" sections $q'_1$ and $q'_2$ of the signal Q' become the "1" sections $q''_1$ and $q''_2$ of the region signal Q" while including the "1" sections $p_1$ and $p_2$ to $p_4$ of the region signal Q", and the "1" section $q''_3$ of the region signal Q" is formed by the "1" section $p_5$ of the region designation color signal P.

(4) Production of Region Division signal

Figure 1B:
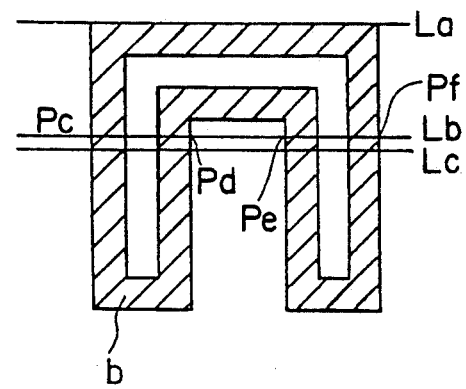

A region division signal R' by the present line is formed from the region divisible section signal R (stored in the memory (R)) obtained by the preceding line and the region designation color signal P of the present line. In this operation, as shown in FIG. 1(b), the closed loop for the region designation projects downward into the region to reach a line l after sequential scanning operations. In case the region is divided into two or more parts, nothing but the outer boundary of the region can be detected from the above-specified region signals Q, Q' and Q" so that the region cannot be divided to the right and left for the detections. Thus, the section projecting into the region is detected to prepare a signal indicating the section, i.e., the region division signal R'.

In case, more specifically, there are two or more "1" sections of the region designation color signal P having a common portion shared with each of the "1" section of the region divisible signal R obtained by the preceding line, the section of the region division signal R' on the present line corresponding to the section extending from the first break of the "1" section of that signal P in the main scanning line to the last rise of the "1" section in the same direction is set at "1", whereas the remaining section is set at "0".

Figure 3:
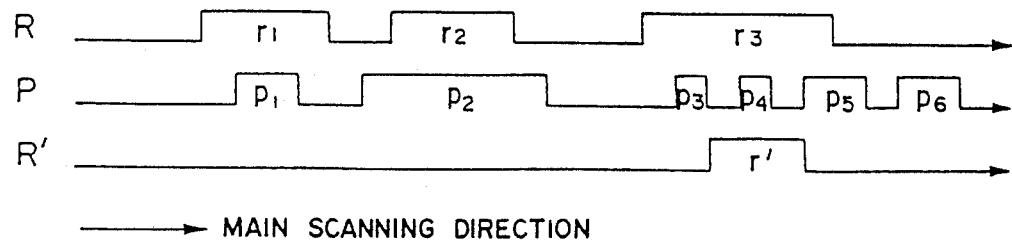
FIG. 3 is a waveform chart for explaining the production of a region division signal.

FIG. 3 is a waveform chart showing one example of these operations. Since the "1" sections of the signal P having common portions shared with the "1" sections $r_1$ and $r_2$ of the region divisible signal R are limited to $p_1$ and $p_2$, respectively, there is not formed the "1" section of the region division signal R' corresponding to those sections $r_1$ and $r_2$.

Since, on the other hand, there are two or more, i.e., three "1" sections $p_3$ to $p_5$ of the signal having a common portion shared with the section $r_3$ of the signal R, a "1" section r' of the region division signal R' is formed by setting at "1" the section extending from the first break of the section $P_3$ of those sections $p_3$ to $p_5$ in the main scanning direction to the rise of the last section $p_5$ in the same direction.

(5) Production of Region Section Signal of Present Line (except Region to be Divided)

By taking the logical product (as will be expressed by the following equation) of the region signal Q" obtained by the foregoing operation (3) and the inverted signal $\overline{R}$ of the region division signal R' obtained by the operation (4), the region is divided to extract the region section Q''' of the present line and is outputted as a newly detected region signal and stored in the memory (Q) prepared for the processing of the next line:

$$Q''' = Q'' \wedge \overline{R}'.$$

(6) Production of Internal Region Signal

There is produced a signal T indicating an internal region in which the section corresponding to the "1" section of the region designation color signal P having the same rise or break as that of the "1" section of the region section signal Q''' obtained by the operation (5) is set at "0". This signal T indicates the region which is enclosed by the inner boundary of the region designation color b. As a result of the foregoing operations (3) to (5), there in each "1" section of the signal Q''' the "1" section of the signal P having its rise and break shared with the "1" section of the signal Q'''.

Figure 4:
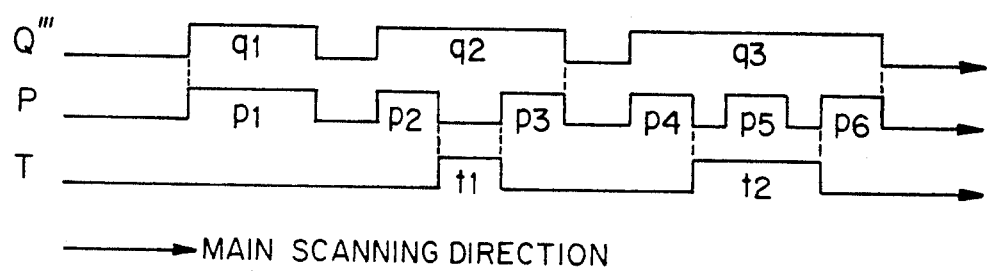
FIG. 4 shows waveforms for explaining reduction of the interval region signal.

FIG. 4 is a waveform diagram for explaining reduction of a interval region signal. illustrate one example of those operations. Since the "1" section $q_1$ of the signal Q''' has the same rise and break as those of the "1" section $p_1$ of the signal P, the portion "1" is not left, if the portion of the section $q_1$ corresponding to the section $p_1$ is at "0", so that the "1" section is not formed on the signal T corresponding to the section $q_1$.

As to the section $q_2$, the rise is the same as that of the section $p_2$, and the break is the same as that of the section $p_3$. Therefore, a "1" section $t_1$ is formed on the signal T by setting at "0" the portions of the sections $p_2$ and $p_3$ in the section $q_2$ and setting at "1" the remaining section on the internal region signal T corresponding to the "1" section.

As to the section $q_3$, the rise is the same as that of the section $p_4$, and the break is the same as that of a section $p_6$. Therefore, a "1" section $t_2$ is formed on the signal T by the operations similar to those of the aforementioned section $q_2$.

(7) Production of Region Division Inhibition Signal

By using the new region section obtained by ② of the operation (3) as the start of the region division inhibition section, the region division inhibition section of the present line is formed by a region designation color portion continuing to the region division inhibition section obtained by the foregoing line and a document color portion in the region. By inhibiting the region division in this section, the region is inhibited from being divided in case the region is smeared out and designated. Incidentally, in this case of the region designation by the smearing-out, the region designation color portion is basically adjacent to the document color portion in the region designated by the color portion.

This operation is executed by the following three operations:

① Signal $P' = P \lor (O \land Q''')$

By $(O \land Q''')$ the document color portion the document color portion in the region or the region designation color portion, i.e., the smeared-out portion is detected as the signal P'.

② The region division inhibition signal S' is produced by setting at "1" the section corresponding of the "1" section of the signal P' having a common portion shared with the "1" section of the region division inhibition signal S of the preceding line and by setting the remaining section at "0".

③ The new region section cannot be introduced as the new region inhibition section merely by the operation ②, and the "1" section at the side, in which the region division in the plural "1" sections of the signal P corresponding to the outer boundary of the "1" section of the region signal $Q'''$ is accomplished, cannot be introduced if the region division is accomplished at the foregoing operation (5). Therefore, by adding the division inhibition signal S' to the "1" section of the signal P outside of the inner region obtained by the operation (6), the region division inhibition signal S'' on the present line is produced and written in the memory (S).

$S'' = S' \lor (P \land \bar{T})$.

Figure 5:
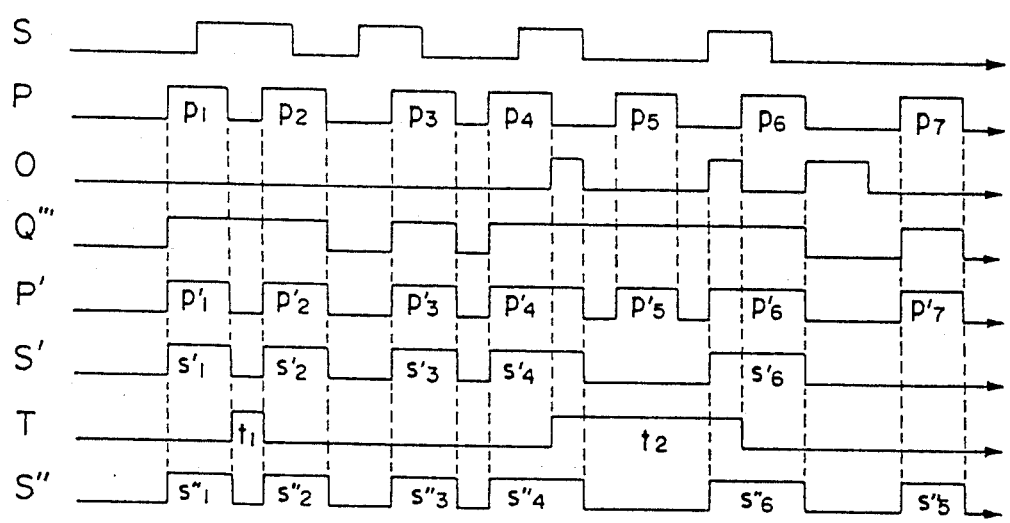
FIG. 5 is a waveform chart for explaining the production of a division inhibition signal.

FIG. 5 is a waveform chart illustrating one example of these operations. Since sections $p'_1$ to $p'_4$ and $p'_6$ of the "1" section of the signal P' obtained by $P' = P \lor (O \land Q''')$ have common portions shared with the "1" section of the signal S, the "1" sections $s'_1$ to $s'_4$ and $s'_6$ are formed by the operation ② on the signal S' corresponding to the sections $p'_1$ to $p'_4$ and $p'_6$. Since, however, sections $p'_5$ and $p'_7$ have no common portion shared with the "1" section on the signal S, there is not formed the corresponding "1" section on a signal S'.

By the operation ③, there are formed "1" sections $s''_1$ to $s''_4$ and $s''_6$ on the signal S'' corresponding to the "1" sections $s'_1$ to $s'_4$ and $s'_6$ on the signal S'. Since, moreover, the section $p_7$ is not within the "1" section of the signal T, a corresponding section $s''_5$ of the signal S'' is formed. Since, however, the section $p_5$ is within the section $t_2$ of the signal T, the corresponding section "1" is not formed on the signal S''.

(8) Extraction of Region Divisible Signal

By setting at "1" the section corresponding to the "1" section of the region designation color signal P inside of the inner region indicated by the internal region signal T obtained by the foregoing operation (6) and outside of the region division inhibition region obtained by the foregoing operation (7), a region divisible signal R'' of the present line is determined and written in the memory (R) for preparing the following line processing:

$R'' = P \land T \land \bar{S}$.

By performing the foregoing operations (2) to (8) sequentially for the individual lines, a certain region can be detected on real time by sequentially reading the region signals of the memory (Q) even if the region is designated by the smearing-out or with the closed loop of arbitrary shape.

The region detecting method of the present invention will be described in detail in the following.

The informations indicating the points on such a closed loop belonging to a kind different from that of an image as encloses and designates a certain region are inputted at a unit of a scanning line so that the designated region is detected in the following manner.

The closed loop of the kind different from that of the image is one having a color and/or density different from that of the image, or one magnetized by a magnetic recording, and may be any if the image information and the information of the closed loop can be discriminated.

Here are termed: the "section" as a set of adjoining points on a scanning line; the "rightward" and "leftward" as one and the other directions in the main scanning direction, respectively; the "righthand end point" of said section as the most righthand point of a certain section; the "lefthand end point" of said section as the most lefthand point of the certain section; the "designated point" as a point on said closed loop; the "designated section" as the section of the designated point; the "region point" as the point detected as one in the designated region; the "region section" as the section of the region point; the "region portion" on one scanning line as a set of all the region points (or region sections) on said scanning line; and the two sections "continuing" if sections on the two adjoining scanning lines include points in the common positions in the main scanning line. As to the region section on the foregoing scanning line, of the designated sections on the present scanning line continuing in said region section, the section (which will be called the "external region section") from the lefthand end point of the most lefthand designated section (which will be called the "lefthand designated section") to the righthand end point of the most righthand designated section (which will be called the "righthand designated section") is detected (by a first processing).

As to a certain external region section, the section (which will be called the "internal region section") excepting the lefthand designated section and the righthand designated section from said external region section is detected (by a second processing).

As to a certain internal region section, a designated section (which will be called the "undesignated section") in said internal region section is detected (by a third processing).

Of the undesignated section on the present scanning line continuing to a certain undesignated section on the preceding scanning line, the section (which will be called the "non-region section") excepting the most lefthand undesignated section (which will be called the "lefthand undesignated section") and the most righthand undesignated section (which will be called the "righthand undesignated section") is detected (by a fourth processing).

Of the designated section on the present scanning line, a region section continuing to none of the region sections on the preceding scanning line—a region section (which will be called the "new region section") having appeared on the present scanning line—is detected (by a fifth processing).

The region portion on the present scanning line is detected (by a sixth processing) by adding the section, which is formed by eliminating the non-region section detected by the fourth processing from each of the external region section detected by the first processing, and all the new region sections detected by the fifth processing. The region portion (i.e., the region section) on the present scanning line detected by the sixth processing is used as the region section on the preceding scanning line in the first one of the processings of the subsequent scanning line. The designated region can be detected by repeating the processings described above for each of the scanning lines.

Moreover, the following structure is enumerated as that for accomplishing the region extraction additionally using the image information.

The informations indicating both the points on a closed loop of such a document of a kind different from that of an image and the points of the image as has its certain region designated by enclosing with said closed loop or by smearing out the portion in said closed loop other than the image are inputted at a unit of the scanning line, and the designated region is detected in the following manner.

Here are termed: the "section" as a set of adjoining points on a scanning line: the "rightward" and "leftward" as one and the other directions in the main scanning direction, respectively; the "righthand end point" of said section as the most righthand point of a certain section; the "lefthand end point" of said section as the most lefthand point of a certain section; the "designated point" as a point on said closed loop and the smeared-out point; the "designated section" as the section of the designated point; the "image point" as a certain point of an image; the "image section" as the section of the image point; the "region point" as the point detected as one in the designated region; the "region section" as the section of the region point; the "region portion" on one scanning line as a set of all the region points (or region sections) on said scanning line; and the two sections "continuing" if sections on the two adjoining scanning lines include points in the common positions in the main scanning line. As to the region section on the foregoing scanning line, of the designated sections on the present scanning line continuing in said region section, the section (which will be called the "external region section") from the lefthand end point of the most lefthand designated section (which will be called the "lefthand designated section") to the righthand end point of the most righthand designated section (which will be called the "righthand designated section") is detected (by a first processing).

As to a certain external region section, the section (which will be called the "internal region section") excepting the lefthand designated section and the righthand designated section from said external region section is detected (by a second processing).

As to a certain internal region section, a designated section (which will be called the "undesignated section") in said internal region section and image section is detected (by a third processing).

Of the undesignated section on the present scanning line continuing to a certain undesignated section on the preceding scanning line, the section (which will be called the "non-region section") excepting the most lefthand undesignated section (which will be called the "lefthand undesignated section"), the most righthand undesignated section (which will be called the "righthand undesignated section") and the image section is detected (by a fourth processing).

Of the designated section on the present scanning line, a region section continuing to none of the region sections on the preceding scanning line—a region section (which will be called the "new region section") having appeared on the present scanning line—is detected (by a fifth processing).

The region portion on the present scanning line is detected (by a sixth processing) by adding the section, which is formed by eliminating the non-region section detected by the fourth processing from each of the external region section detected by the first processing, and the new region section detected by the fifth processing. The region portion (i.e., the region section) on the present scanning line detected by the sixth processing is used as the region section on the preceding scanning line in the first one of the processings of the subsequent scanning line. The designated region can be detected by repeating the processings described above for each of the scanning lines.

The processings described above will be described in more detail with reference to the accompanying drawings.

FIG. 11 shows an example of the document to have its region detected. In FIG. 11, it is assumed: that the image a be in black, for example; that the designated point b be in red, for example; and that the drawing width of a closed loop is equal to or more than the pitch of the adjoining points to be read out. On the other hand, FIGS. 12, 14, 16 and 18 are enlarged diagrams of the portions (I), (II), (III) and (IV) of the document shown in FIG. 11. In the present description, it is assumed: that the section from the point p to the point q on a certain scanning line be expressed by [p ; q]; that a point at the righthand side and adjacent to the point p be expressed by p+; and that a point at the lefthand side and adjacent to the point p be expressed by p−.

"Designated Sections"

Figure 12:
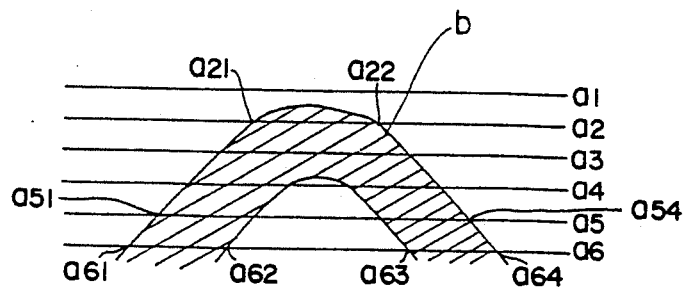
FIG. 12 is an enlarged diagram showing the portion (I) of the document of FIG. 11.
Figure 13A:
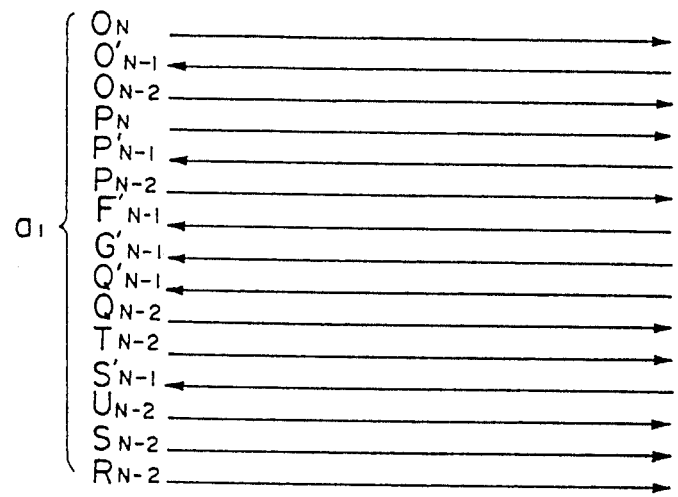
FIGS. 13A to 13F are waveform charts for detecting the region of the portion shown in FIG. 12.
Figure 13B:
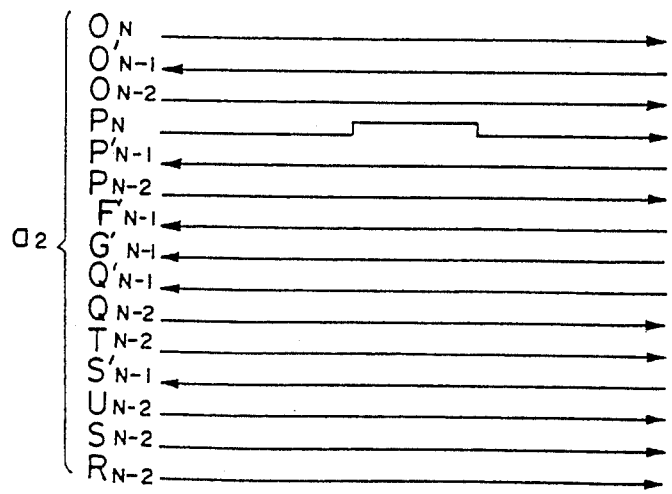
Figure 13C:
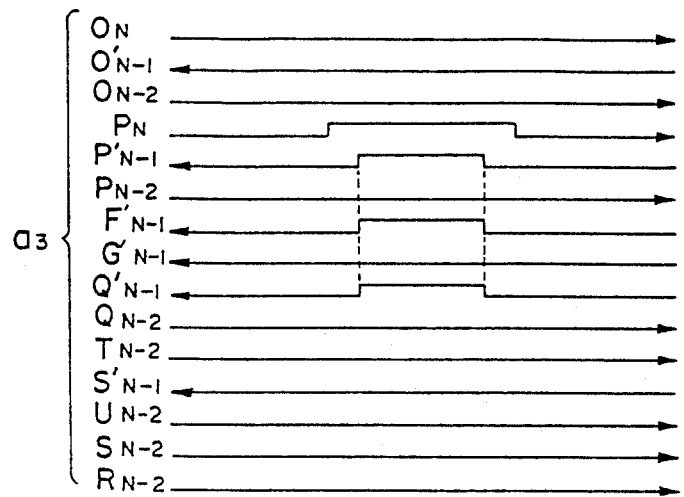
Figure 13D:
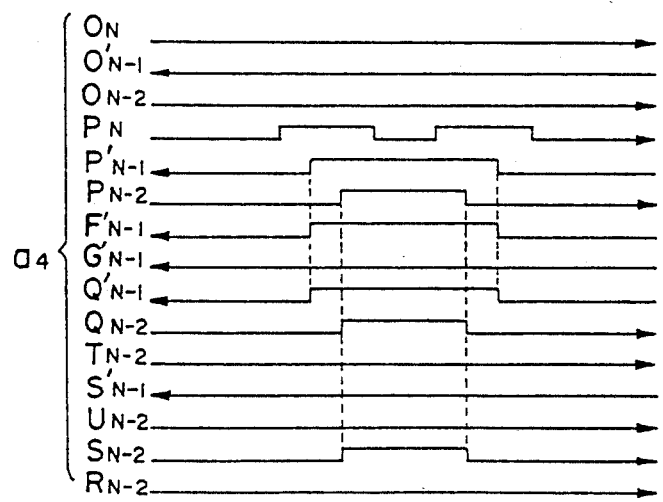
Figure 13E:
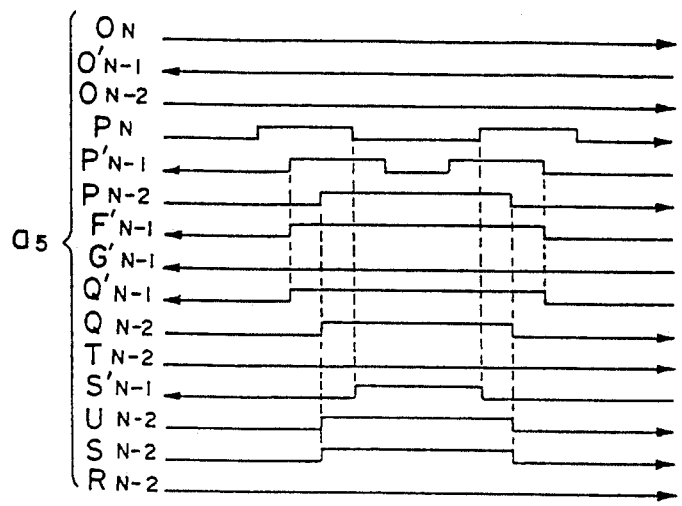
Figure 13F:
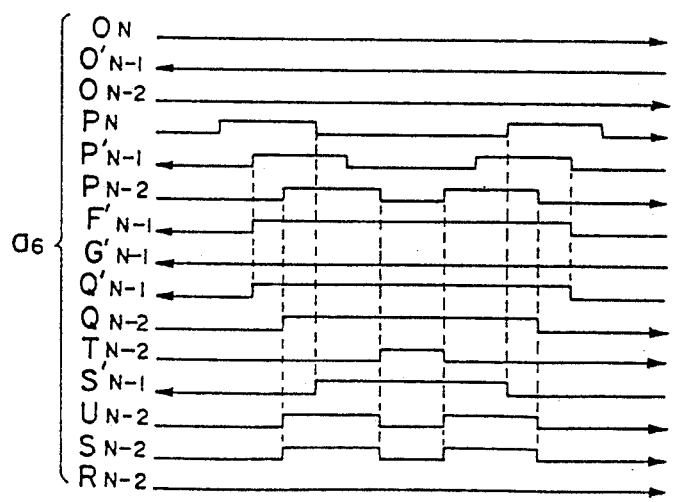
Figure 14:
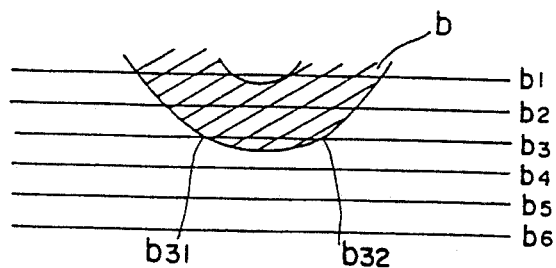
FIG. 14 is an enlarged diagram showing the portion (II) of the document of FIG. 11.
Figure 15A:
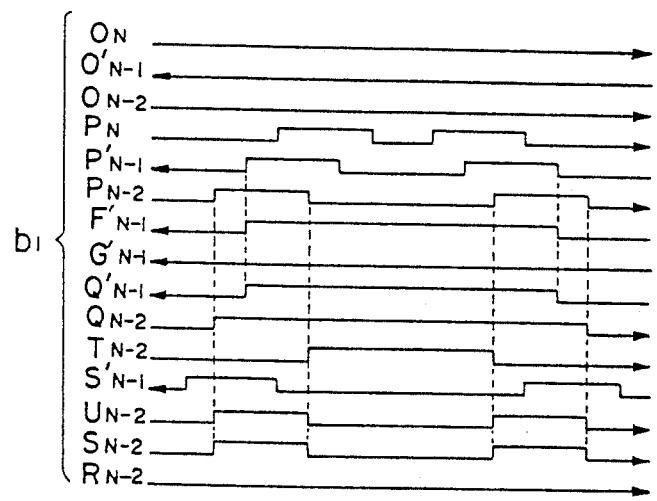
Figure 15B:
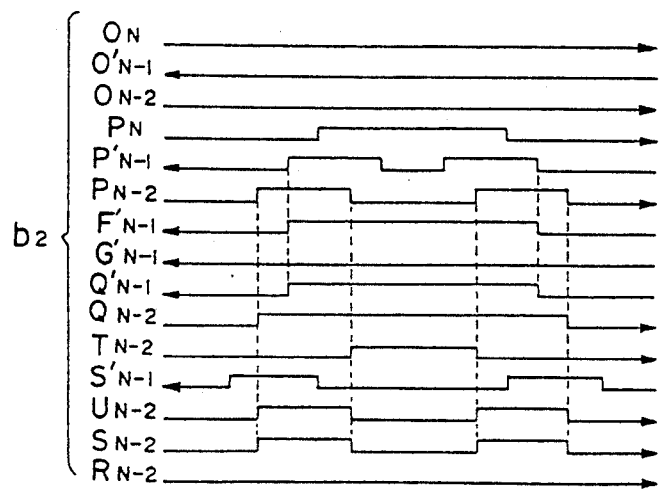
Figure 15C:
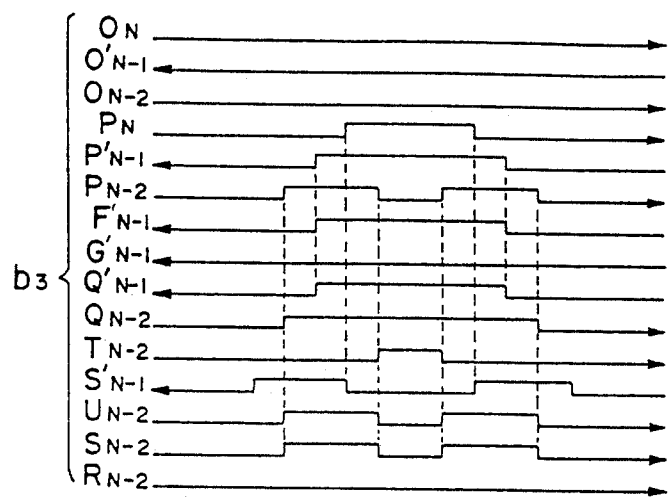
Figure 15D:
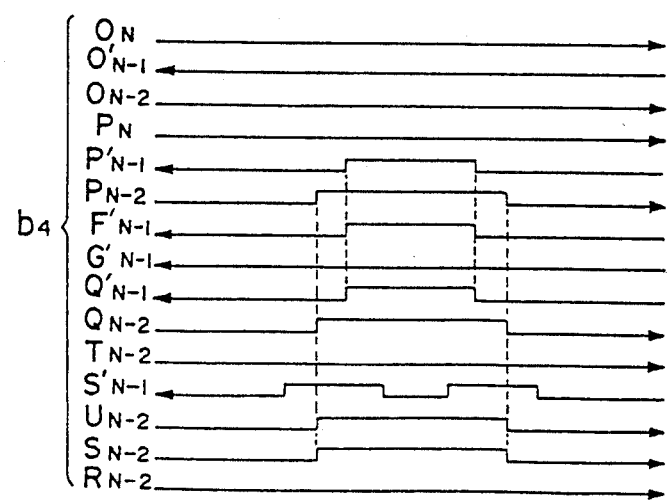

The designated sections in FIGS. 12, 14, 16 and 18 are as follows:

| FIG. 12: | [a21; a22], [a31; a32], [a41; a42], [a43; a44], [a51; a52], [a53; a54], [a61; a62], [a63; a64]; |
|---|---|
| FIG. 14: | [b11; b12], [b13; b14], [b21; b22], [b31; b32]; |

-continued

Figure 16:
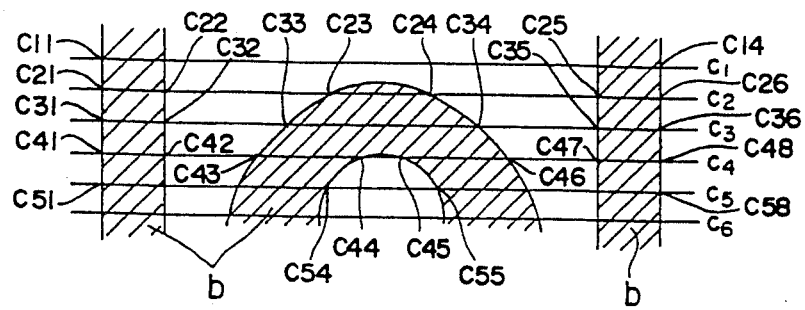
FIG. 16 is an enlarged diagram showing the portion (III) of the document of FIG. 11.
Figure 17A:
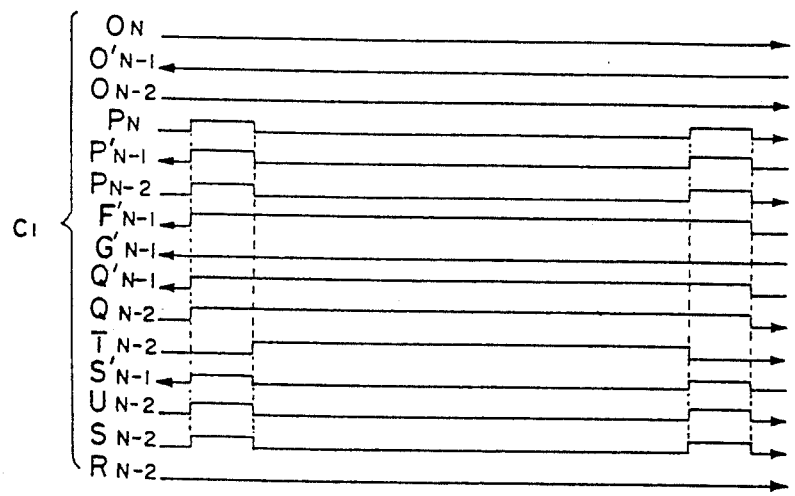
FIGS. 17A to 17F are waveform charts for detecting the region of the portion shown in FIG. 16.
Figure 17B:
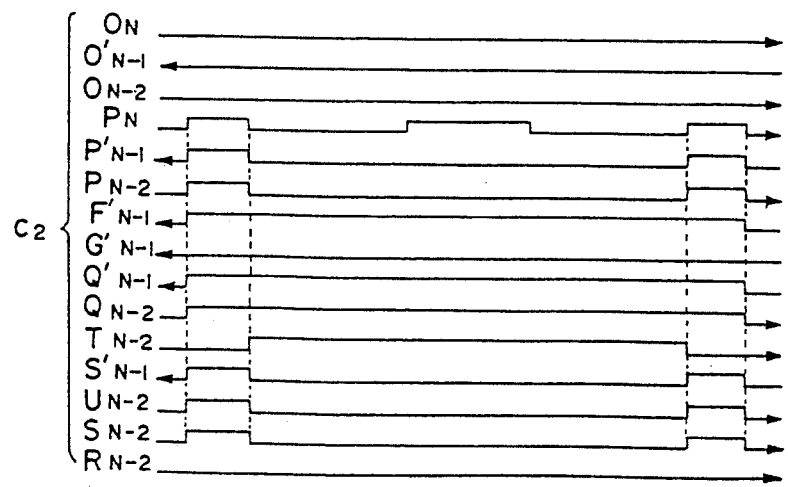
Figure 17C:
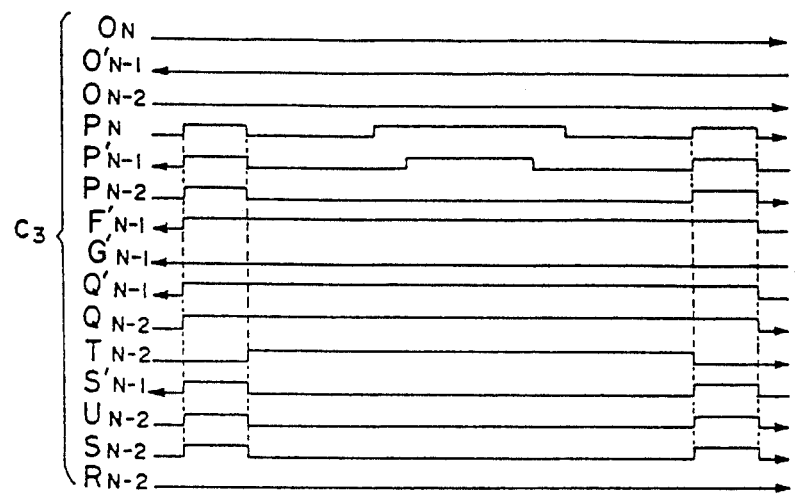
Figure 17D:
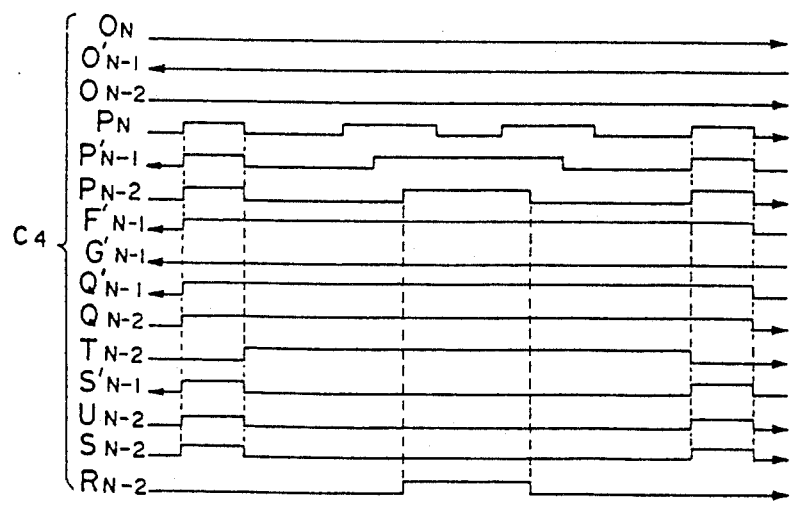
Figure 17E:
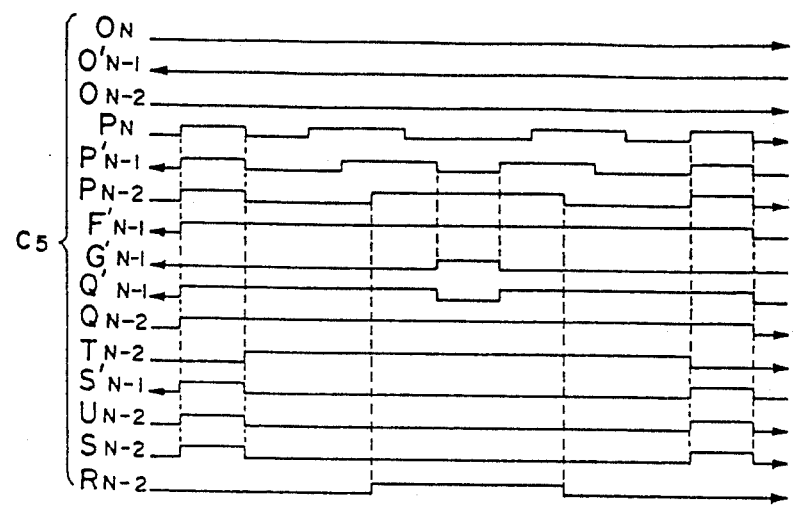
Figure 17F:
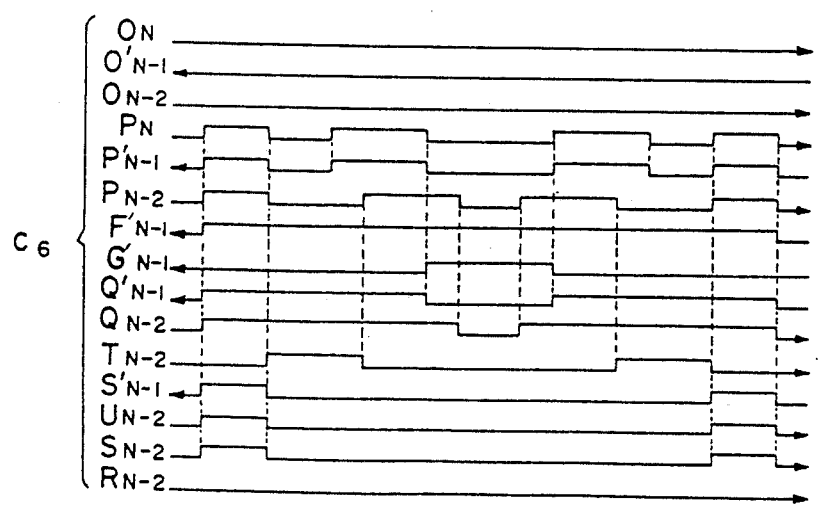
Figure 20A:
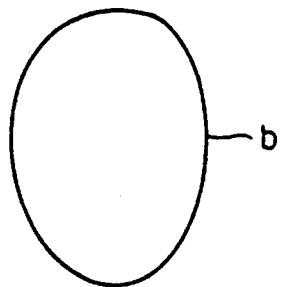
FIGS. 20A to 20F are diagrams showing examples of region designations by closed loops.
Figure 20B:
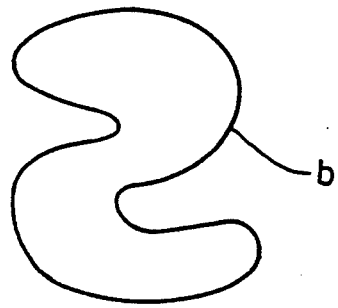
Figure 20C:
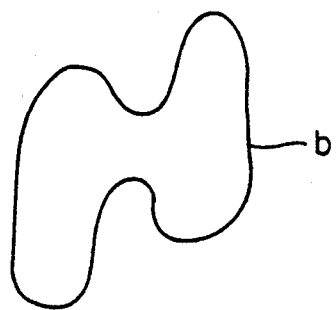
Figure 20D:
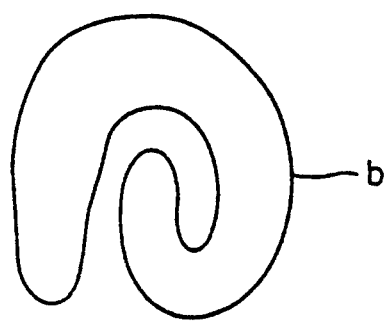
Figure 20E:
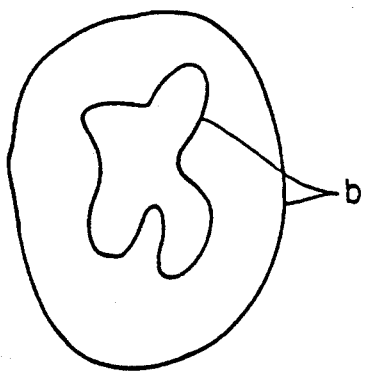
Figure 20F:
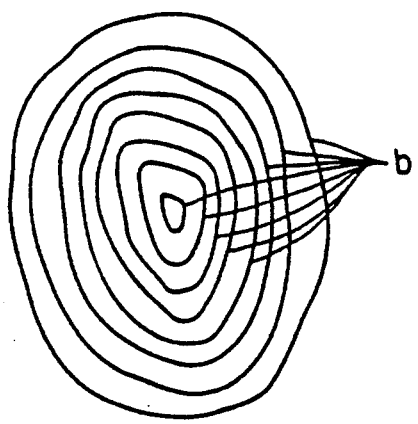
Figure 21A:
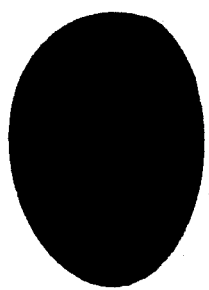
FIGS. 21A to 21F are diagrams showing the detection results of the regions designated in FIGS. 20A to 20F.
Figure 21B:
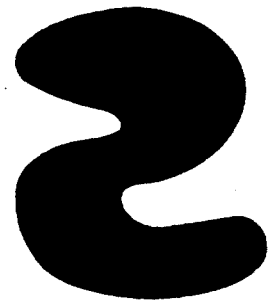
Figure 21C:
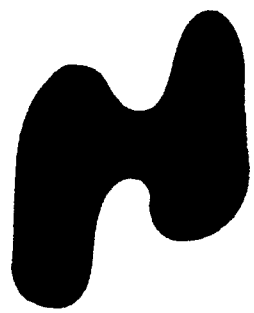
Figure 21D:
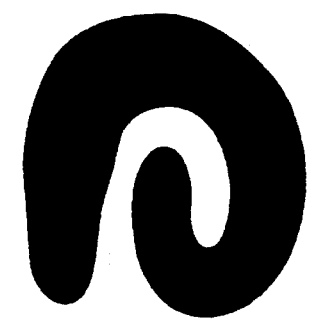
Figure 21E:
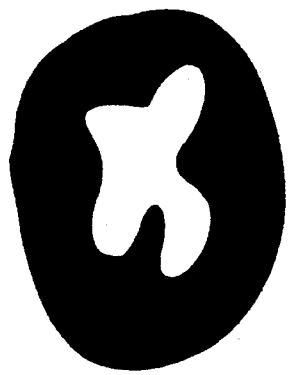
Figure 21F:

FIG. 16: [c11; c12], [c13; c14],
[c21; c22], [c23; c24],
[c25; c26],
[c31; c32], [c33; c34],
[c35; c36],
[c41; c42], [c43; c44],
[c45; c46],
[c51; c52], [c53; c54],
[c55; c56],
[c61; c62], [c63; c64],
[c65; c66]; and FIG. 18: [d11; d12], [d13; d14],
[d21; d22], [d23; d24],
[d25; d26],
[d31; d32], [d33; d34],
[d35; d36], [d37; d38],
[d41; d42], [d43; d44],
[d45; d46]; [d47; d48],
[d49; d49].

(1) On a scanning line a2 (at the leading end portion of the region designated by the closed loop) of FIG. 12, for example, ①  Because of no region section on the preceding scanning line a1, none of the following sections are detected:
External region section in first processing; Internal region section in second processing; Undesignated section in third processing; and non-region section in fourth processing.

② In the fifth processing, the section [a21 ; a22/] is detected as the new region section.

③ In the sixth processing, the section [a21 ; a22] is detected as the region portion on the scanning line a2.

(2) On a scanning line a6 (at the intermediate portion of the region designated by the closed loop) of FIG. 12, for example, ① In the first processing,
For the region section [a51 ; a54] on the preceding scanning line a5, the following items are detected:
[a61 ; a62] and [a63 ; a64]
as the continuing designated section;
8 a61 ; a62]
as the lefthand designated section;
a61
as the lefthand end point of the lefthand designated section;
[a63 ; a64]
as the righthand designated section;
a64
as the righthand end point of the righthand designated section; and
[a61 ; a64]
as the external region section.

② In the second processing,
For the external region section [a61 ; a64], there is detected the internal region section [a62+ ; a63−] which is formed by eliminating the lefthand designated section [a61 ; a62] and the righthand designated section [a63 ; a64] from the external region section [a61 ; a64].

③ In the third processing,
The undesignated section is not detected because no designated section is in the internal region section [a62+ ; a63−].

④ In the fourth processing,
Nor is detected the non-region section.

⑤ In the fifth processing,
No new region section is detected because no designated section which is not continuous is in the region section [a51 ; a54] on the preceding scanning line a5.

⑥ In the sixth processing,
The section [a61 ; a64] is detected as the region portion on the scanning line a6.

(3) On the scanning line b4 (at the rear end of the region designated by the closed loop) of FIG. 14, for example, ① Because of no designated section continuing the region section [b31 ; b32] on the preceding scanning line b31, none of the following sections are detected:
External region section in first processing; Internal region section in second processing; Undesignated section in third processing; and non-region section in fourth processing.

② In the fifth processing, too the new region section is detected because there is no designated section.

③ Thus, the region portion is not detected with the scanning line b4.

(4) On the scanning line c2 (at the leading end portion of the closed loop projecting upward into the region designated by the closed loop) of FIG. 16, for example, ① In the first processing,
For the region section [c11 ; c14] on the preceding scanning line c1, the following items are detected:
[c21 ; c22], [c23 ; c24] and [c25 ; c26]
as the continuing designated section;
[c21 ; c22]
as the lefthand designated section;
c21
as the lefthand end point of the lefthand designated section;
[c25 ; c26]
as the righthand designated section;
c26
as the righthand end point of the righthand designated section; and
[c21 ; c26]
as the external region section.

② In the second processing,
For the external region section [c21 ; c26], there is detected the internal region section [c22+ ; c25−] which is formed by eliminating the lefthand designated section [c21 ; c22] and the righthand designated section [c25 ; c26] from the external region section [c21 ; c26].

③ In the third processing,
The designated section [c23 ; c24] in the internal region section [c22+ ; c25−] is detected as the undesignated section.

④ In the fourth processing,
The non-region section is not detected because no undesignated section is present on the preceding scanning line c1.

⑤ In the fifth processing,
No new region section is detected because no designated section which is not continuous is in the region section [c11 ; c14] on the preceding scanning line c1.

⑥ In the sixth processing,
The section [c21 ; c26] is detected as the region portion on the scanning line c2.

(5) On the scanning line c3 (at the intermediate portion of the closed loop projecting upward into the region designated by the closed loop) of FIG. 16, for example, ① In the first processing, The external region section [c31 ; c36] is detected.

② In the second processing,

The internal region section [c32+ ; c35−] is detected.

③ In the third processing,

The undesignated section [c33 ; c34] is detected.

④ In the fourth processing,

[c33 ; c34] is detected as the undesignated section continuing to the undesignated section [c23 ; c24] on the preceding scanning line; [c33 ; c34] as the lefthand undesignated section; and [c33 ; c34;] as the righthand undesignated section. However, the non-region section is not detected as a matter of fact because there is blank the non-region section which is formed by eliminating the lefthand undesignated section and the righthand undesignated section from the section [c33 ; c34] extending from the lefthand end point c33 of the lefthand undesignated section to the righthand end point c34 of the righthand undesignated section.

⑤ In the fifth processing,

Nor is detected the new region section.

⑥ In the sixth processing,

The section [c31 ; c36] is detected as the region portion on the scanning line c3.

(6) On the scanning line c4 (at the portion where the portion outside of the region designated by the closed loop starts in the projection which is made upward by the closed loop) of FIG. 16, for example, ① In the first processing, The external region section [c41 ; c48] is detected.

② In the second processing;

The internal region section [c42+ ; c47−] is detected.

③ In the third processing,

The undesignated regions [c43 ; c44] and [c45 ; c46] are detected.

④ In the fourth processing,

[c43 ; c44] and [c45 ; c46] are detected as the undesignated sections on the present scanning line c4 continuing to the undesignated section [c33 ; c34] on the preceding scanning line c3; [c43 ; c44] as the lefthand undesignated section; and [c45 ; c46] as the righthand undesignated section. And, there is detected the non-region section [c44+ ; c34−] which is formed by eliminating the lefthand undesignated section and the righthand undesignated section from the section [c43 ; c46] extending from the lefthand end point c43 of the lefthand undesignated section to the righthand end point c46 of the righthand undesignated section.

⑤ In the fifth processing,

The new region section is not detected.

⑥ In the sixth processing, therefore,

This sections [c41 ; c44] and [c45 ; c48], which are formed by eliminating the non-region section [c44+ ; c45−] from the external region section [c41 ; c48], are detected as the region portions on the scanning line c4.

(7) On the scanning line c5 of FIG. 16, for example, not the section [c41 ; c48] but the sections [c41 ; c44] and [c45 ; c48] are used as the region section on the scanning line c4 so that the sections [c51 : c54] and [c55 ; c58] are detected like the operations (2) as the region portion on the scanning line c5.

In case the region is designated as shown in FIG. 22, on the other hand, the leading end portion of the region B can be correctly detected as the new region section even if it appears on that scanning line c5.

(8) Let the case be considered, in which the "designated section" is detected by using the informations of the designated points only, as shown in FIG. 18, for example. For the scanning line d2, the section [d21 ; d26] is detected as the region section, and the section |d23 ; d24| is detected as the undesignated section. For the scanning line d3, the section [d34+ ; d35−] is detected as the non-region section. Thus, the sections [d31 ; d34] and [d35 ; d38] are detected as the region sections on the scanning line d3. In case, however, the "designated section" is detected by using the information of the designated points and the image points, the non-region section becomes blank in the fourth processing so that the section [d31 ; d38] can be correctly detected as the region section on the scanning line d3.

Figure 6:
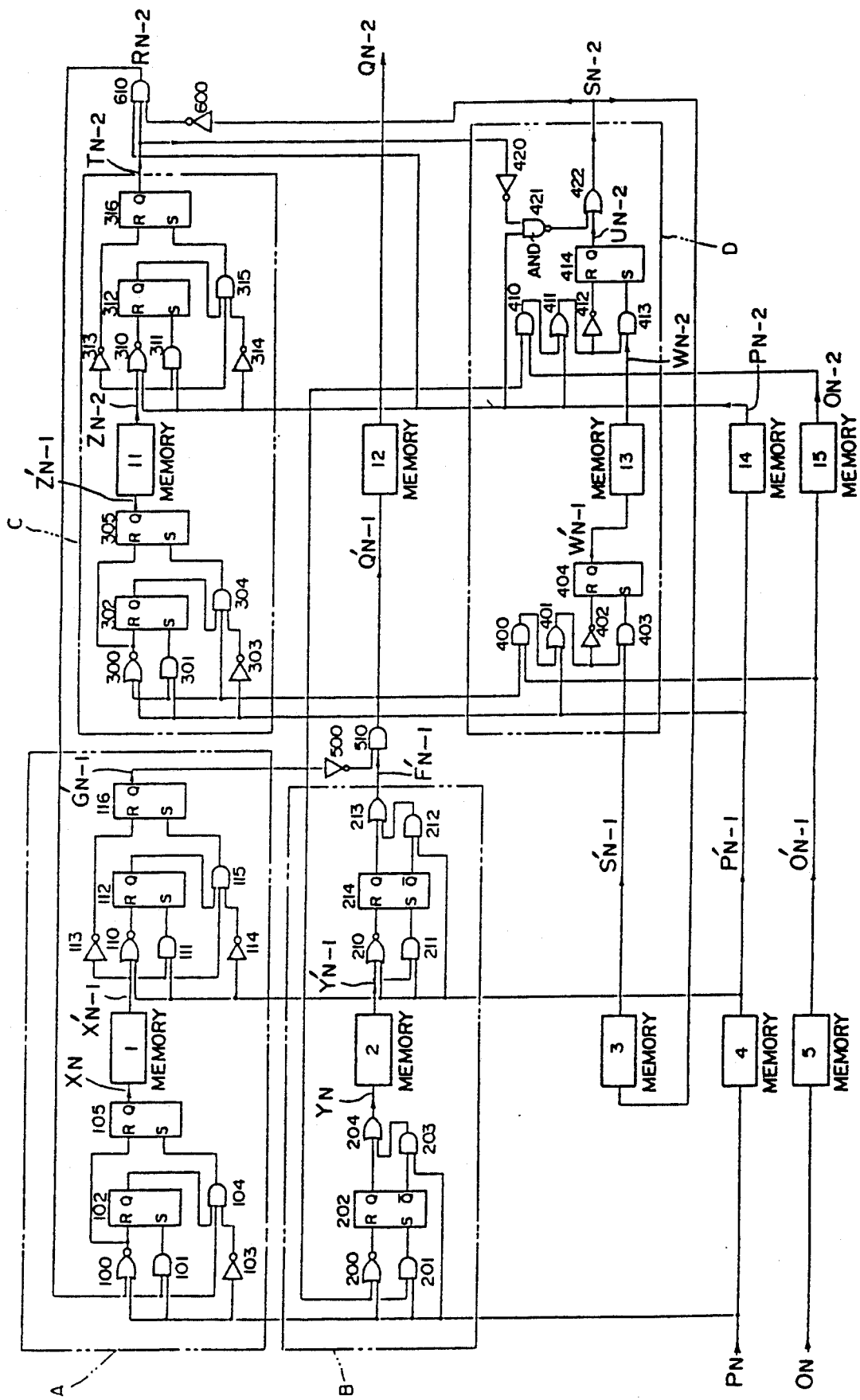
FIG. 6 is a circuit diagram showing the structure of a region detecting hardware.

FIG. 6 is a diagram showing a circuit for carrying out the detection method thus far described. In this circuit, reference numerals 1 to 5 and 11 to 15 designate memories having capacities corresponding to the pixel number of at least one scanning line in the main scanning direction.

On the other hand, letter 0 designates a signal indicating the information of an image point. This signal is given a value "1" for the image point and otherwise a value "0". Letter P designates a signal indicating the information of a designated point. This signal is given the value "1" for the designated point and otherwise the value "0". Letter Q designates the signal of a point which is detected within a designated region.

Moreover, the "dashes" attached to the signals imply that the dashed signals accord to the backward address (for performing operations similar to the backward scanning by the backward read-out) opposite to the main scanning direction, and the "undashed" signals accord to the main scanning direction. On the other hand, the suffixes N, N−1' and N−2 attached to the individual signal names designate the data signals of the scanning line being read at present, the preceding scanning line and the further preceding scanning line, respectively.

First of all, a signal $O_N$ designating the image point read out by the present scanning line is written in the memory 5 in accordance with the forward address. A signal $O_{N-1}$ designating the image point written by the preceding line is read out according to the backward address and is outputted as a signal $O'_{N-1}$ so that it is fed to the circuit of the block D and written in the memory 15 in accordance with the backward address. A signal $O'_{N-2}$ written in the memory 15 by the further preceding scanning line in accordance with the backward address is read out according to the forward address into a signal $O_{N-2}$, is fed to the circuit of the block D.

On the other hand, a signal $P_N$ indicating the designated point of the present scanning line is fed to the circuit of the block A and the circuit of the block B and is written in the memory 4 in accordance with the forward address. A signal $P_{N-1}$ written by the preceding scanning line is read out according to the backward address and outputted as a signal $P'_{N-1}$ so that it is fed to the circuits of the blocks A, B, C and D and written in the memory 14 in accordance with the backward address. A signal $P'_{N-2}$ written by the further scanning line in accordance with the backward address is read out according to the forward address and outputted as a signal $P_{N-2}$ so that it is fed to the circuits of the blocks C and D and an AND gate 610.

Figure 7:
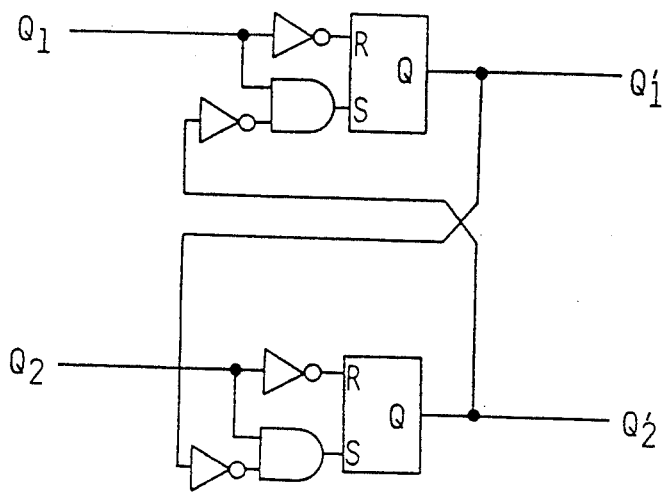
FIG. 7 is a diagram showing a circuit for detecting an including region.

The circuit of the aforementioned block A is one for detecting the aforementioned non-region section. In this circuit, a signal $R_{N-2}$ indicating the undesignated section of the further preceding scanning line and the signal $P_N$ indicating the designated of the present reading scanning line are scanned according to the forward address by a NOR gate 100, AND gates 101 and 104, an inverter 103 and RSFFs 102 and 105 to produce a signal $X_N$, which is written in the memory 1 in accordance with the forward address. A signal $X_{N-1}$ written in the memory 1 by the preceding scanning line in accordance with the forward address is read out according to the backward address and is outputted as a signal $X'_{N-1}$. This signal $X'_{N-1}$ and the signal $P'_{N-1}$ read out from the memory 4 in accordance with the backward address and indicating the designated point of the preceding scanning line are scanned in the direction of the backward address by a NOR gate 110, AND gates 111 and 115, inverters 113 and 114 and RSFFs 112 and 116 to produce a signal $G'_{N-1}$ indicating the non-region section of the preceding scanning line. FIG. 7 is a waveform chart showing one example of the operations of the circuit of the block A. A rightward arrow (→) indicates the forward scanning, and a leftward arrow (←) indicates the backward scanning.

Figure 8:
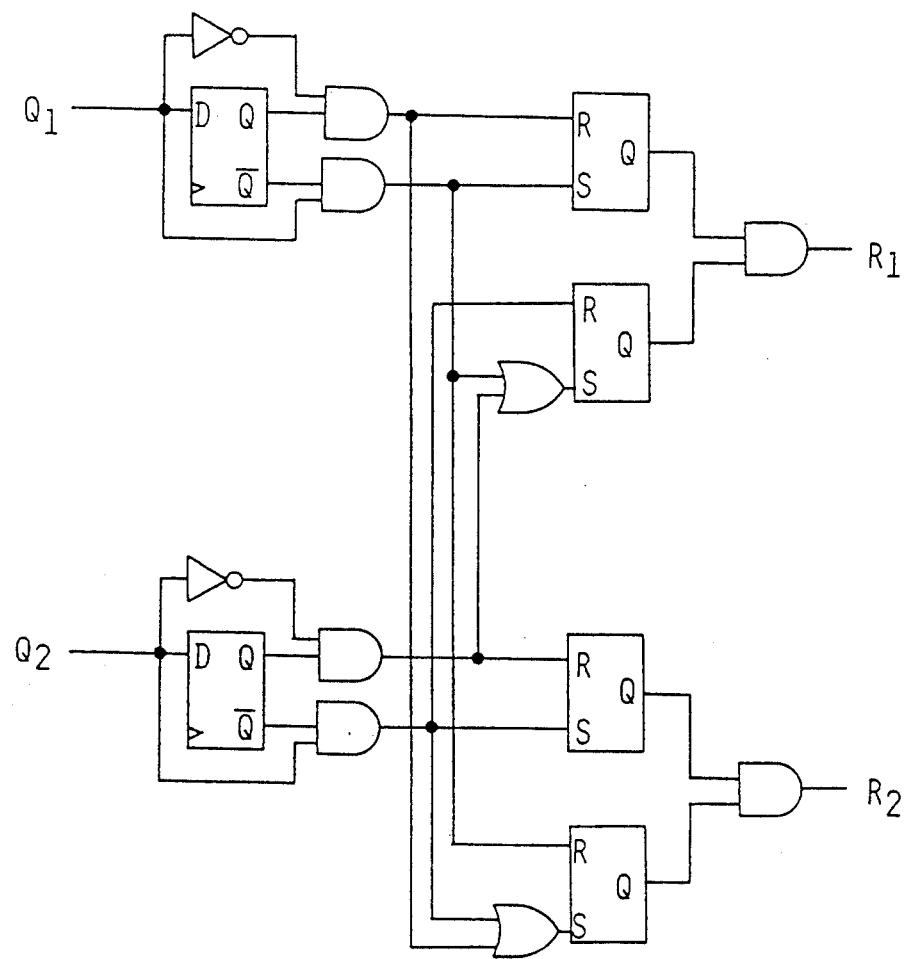
FIG. 8 is a diagram showing a circuit for detecting a region to be included.

The circuit of the block 8 is one for detecting the aforementioned external region section and a new region section. Since no internal region section is in the new region section, the second, third and fourth processings are accomplished simultaneously with the first processing because no influence is given even by the addition of those processings. Here, the signal $Q_{N-2}$ indicating the region section of the further preceding scanning line and the signal $P_N$ indicating the designated point of the present scanning line are scanned in the forward address direction by a NOR gate 200, AND gates 201 and 203, an OR gate 204 and an RSFF 202 to produce a signal $Y_N$, which is written in the memory 2 in accordance with the forward address. The signal $Y_{N-1}$ written in that memory 2 by the preceding scanning line in accordance with the forward address is read out according to the backward address and outputted as the signal $Y'_{N-1}$. This signal $Y'_{N-1}$ and the signal $P'_{N-1}$ read out from the memory 4 and indicating the designated point of the preceding scanning line are scanned in the backward address direction by a NOR gate 210, AND gates 211 and 212, an OR gate 213 and an RSFF 214 to produce a signal $F'_{N-1}$ indicating the external region section of the preceding scanning line. FIG. 8 is a waveform chart illustrating one example of the operations of the circuit of that block B.

The circuits of an inverter 500 and an AND gate 510 are a circuit for the aforementioned operation of "detecting the region portion of the present scanning line". In this circuit, a logical product is taken between the signal $F'_{N-1}$ obtained by the circuit of the block B and indicating the external region section and the inverted signal $G'_{N-1}$ obtained by the circuit of the block A and indicating the non-region section to produce a signal $Q'_{N-1}$ indicating the region section. This signal $Q'_{N-1}$ is fed to the circuit of the block C and the circuit of the block D and is written in the memory 12 in accordance with the backward address. The signal $Q'_{N-2}$ written in this memory 12 in accordance with the backward address is read out according to the forward address and is outputted as a signal $Q_{N-2}$ to provide the region signal (finally functioning as the region detection signal) of the further preceding scanning line. This region signal is fed to the circuit of the block D and the circuit of the block B.

Figure 9:
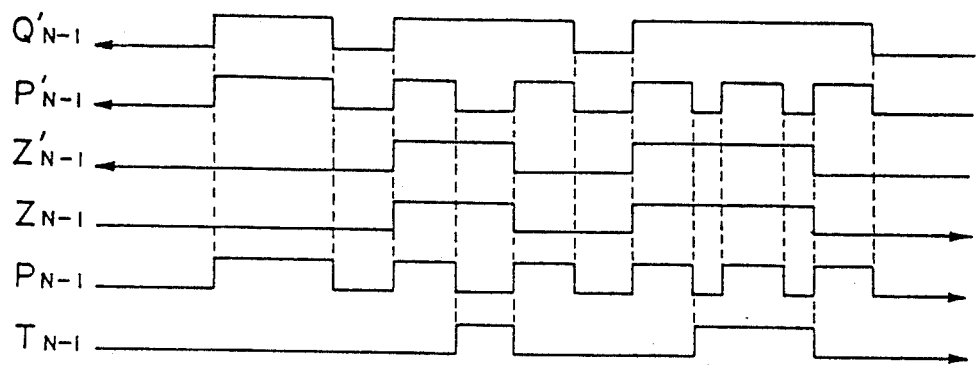
FIG. 9 is a waveform chart showing one example of the operations of the circuit of the block C of FIG. 6.

The circuit of the block C is one for the aforementioned operation of "detecting the internal region section". In this block C, the region section is used in place of the external region section in the description of the method to cause a delay of one scanning line, which will not raise a serious problem. Here, the signal $Q'_{N-1}$ obtained by the AND gate 510 and indicating the region section and the signal $P'_{N-1}$ indicating the designated point are scanned in the backward address direction by a NOR gate 300, AND gates 301 and 304, an inverter 303, and RSFFs 302 and 305 to produce a signal $Z'_{N-1}$. This signal $Z'_{N-1}$ the memory 11 in accordance with the backward address. A signal $Z'_{N-2}$ of the further preceding scanning line written in that memory 11 in accordance with the backward address is read out according to the forward address and is outputted as a signal $Z_{N-2}$. This signal $Z_{N-2}$ and a signal $P_{N-2}$ read out from the memory 14 and indicating the designated color of the further preceding scanning line are scanned in the forward direction by a NOR gate 310, AND gates 311 and 315, inverters 313 and 314 and RSFFs 312 and 316 to produce a signal $T_{N-2}$ indicating the internal region section. FIG. 9 is a waveform chart illustrating one example of the operations of the circuit of the block D.

The region division inhibition section signal $S_{N-2}$ of the further preceding line is written in the memory 3 in accordance with the forward address, and the region division inhibition section signal $S_{N-3}$ of the still further preceding line written according to the forward address is read out according to the backward address to produce the signal $S'_{N-1}$, which is fed to the circuit of the block D.

In case the designation section is to be detected from the informations of the designated point and the image point, the image section is not used for detecting the non-region section in the fourth processing, but the formation of the undesignated section is controlled by the third processing.

Figure 10:
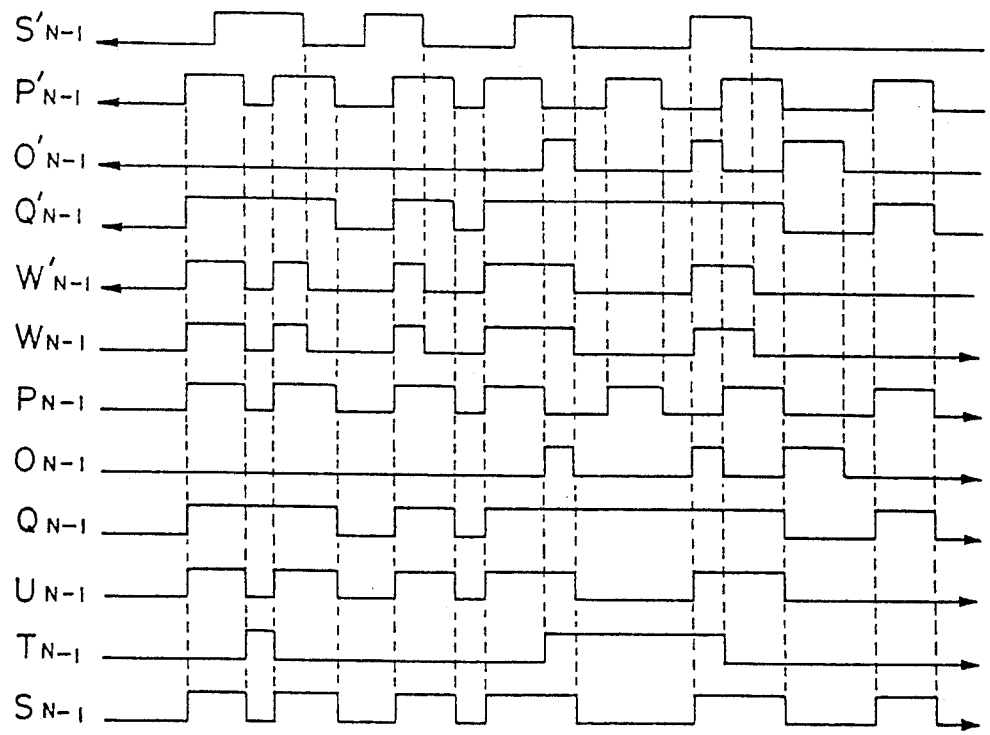
FIG. 10 is a waveform chart showing one example of the operation of the circuit of the block D of the same.

The circuit of the block D, the inverter 600 and the inverter 610 are those for the aforementioned operation of "detecting the undesignated section". Here, the signal $S'_{N-1}$, the signal $P'_{N-1}$ indicating the designated point, and the signal $Q'_{N-1}$ indicating the region section are scanned in the backward address direction by AND gates 400 and 403, an OR gate 401, an inverter 402 and an RSFF 404 to produce a signal $W'_{N-1}$. This signal $W'_{N-1}$ is written in the memory 13 in accordance with the backward address. The signal $W'_{N-2}$ of the further preceding scanning line written according to the backward address is read out according to the forward address to produce a signal $W_{N-2}$. This signal $W_{N-2}$, the signal $P_{N-2}$ indicating the designated point, the signal $O_{N-2}$ indicating the image point, and the signal $Q_{N-2}$ indicating the region section are scanned in the forward address direction by AND gates 410 and 413, an OR gate 411, an inverter 412 and an RSFF 414 to produce a signal $U_{N-2}$. Moreover, this signal $U_{N-2}$, the signal $T_{N-2}$ indicating the internal region section and the signal $P_{N-2}$ indicating the designated color are fed to an inverter 420, an AND gate 421 and an OR gate 422 to produce a signal $S_{N-2}$. FIG. 10 is a waveform chart illustrating one example of the operations of the circuit of the block D.

The signal $R_{N-2}$ indicating the undesignated section is produced from the signal $T_{N-2}$ indicating the internal region section, the signal $P_{N-2}$ indicating the designated point and the signal $S_{N-2}$.

The waveform charts of the various kinds of signals relating to the scanning lines a1 to a6 of FIG. 12 are presented in FIGS. 13A to 13F. In these waveform charts, the rightward arrows (→) designate the forward scanning, and the leftward arrows (←) designate the backward scanning. The waveform charts of the various kinds of signals relating to the scanning lines b1 to b6 of FIG. 14 are presented in FIGS. 15A to 15F. The waveform charts of the various kinds of signals relating to the scanning lines c1 to c6 of FIG. 16 are presented in FIGS. 17A to 17F. The waveform charts of the various kinds of signals relating to the scanning lines d1 to d4 of FIG. 18 are presented in FIGS. 19A to 19D.

FIGS. 20A to 20F are diagrams showing examples of the region designation by the closed loops. The regions thus designated are detected by the present embodiment, as shown in FIGS. 21A to 21F. In these Figures, the smeared-out portions are the area portions detected as the regions.

As has been described hereinbefore, according to the present embodiment, the regions designated by the two methods with a closed loop of arbitrary shape and by the smearing-out can be accurately detected from a document having those designated mixed therein.

In case the regions designated in two or more colors are in inclusive relation to each other when the aforementioned designated regions are to be detected, which processing should be executed can be designated by setting the priority in the following manner.

Figure 73:
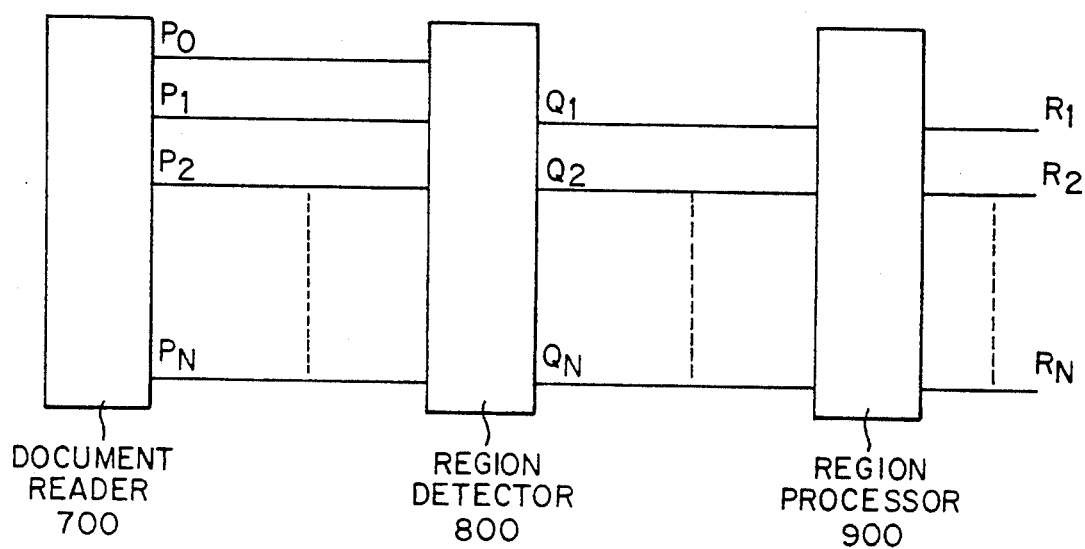
FIG. 73 shows a functional block diagram of a system of the present invention.

FIG. 73 is a block diagram showing the overall structure for the image processing. Reference numeral 700 designates a document reader, in which the image of a document illuminated with a reading light source is read out by an image sensor such as CCD and is processed by an A/D conversion, a shading correction, a color extraction a color ghost correction, an MTF correction and so on. Moreover, totally (N+1) colors of the N region designation colors written in advance in the document and the color of the document itself are discriminated so that their respective color signals $P_0$, $P_1$, - - - , and $P_N$ are outputted. Incidentally, the signal $P_0$ is that of the document color.

Numeral 800 designates a region detector for detecting the regions designated with the colors from the color signals $P_0$, $P_1$, - - - , and $P_N$ to output the region signals $Q_1$, $Q_2$, - - - , and $Q_N$.

Numeral 900 designates a region processor which is made receptive of the region signals $Q_1$, $Q_2$, - - - , and $Q_N$ for processing them, as follows, to output the region signals $R_1$, $R_2$, - - - , and $R_N$.

FIGS. 74A to 74D are diagrams illustrating the region designations in the case of two region designating colors, i.e., in the case of N=2. Letter X designates a first region designating color, and letter Y designates a second region designating color, in both of which specific regions are designated with closed loops. Numeral 0 designates the document.

Figure 74A:
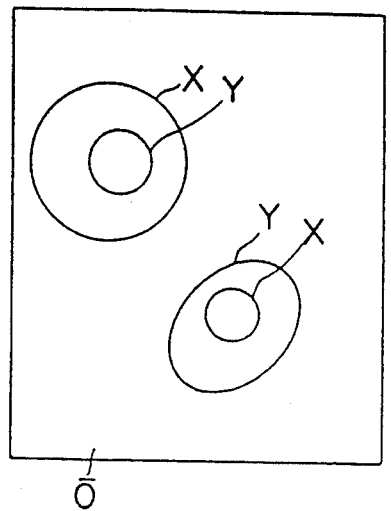
FIG. 74A to 74D are diagrams for explaining the detections of two designated regions of inclusion.
Figure 74B:
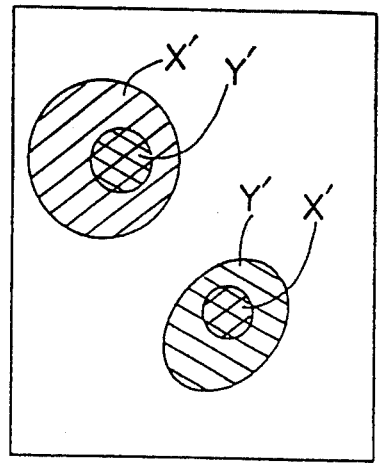

In case the regions are designated in the two colors, as shown in FIG. 74A, the region designated in the first color X is detected as the region X' hatched leftward downhill, and the region designated in the second color Y is detected as the region Y' hatched rightward downhill. Therefore, the region designated in one color include the region designated in the other color, and it has to be determined which of the including region or the included region should be extracted. This determining process is accomplished by the region processor 900. In this case, the region processor 900 is switched and set in advance which the included side or the including side should be preferred.

Figure 74C:
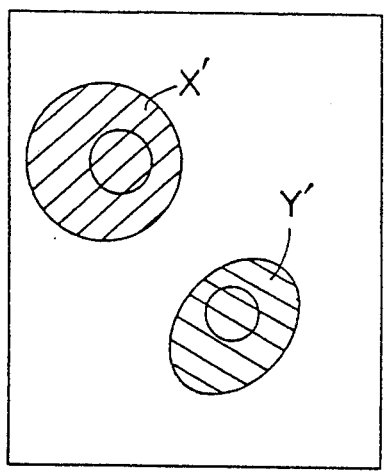
Figure 74D:
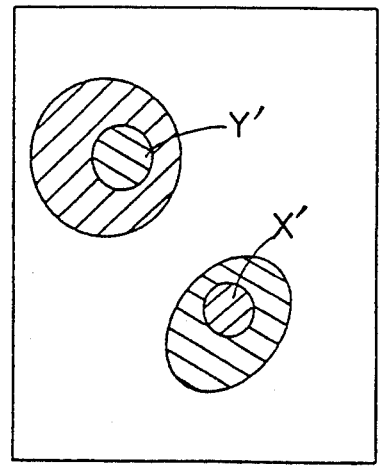

In case the including side is preferred, the region designated in the outer region designating color is extracted, as shown in FIG. 74C. In case, on the other hand, the included side is preferred, the region designated in the inner region designating color is extracted, as shown in FIG. 74D.

FIG. 7 is a diagram showing the processor for preferring the including side. The region portions to be detected in priority (in the odd order) are preferred by the scanning operations in the main scanning direction (from the right to the left of the document) and in the auxiliary scanning direction (from the top to the bottom of the document), and the region portions to be detected later (in the even order) are masked.

FIG. 8 is a diagram showing the processor for preferring the included side. The region portions in the color to be detected later (in the even order) are preferred by the scanning operations.

Moreover, the circuits shown in FIGS. 7 and 8 are disposed in the region processor 3 so that they are selected by change-over means.

From the description thus far made, according to the present embodiment, in case the regions designated in two colors are in the included relation, their common portion can be detected as one of the regions.

In case, on the other hand, the regions designated in two or more colors have an overlapped region, the designated region can be detected by setting the priority for each of the colors, for example.

In the present embodiment, the region designating color X shown in FIG. 74A is set in advance with a higher priority than the region designating color Y so that the region designated in the color X is preferentially extracted in the region processor 900. Thus, the region X' is extracted, as shown in FIG. 74C.

FIG. 23 is a diagram showing a concrete circuit of the region processor 900 for giving a priority. In this circuit, the priority is set in the order of the region signals $Q_1 > Q_2 > \text{- - -} > Q_N$.

Incidentally, the aforementioned priority of the region designating color can be desirably set by providing a plurality of priority setting circuits in the region processor 900 to select one of them from a control unit. In case, on the other hand, any special setting is not accomplished from the control unit, the priority set in advance can be used.

As described above, according to the present embodiment, the region extraction is performed according to a predetermined priority even in case the regions designated in different colors are overlapped.

Next, here will be described the image processing of image data inside or outside of the designated region in accordance with the present invention.

Figure 24:
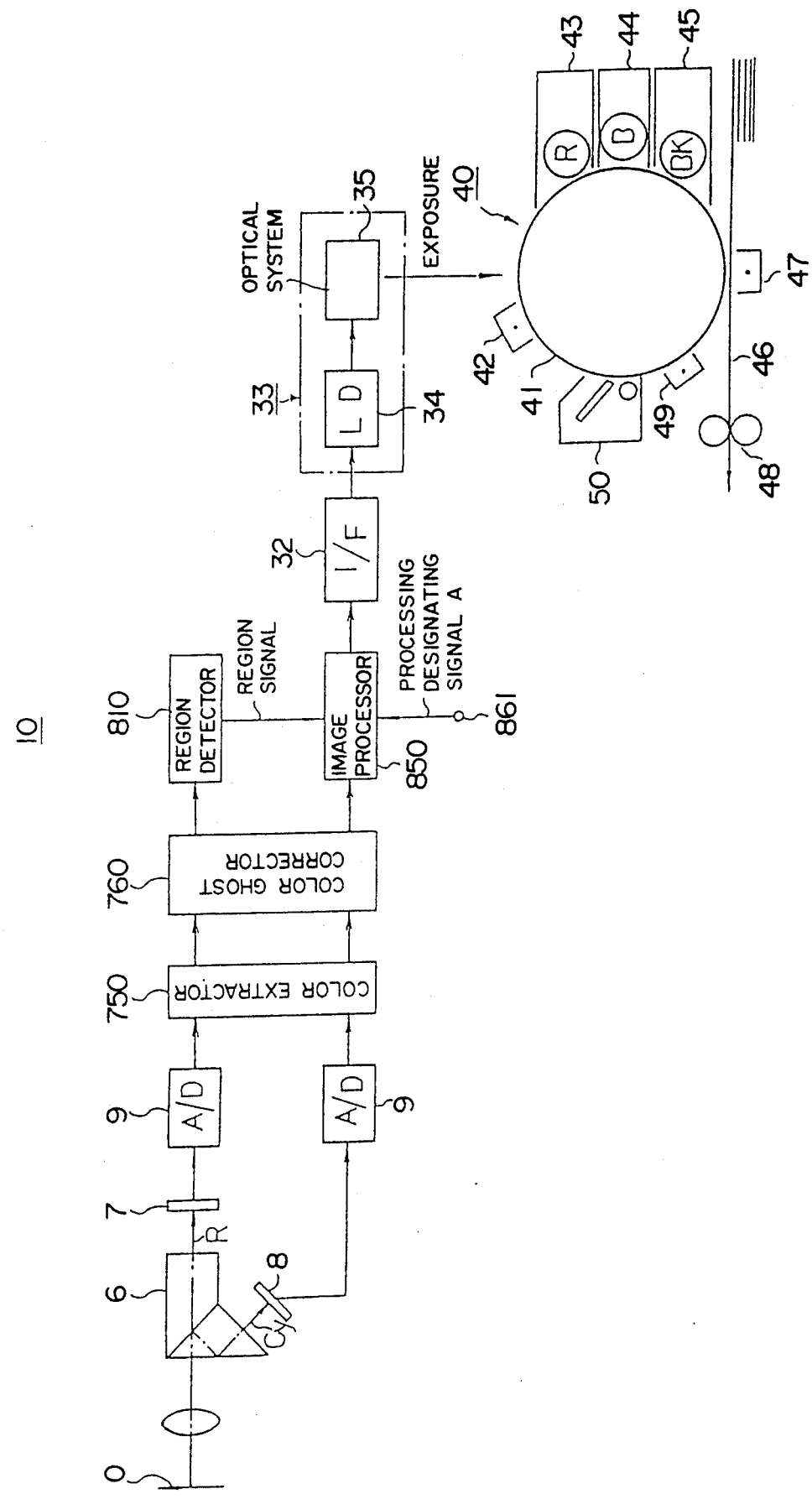
FIG. 24 is a block diagram showing the summary of an image processing apparatus capable of magnifying and reducing an image.

First of all, the schematic structure of the color image processing apparatus, to which the present invention is applied, will be described with reference to FIG. 24.

The color image informations (or optical image) of the document O are extracted into two color extracted images, i.e., the images of red R and cyan Cy, in this example, by a dichroic mirror 6.

These color extracted images of red R and cyan Cy are fed to image reading means such as CCDs 7 and 8, respectively, so that image signals of the red and cyan components R and Cy are outputted.

These image signals R and Cy are fed to A/D converters 9 and 9', respectively, so that they are converted into digital signals of a predetermined bit number, e.g., 6 bits in this example. Simultaneously with this A/D conversions, the shading corrections are accomplished.

If the digital image signals thus having their shadings corrected and normalized with white signals are designated at VR and VC, these image signals VR and VC are fed to a color extractor 750 so that they are extracted into a plurality of color signals.

Figure 50:
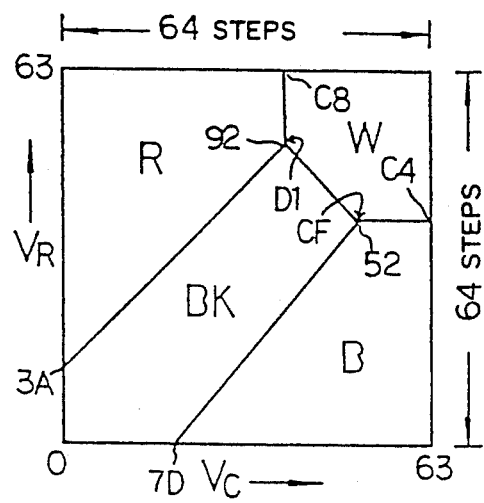
FIG. 50 and FIGS. 51A to 51C are diagrams showing examples of color extraction maps.

Here, the color extractions are accomplished before the binary coding. For these color extractions, there is prepared a map, as shown in FIG. 50. This color extraction map is stored in a ROM (e.g., a bipolar ROM). In this case, the color code (for designating the red, blue and black colors) and the density informations after the gamma corrections are stored at the addresses given by the image data VR and VC of 6 bits having an intermediate tone level. In other words:

One Color Information = Color Code + Density Information.

As to the pixel having a density value of 30 level (X X 0 1 1 1 1 0) in the hexadicimal notation, for example, Red $\underline{\text{Color} = 1\ 0\ |\ 0\ 1\ 1\ 1\ 1\ 0 = 9E.}$
$\text{Color Code}\ |\ \text{Density Information}$ Likewise:
Blue Color = 0 1 0 1 1 1 1 0 = 5E;
Black Color = 0 0 0 1 1 1 1 0 = 1E; and
White Color = 1 1 0 1 1 1 1 0 = DE.

The white color may be expressed in the DE or C0. In short, the white density information is useless.

The data thus specified are stored at the respective addresses, as shown in FIG. 50. Because of the four colors, i.e., red, blue and black in addition to white, the color codes are in 2 bits. It is, however, apparent that the bit number could be increased in accordance with the increase in the number of colors. Although the density information is in 6 bits, moreover, 4 bits would be practically sufficient for letters only. It is also apparent that the bit number might be changed in accordance with the image to be processed.

The boundaries for the color extractions, as shown in FIG. 50, have to be determined considering the output fluctuations at the edges of the line portions. This is because the unnecessary color called the color ghost or a kind of color mistakes would otherwise be generated by the edges of black letters or the like.

For practical purposes, on the other hand, it is desired to extract a specific color or a color other than the red, blue and black colors. For this desire, color extraction maps other than that of the present example are prepared so that one of them may be selected, as desired. Alternatively, the color extraction ROM may be made so replaceable that it may be replaced by a necessary one (actually in the form of the ROM pack).

Figure 51A:
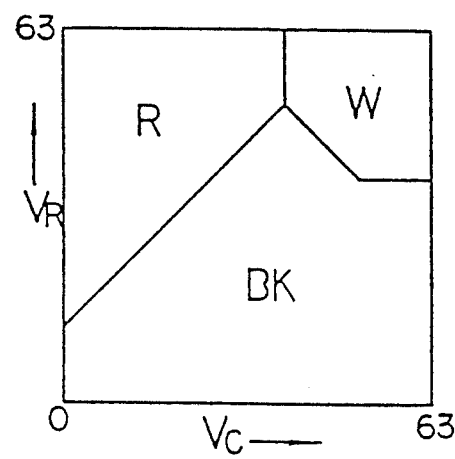
Figure 51B:
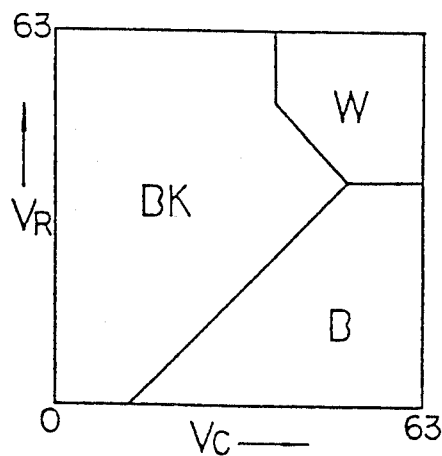
Figure 51C:
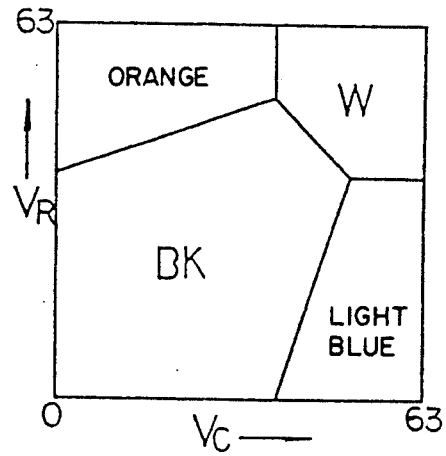

The maps in the case of three colors are exemplified in FIGS. 51A and 51B, and the map in the case of four colors is exemplified in FIG. 51C. These map data present the data having been subjected to the gamma correction.

Figure 52:
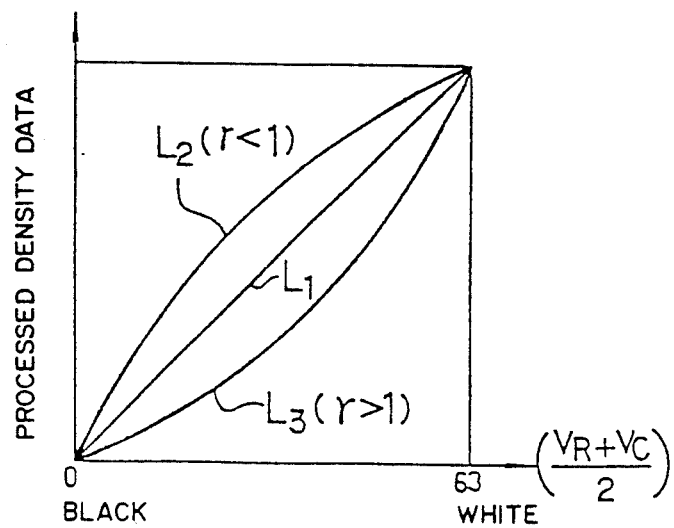
FIG. 52 is a diagram for explaining a gamma correction curve.

One example of the gamma correction curves is illustrated in FIG. 52. A curve L2 exemplifies the correction curve for $\gamma < 1$, and a curve L3 exemplifies the correction curve for $\gamma > 1$.

Figure 53:
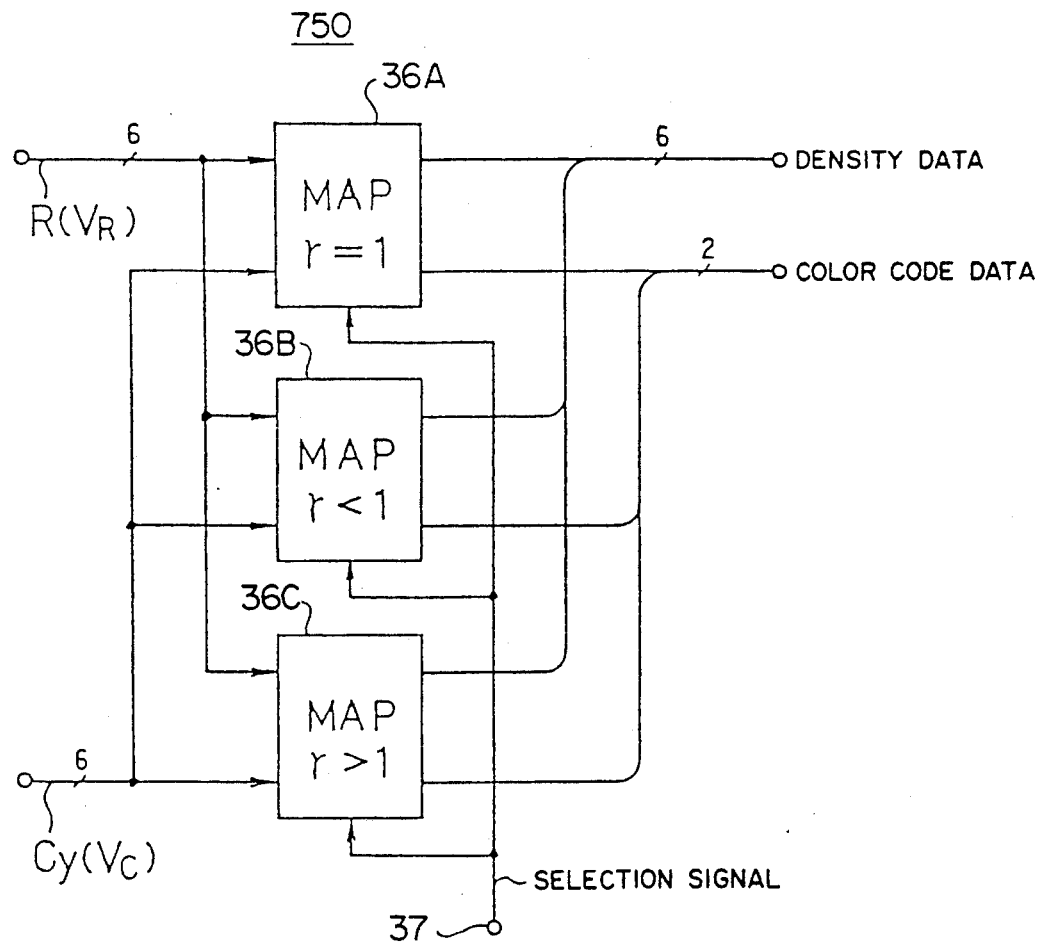

FIG. 53 shows a concrete example of the color extractor 750. If the three correction curves L1 to L3 including no correction ($\gamma = 1$) are suitably used for different purposes, as shown in FIG. 52, there are prepared three color extraction ROMs 36A to 36C. These ROMs are stored with both the identical color code data and the gamma-corrected density data according to the respective correction curves.

What gamma correction curve should be used is selected in accordance with the selection signal fed to a terminal 37.

If the aforementioned color extraction ROMs have large capacities, one of them can store the individual data of the color extraction ROMs 36A to 36C.

FIG. 54 shows another example of the color extractor 750.

In this example, there is prepared a ROM 39B especially for the gamma correction, which is stored with the gamma correction data themselves shown in FIG. 52.

Moreover, a color extraction ROM 39A is stored with the color code data, as shown in FIG. 50, and the density data to be gamma-corrected. These color code and density data are read out, if necessary, from the ROM 39A so that the density data are given the predetermined gamma characteristics by the gamma-correcting ROM 39B. The density data thus gamma-corrected and the color code data are written in a RAM 38.

Each of the color signals thus extracted is composed of the color code data (of 2 bits) indicating the corresponding color information and the density data (of 6 bits) thereof.

The data of each color signal to be used can be stored in the color extraction map of the ROM structure, for example.

The image data thus color-extracted are fed to color ghost correcting means 760 so that their color ghosts in the main (or horizontal) scanning direction and in the auxiliary scanning direction (or in the drum rotating direction) are corrected. The target of the ghost correction is the color code data.

The color code data thus having their ghosts corrected are fed to region detecting means 810 so that the region designated with a marker of specific color is detected.

The region signal corresponding to the designated region detected by the region detecting means 810 is fed together with the density data to an image processor 850.

This image processor 850 is constructed to contain a multivalue coding circuit for multivalue-coding the image data.

This multivalue coding includes a binary or ternary coding, of which the former will be described by way of example in the following.

The binary-coded image data are fed through an interface circuit 32 and an optical scanning device 33 to an output device 40.

In case a laser is used as the light source of the optical scanning device 33, the image data are fed as a modulation signal to a laser driver 34 so that they are deflected and scanned at a predetermined rate in the main scanning direction.

The document image is recorded by the deflected and scanned laser beam.

A color reproducing machine is used as the output device 40.

Reference numeral 41 designates a photosensitive drum which is made of an OPC to have its circumference charged uniformly by a charging device 42. Moreover, a developing device is arranged to face a portion of the circumference with a predetermined clearance being held inbetween.

In case the color recording is to be accomplished in the three colors of R(red), B(blue) and BK(black) colors, as has been described hereinbefore, there are provided three developing devices 43 to 45. The color-extracted images having been exposed to the laser beam are developed by those developing devices 43 to 45. The development is accomplished for one color at each drum rotation.

After all the developments, the images are transferred to a recording (ordinary) paper 46 by a separate transfer electrode 47. The recording paper 46 has its images fixed by a fixing device 48 until it is discharged.

Numeral 49 designates an electric eliminator, and numeral 50 designates a cleaning device. The following example is directed to the case in which the image data within a region enclosed by a color marker. The region of the image data to be magnified or reduced is determined in accordance with the region signal detected in the region detector 810.

For convenience of description, the image processor 850 will be described first of all in the following.

Figure 25:
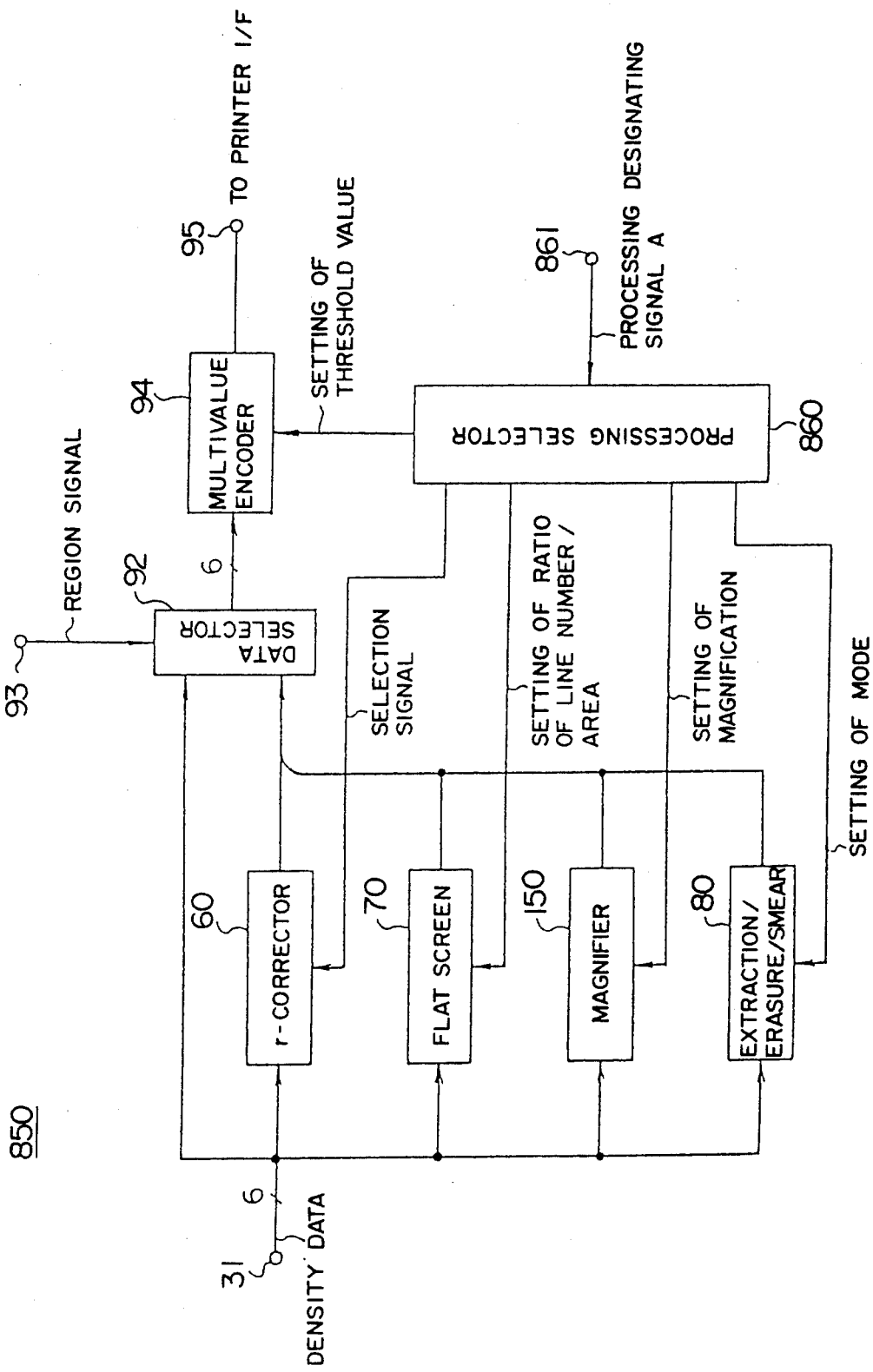
FIG. 25 is a block diagram showing one example of an image processing circuit.

The image processor 850 is constructed to select several image processings in addition to the magnifying and reducing process, as shown in FIG. 25.

In this example, the image processor 850 is equipped with not only the magnifying/reducing circuit 150 but also a gamma corrector 60, a screening circuit 70 and an extracting/erasing/smearing circuit 80, which are selected in accordance with the signal coming from the processing selector 860. This selector 860 has its terminal fed with a processing designating signal A instructed by the (not-shown) control unit of the system.

The density data fed to a terminal 31 are fed directly to a data selector 92 and are subjected to the predetermined signal processings in the aforementioned individual circuits 60, 70, 80 and 150 until they are fed to that data selector 92.

This data selector 92 is fed through its terminal 93 with the aforementioned region signal and is so controlled it selects the image data at the side of the signal processor while it is being fed with the region signal.

The unprocessed or signal-processed image data, i.e., the density data are binary-coded, in this example, by a multivalue encoder 94.

In this binary case, too, the threshold value for the binary coding is selected depending whether the document is a photography or a line drawing. The threshold value selecting signal should be contained in the processing designating signal.

Of the signal processings described above, the magnifying/reducing processings will be described by way of example in the following.

Figure 26:
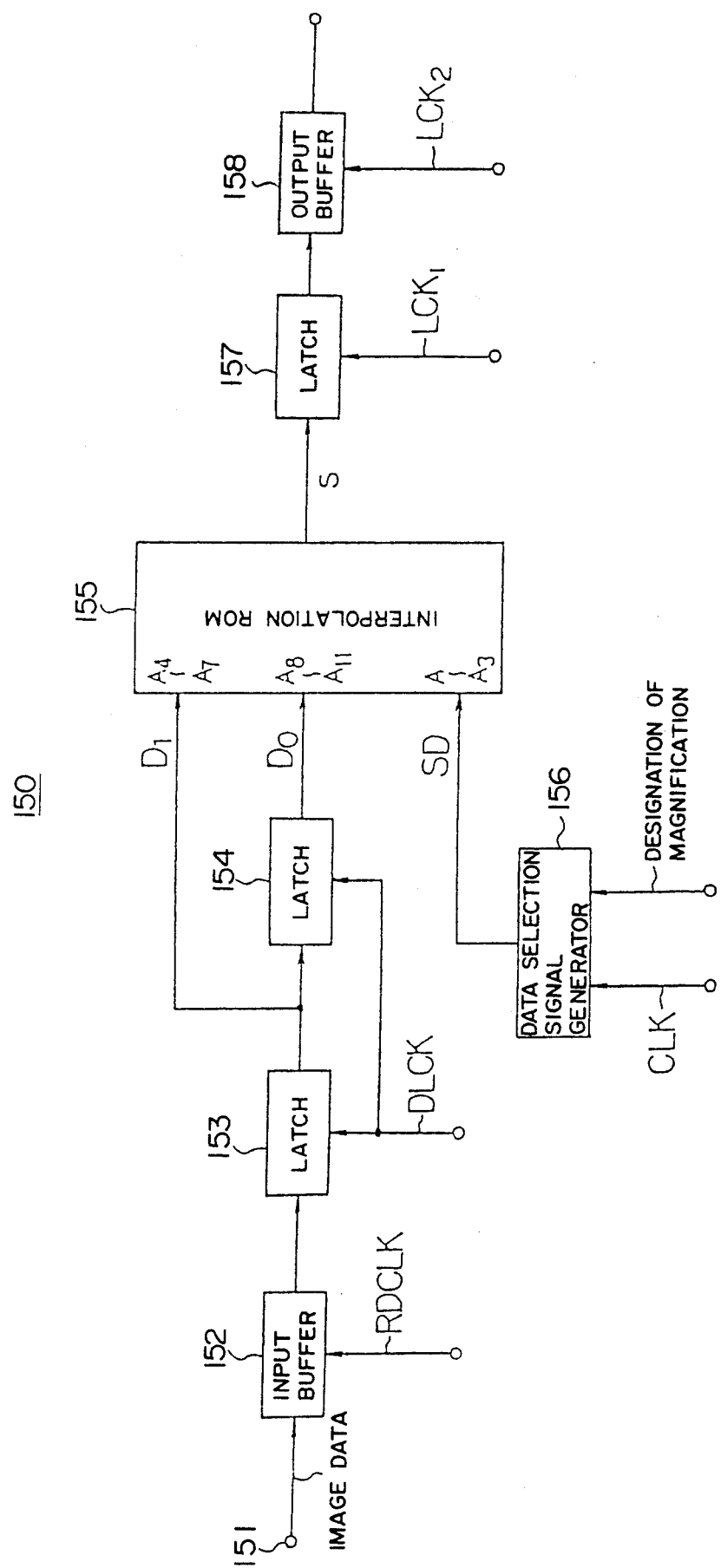
FIG. 26 is a block diagram showing a magnifying/reducing circuit.

FIG. 26 is a block diagram showing one example of the magnifying/reducing circuit 150.

This example is directed to the case in which the magnification/reduction can be accomplished at the pitch of 1.0% from 0.5 to 2.0 times.

In the present invention, basically, the magnification is effected by increasing the image data, and the reduction is effected by the interpolation of thinning out the image data. Moreover, the magnification/reduction in the main scanning direction is accomplished by the electric signal processing, and the magnification/reduction in the auxiliary scanning direction (in the rotating direction of the photosensitive drum 41) is accomplished by changing the moving velocity of the CCDs 7 and 8 or the image informations while the exposure time periods of the CCDs 7 and 8 being held constant.

The original image is magnified, if the moving velocity in the auxiliary scanning direction is decelerated, but is reduced if the same is accelerated.

The image data fed to a terminal 151, i.e., the density data are fed through an input buffer 152 to latch circuits 153 and 154 connected in tandem so that they are latched.

The image data D0 and D1 thus latched by the latch circuits 153 and 154 are used as address data for a memory (which will be called the "interpolation ROM" because it uses a ROM) 155 for the interpolation data.

The interpolation ROM 155 is stored with the data after the magnification/reduction, which are selected in accordance with the magnification/reduction ratio.

The input buffer 152 is provided for the following reasons.

For the first reason, in the magnification, the number of the image data to be used increases to a larger number than that before the magnification so that the processing rate after the increase in the data may be effectively enhanced without increasing the frequency of a fundamental clock.

For the second reason, the image being magnified is recorded with reference to its center.

The interpolation ROM 155 is an interpolation data table which is stored with image data (which will be called the interpolation data S) having a new intermediate tone level to be referred to by two adjoining image data.

In addition to the aforementioned paired latch data D0 and D1, interpolation selection data SD are utilized as the address data of the interpolation ROM 155.

Reference numeral 156 designates interpolation data selecting means stored with the interpolation selection data SD.

The interpolation selection data SD are used as the address data for determining which data of the data table group selected by the paired latched data D0 and D1 are to be used as the interpolation data. As a result, the interpolation selection data SD are determined in accordance with the set ratio for the magnification/reduction, as will be described hereinafter.

FIG. 27 presents one example of the interpolation data S to be selected according to the latch data D0 and D1 and the interpolation selection data SD. In the embodiment, the data D0 and D1 are linearly interpolated to produce the interpolation data.

In FIG. 27, letter S designate the interpolation data (of 4 bits) to be outputted at 16 gradation levels. Since the image data D0 and D1 to be used as the latch data have 16 gradation levels, the interpolation data S contains data blocks of $16 \times 16 = 256$.

For D0=0 and D1=F, as shown, the theoretical values (of five figures below decimal point) by the linear interpolation at each step and the values of the interpolation data S actually stored are tabulated for the positive and negative gradients, respectively.

As a matter of fact, the interpolation data S are stored in the form, as tabulated in FIG. 28. However, these data exemplify the case of D0=4 and D1=0 to F.

In FIG. 28, letters ADRS designate a base address, and there are tabulated for D0=4 the relations between the interpolation selection data SD (i.e., the data 0 to F arranged transversely) when D1 takes the levels from 0 to F and the interpolation data S to be outputted. The addition of the address data ADRS and the values of the interpolation selection data SD on the abscissa provide the actual addresses for the interpolation ROM 155.

The interpolation data S outputted from the interpolation ROM 155 are latched by a latch circuit 157 and are then fed to an output buffer 158.

The output buffer 158 is provided for processing the ineffective data which are generated as a result of the reduction in the image data when the image is to be reduced and additionally for recording the image to be reduced with reference to the center of the recording paper 46.

FIG. 29 presents the relations between the individual sampling positions and the interpolation selection data SD to be used for magnifying the image. The data are exemplified at a magnification M=160% (i.e., 1.6 times), which can be set at a pitch of 1%. Since, at the magnification ratio of 160%, the sampling interval is 100/160 (=0.62500), there are presented the relations between the sampling positions (of theoretical values) for the original data positions and the interpolation selection data SD to be referred to for the sampling.

In the interpolation selection data SD in the original data position "0", the former data (O) are the interpolation selection data SD when the sampling position is (0.00000), and the latter data (A) are the interpolation selection data SD when the sampling position is (0.62500).

Where the original data positions are 2, 4, 7 and 9, the latter interpolation selection data SD have no value. This indicates that the data are not increased by the magnification but only one data is present for that period. These data are actually stored in the states, as presented in FIG. 30.

In the data to be referred to by the base address ADRS (on the ordinate) and the step number (on the abscissa), as shown in FIG. 30, the lefthand data present the interpolation selection data SD, and the righthand data present the clock control signals of the input buffer 152 and the output buffer 157.

FIG. 31 presents a portion of the data table of the interpolation selection data SD to be used for reducing the image. The exemplified data are directed to the case in which the reduction ratio M is 80%. In FIG. 31, asterisks indicate the thinned (ineffective) data. As a matter of fact, the data are stored in the memory in the state, as shown in FIG. 32. Only the asterisked data have a bit 1="0", as presented at "05" in FIG. 31.

Next, the aforementioned magnifying/reducing operations will be described in detail first as to the magnification in the following with reference to FIGS. 33 and later. For convenience of description, the magnification M is assumed to be 160%.

Figure 33:
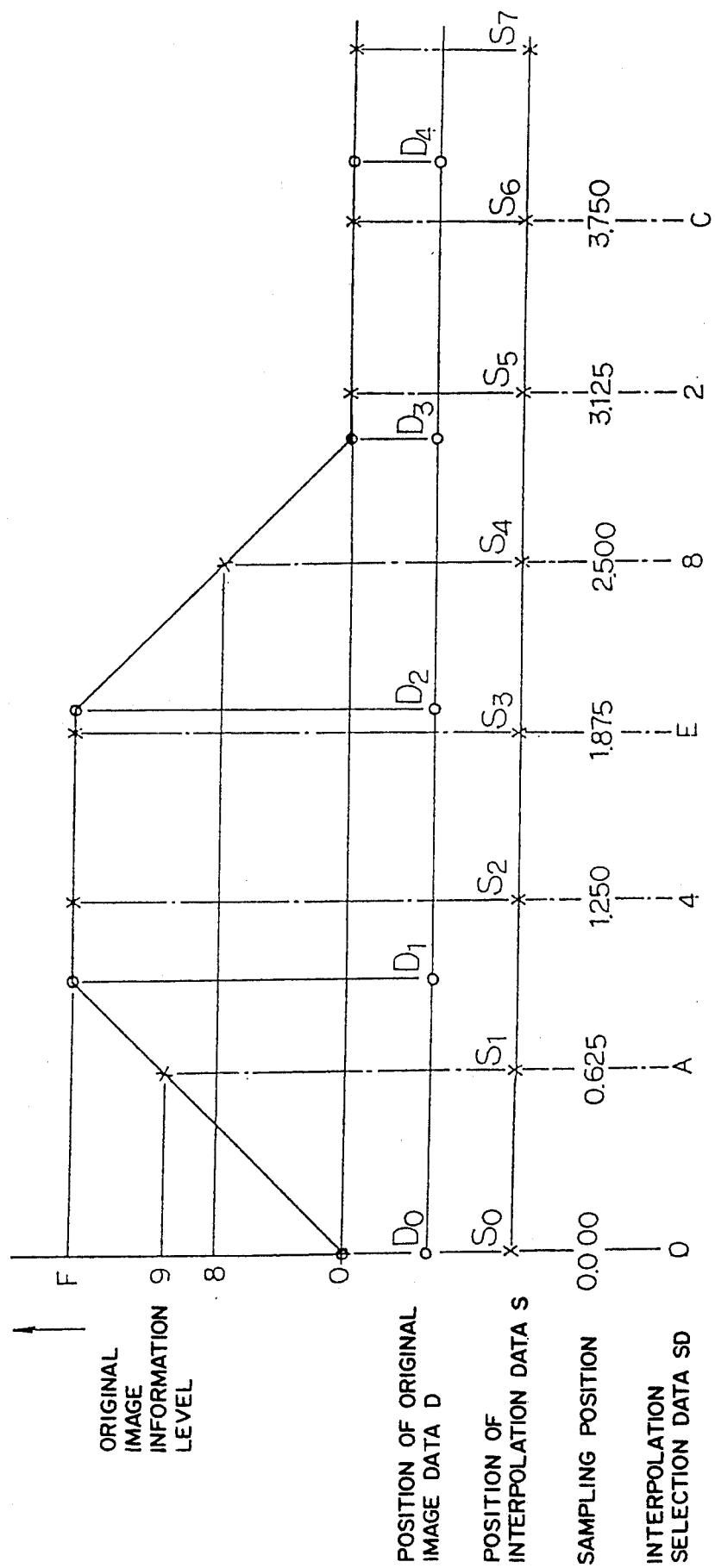
FIG. 33 is a diagram showing an image signal to be used for explaining the image magnification.

FIG. 33 analogly illustrates the relation between the original data and the interpolated data. In FIG. 33, letter D designates the original data, and letter S designates the converted data after the interpolations (i.e., the interpolated data).

The relations between the image information levels and the interpolated data at this time are tabulated in FIG. 30. Moreover, the relations between the sampling pitches and the interpolation selection data SD at this interpolation are tabulated in FIG. 29.

The timing charts of the signals at the individual portions at this interpolation are illustrated in FIGS. 34A to 34K.

The original image data obtained from the CCDs 7 and 8 are designated at D0(0), D1(F), D2(F), D3(0) and D4(0) (the parenthesized characters designate the gradation levels of the individual image data).

When a read clock RDCLK is fed to the input buffer 152, the image data D are outputted (as shown at A and B in FIG. 34) after an access time t1 and are latched (as shown at C in the same Figure) at the latch clock DLCK. When the image data D1(F) are outputted from the latch circuit 53 in synchronism with the latch clock, the image data D0(0) are outputted (as shown at D and E in the same Figure) from the latch circuit 54.

Incidentally, the latch pulses are delayed by one cycle from the synchronization clock.

In accordance with the magnification signal externally set, on the other hand, the data table presented in FIG. 32 are referred to. Then, the interpolation selection data SD of 0 ; A ; 4 ; E ; - - - (as shown at F in FIG. 34) are outputted.

As a result, the necessary interpolation data S (as shown at G in the same Figure) are outputted from the interpolation ROM 155 such that the interpolation data table is referred to with the image data D0 and D1 and the interpolation data SD. Therefore, the interpolation data S are $0(S_0)$, $9(S_1)$, $F(S_2)$, $F(S_3)$, $8(S_4)$, $0(S_5)$, - - - .

The interpolation data S thus read out are sequentially sent to the latch circuit 157 (as shown at H and I in the same Figure). The binary-coded interpolation data S are written in the output buffer 158 in response to the clock LCK2 (as shown at J and K in the same Figure).

Figure 34:
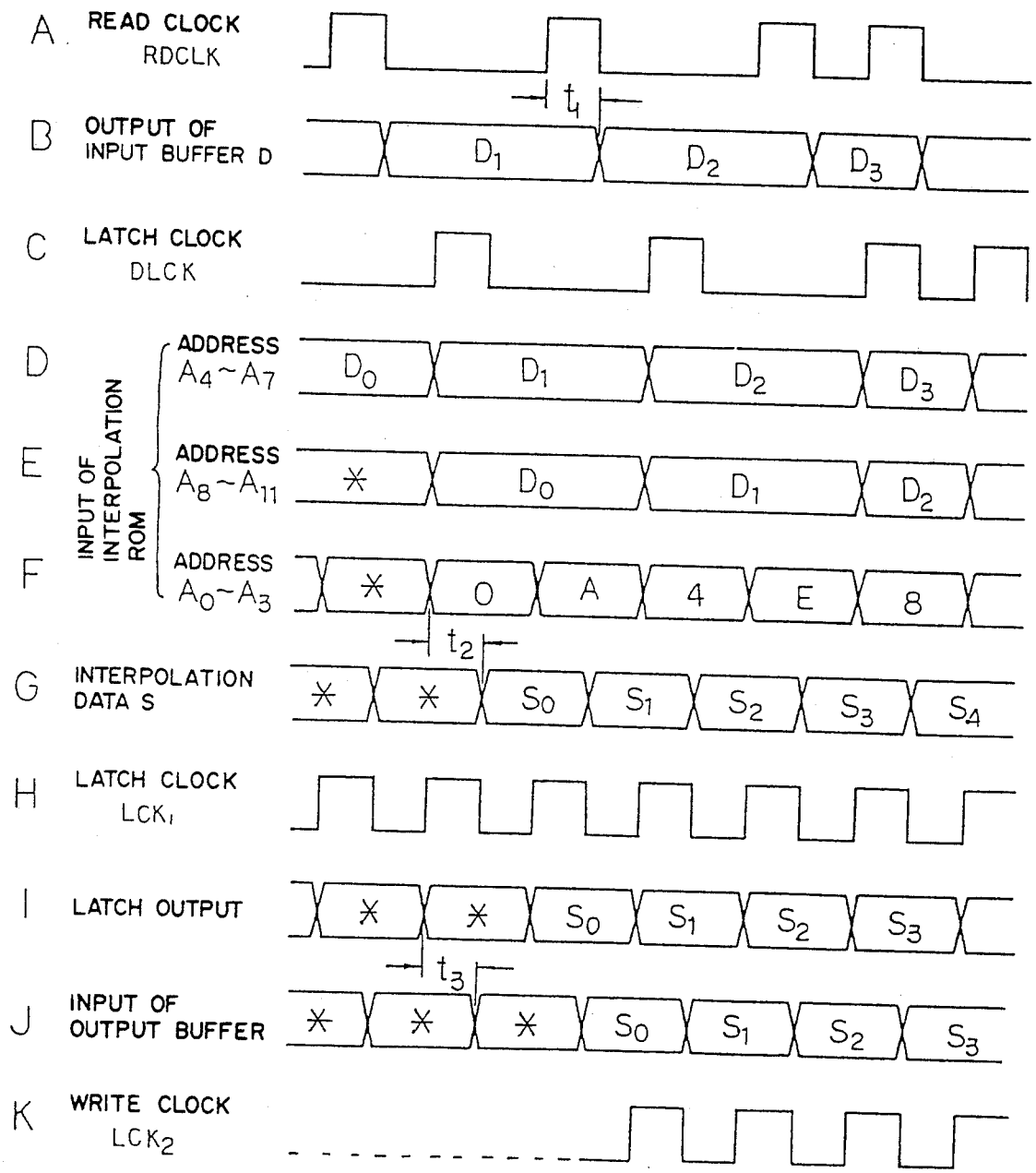
FIG. 34 is are waveform chart to be used for explaining the operations of the image magnification.

Incidentally, in at A to K in FIG. 34, characters t2 designate the access time of the interpolation ROM 155, and characters t3 designate the access time of the multivalue encoder 94.

Next, the reduction will be described in the following.

FIG. 35 analogly illustrates the image signal in case the reduction is set at 80% (i.e., 0.8 times). The image data D0, D1, D2, D3, - - - are designated by circles, and the interpolation data S0, S1, - - - are designated by X.

Figure 36:
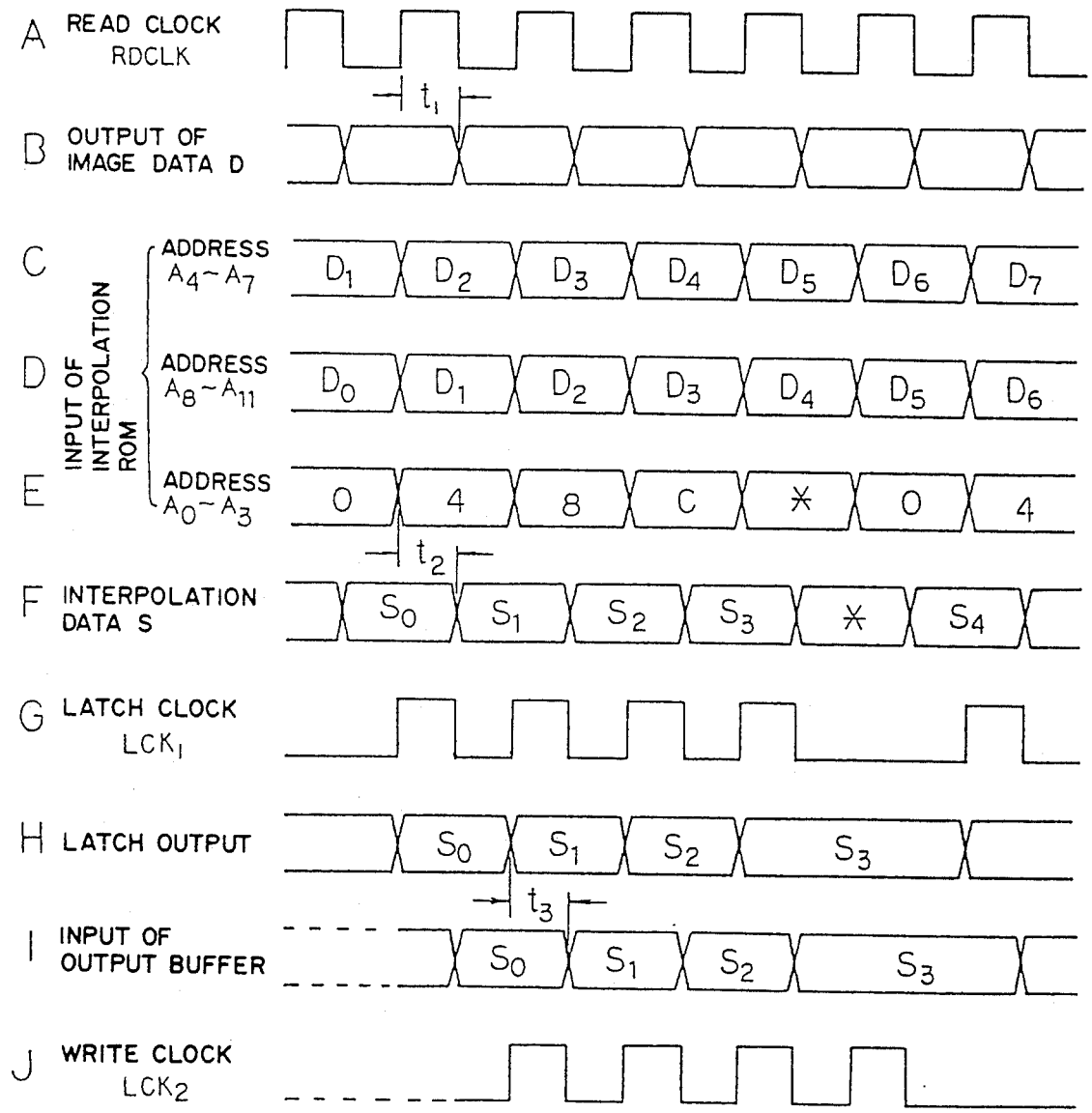
FIG. 36 is waveform chart to be used for explaining the operations of the image reduction.

Letters A to J in FIG. 36 are timing charts showing the signals for the reduction. The relations between the original image data D and the interpolation data S to be used for the operation are presented in FIG. 32, and the relations with the interpolation data SD are presented in FIG. 31.

The gradation levels of the image data are set at the same levels as those of the case for the magnification.

Moreover, it is identical to the aforementioned case of magnification that the two adjacent image data (e.g., the image data D1 and D0) are fed as the address signal from the latch circuits 153 and 154 to the interpolation ROM 155.

In the case of the reduction, the read clock RDCLK and the latch pulse DLCK have the same frequency as that of the synchronization clock, and the data, as shown in FIG. 31, are selected as the interpolation selection data SD. Therefore, the relations among the signals from the input buffer 152 and the interpolation ROM 155 are illustrated at A to F in FIG. 36.

Since the latch pulses LCK1 accordingly take the form illustrated at G in the same Figure, the latch output takes the form illustrated at H in the same Figure.

Since the write clock LCK2 has the same frequency as that of the latch pulse LCK1, the data, as illustrated at I in the same Figure, are written in the output buffer 158.

If, in the aforementioned embodiment, the factor of magnification/reduction is changed, the interpolation selection data SD are accordingly changed so that the inerpolation ROM 155 is accordingly addressed to output the corresponding interpolation data S, as will be apparently understood.

As has been described hereinbefore, according to this embodiment, the instructed image processing (for magnification/reduction, for example) can be accomplished by using as the unit the region which is designated with a closed loop of arbitrary shape or by the smearing-out.

Moreover, the color conversion will be described as another example of the image processing with reference to one example of the color image processing apparatus of FIG. 37 and later.

Figure 37:
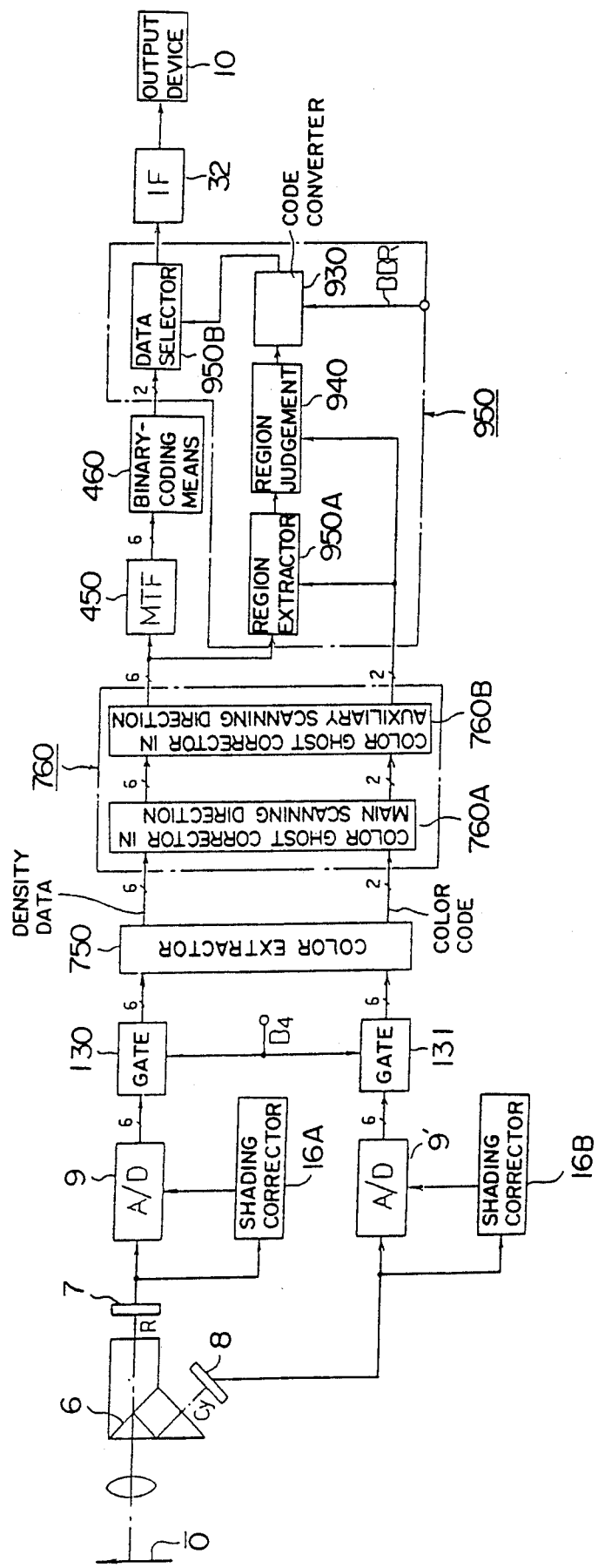
FIG. 37 is a block diagram showing an example of the whole system to be used for schematically explaining a color image processing apparatus according to the present invention.

In FIG. 37, the process to the color ghost correction is shared with that of the preceding embodiment.

The density data of 6 bits are converted to data (or binary data) of 1 bit at 1 and 0 by binary-coding means 460. The threshold data (of 6 bits) for providing the reference for the binary-coding are set manually or automatically.

The color-extracted density data are further fed to partial color conversion means 950 so that the color conversions are executed.

This partial color conversion is an image processing for the inside of the closed region (or outside of the closed region although the inside is exemplified in the embodiment), which is designated in a certain color, in the designating color.

The designation of the closed region is accomplished with a color marker of a color such as red or blue.

The means 950 for realizing the color conversion of the region-designated portion is composed of: a region extractor 950A for detecting the original image region marked with the color marker; a region judging circuit 940 for judging the designated region in accordance with the region signal extracted; a code converter 930 for converting the color code data in the extracted region into those of the designated color; and a color data selector 950B for selecting a binary output corresponding to the converted color code data.

The selected binary data are fed through the interface circuit 32 to an output device 10 so that the image informations in the corresponding closed region are recorded in the designated color.

The black informations in the region enclosed by a red marker, for example, are so controlled that they are outputted at the copy sequence for recording the red color. Thus, the inside of the region can be recorded in the designated color.

This partial color conversion, that is to say, the color designation of the inside of the closed region can be suitably applied to the copy system known in the prior art employing the color development system, in which the developments are accomplished by rotating the drums in different colors until the fixing operations are accomplished when the development of the final color is completed.

The image data thus processed are transferred through the interface circuit 32 to the output device 10.

The output device 10 to be used can be exemplified by one similar to that of the foregoing embodiment.

As shown in FIG. 38, the binary-coding means 460 is constructed of: threshold selection means 460A stored with predetermined threshold value data (of 6 bits); and a binary-encoder 460B composed of a binary-encoding comparator.

The threshold selection means 460A is caused to select the threshold data manually or automatically. The threshold value data to be used are those corresponding individual recording colors. For this, there is fed the BBR signal for discriminating what color is being recorded. In this example, moreover, the density selection signal set from the outside is fed so that the according threshold value data are selected.

Figure 40:
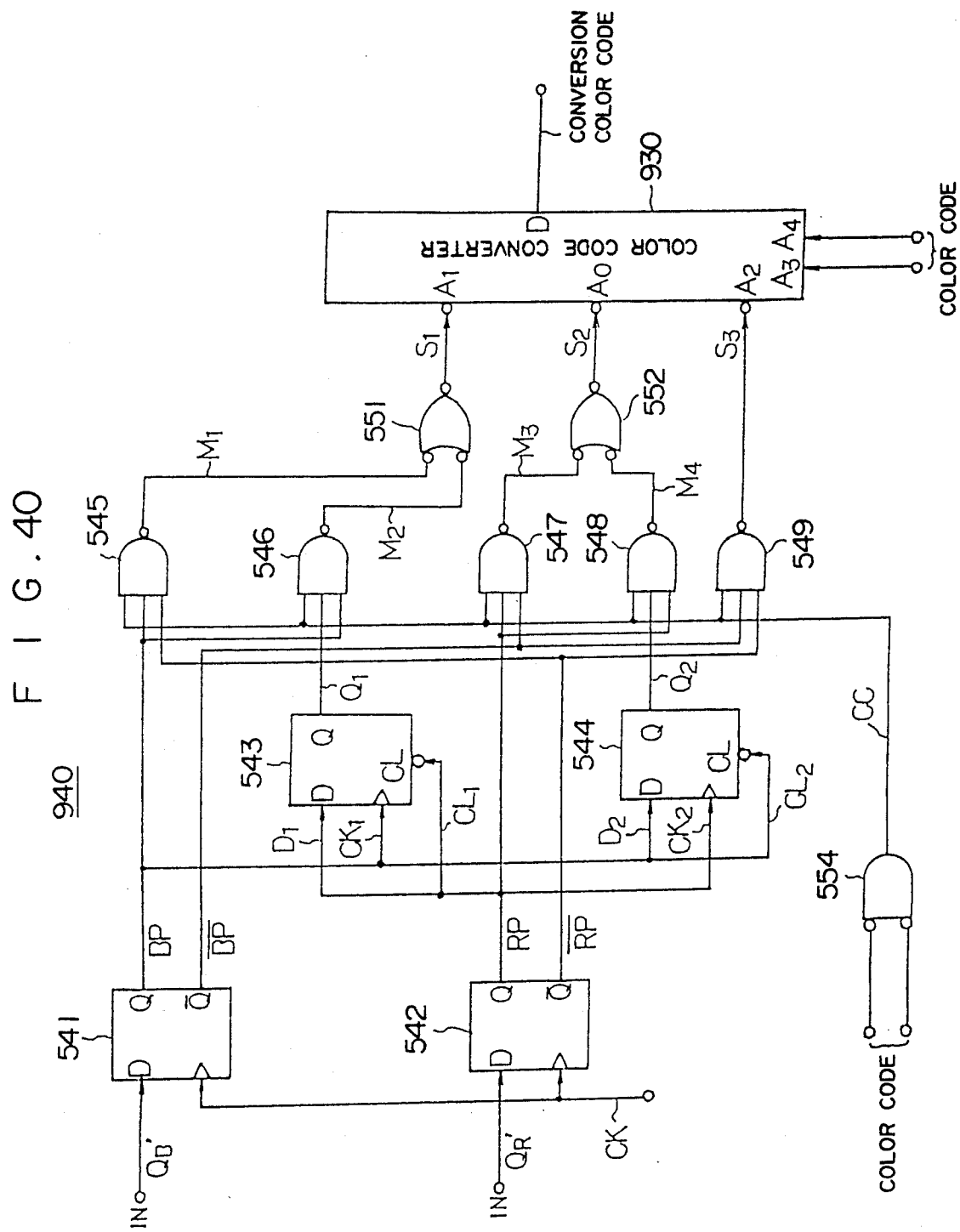
FIG. 40 is a circuit diagram showing a region judging circuit and a color code converter.

The schematic structure of the region extractor of FIG. 37 is shown in FIG. 39 so that the region signals QB' and QR' obtained at the respective output terminals of a region extractor 520 are fed to a region judging circuit 940 shown in FIG. 40.

The region judging circuit 940 provides control means for controlling the region signal for causing the image to be recorded, as shown at B in FIG. 41, when the marker designation is shown at A in the same Figure.

Specifically, the region judgement signal S of the density data is so produced from the region signals QB' and QR' that a black and white image is recorded in sections I and V, that a black image is recorded as a red one in sections II and IV and that a black image is recorded as a blue one in a section III.

The region judging circuit 940 has four flip-flops 541 to 544. The region signals QB' and QR' latched by the flip-flops 541 and 542 at the front step are fed to corresponding NAND circuits 545 to 548, and the region signals QB' and QR' latched by the flip-flops 543 and 544 at the back step are fed to the corresponding NAND circuits 545 to 548. Moreover, the individual NAND circuits 545 to 548 are fed with color code data CC in black through an AND circuit 554.

Therefore, the signal relations on a scanning line n shown in FIG. 41A are illustrated at A to L in FIG. 42 and at A to T in FIG. 43.

FIG. 42 illustrate at A to D what FF outputs Q1 and Q2 (at H and L in the same Figure) are obtained by inputting the region signals BP and RP.

In response to the signals shown at A to C in FIG. 43, on the other hand, a first NAND output M1, as shown at D in the same Figure, is obtained from the first NAND circuit 545. Likewise, the second NAND circuit 546 generates a second NAND output M2, as shown at G in the same Figure, in response to the input signals, as shown at E and F in the same Figure. As a result, the first AND circuit 551 outputs a blue region judgement signal S1 relating to the section III, as shown at H in the same Figure.

Likewise, a third NAND output M3 at L of the same Figure is obtained from the input signals at J to K of the same Figure, and a fourth NAND output M4 at O of the same Figure is obtained from the input signals at M and N of the same Figure. As a result, the second AND circuit 552 outputs a red region judgement signal S2 (as shown at P in the same Figure) relating to the sections II and IV.

In response to the input signals at Q to S of the same Figure, moreover, the fifth NAND circuit 549 outputs a black region judgement signal S3 (as shown at T in the same Figure) corresponding to the regions I and V.

These region judgement signals S1 to S3 are fed together with the color code data to the color code converter 930.

This color code converter 930 is constructed of a ROM to refer to the conversion color code data which are stored at the address determined according to the region judgement signals S1 to S3 and the color code data.

The relations between the color code data and the corresponding colors are presented in FIG. 44.

Moreover, the color code converter 930 converts the image data existing in the individual color regions into the color code data exhibiting the corresponding colors, and the data table of the ROM is presented in FIG. 45. For the outside of the designated region, ordinary color code data exhibiting black and white are outputted.

The conversion color code data are fed to a coincidence detector 581, as shown in FIG. 38, so that they are selected if they are identical to the BBR signal indicating the copy sequence.

The coincidence detector 581 is constructed of a ROM, as tabulated in FIG. 46. The output signal Q is fed to and controlled by output control means 582 so that it is not outputted when binary data ("1") exhibiting white are outputted.

The output control means 582 can be constructed of a ROM. Therefore, if the binary data are designated at P and if the output of the control ROM 582 is designated at R, the ROM content is so set that the signals P, Q and R take the relations, as presented in FIG. 47.

The output control means 582 may be constructed of a logical arithmetic circuit in place of the ROM.

The copying operations when a designated region is detected are similar to those of the foregoing embodiments.

On the other hand, the output device 10 may be equipped with a memory so that the conversion color code data may be once stored for the whole picture and then outputted.

In case, moreover, the output device is exemplified by recording heads of different colors (e.g., ink jet type recording heads), the whole picture can be recorded by a single document reading scan.

If the image processing thus far described is applied to the present invention, the inside or outside of the closed region designated in a specified color can be recorded practically conveniently.

Since, moreover, the color codes of the color signals corresponding to the image inside or outside of the designated region, they can be stored directly in a memory or the like and then used to reproduce the original image in the designated colors. These conversion color data can also be used as the color signals for the CRT.

A concrete method for the image processing will be described in connection with another example.

In this example, a marker color (which is exemplified by blue/red (orange) colors of a fluorescent pen) is detected. After this, the inside/outside of the region enclosed in the marker color is discriminated so that the processings of the color information and the density information may be accomplished inside/outside of the region in accordance with the region signals obtained from the discrimination. The data thus processed are multivalue coded and outputted through the interface circuit of the recording unit to the output device, as has been described.

According to this example, the following partial operations:

a) Change-over of multivalue coded threshold values of intermediate tone/letter reproduction;
b) Change-over of propriety of MTF correction for improving letter/node reproduction;
c) Change-over of the same size and magnification (enlargement/reduction);
d) Change of gamma of intermediate tone image;
e) Screening;
f) Smearing-out;
g) Inversion;
h) Mirror image; and
i) Combination of above-specified operations, can be combined with the following partial operation:
a) Conversion/erasure of colors.

Figure 58:
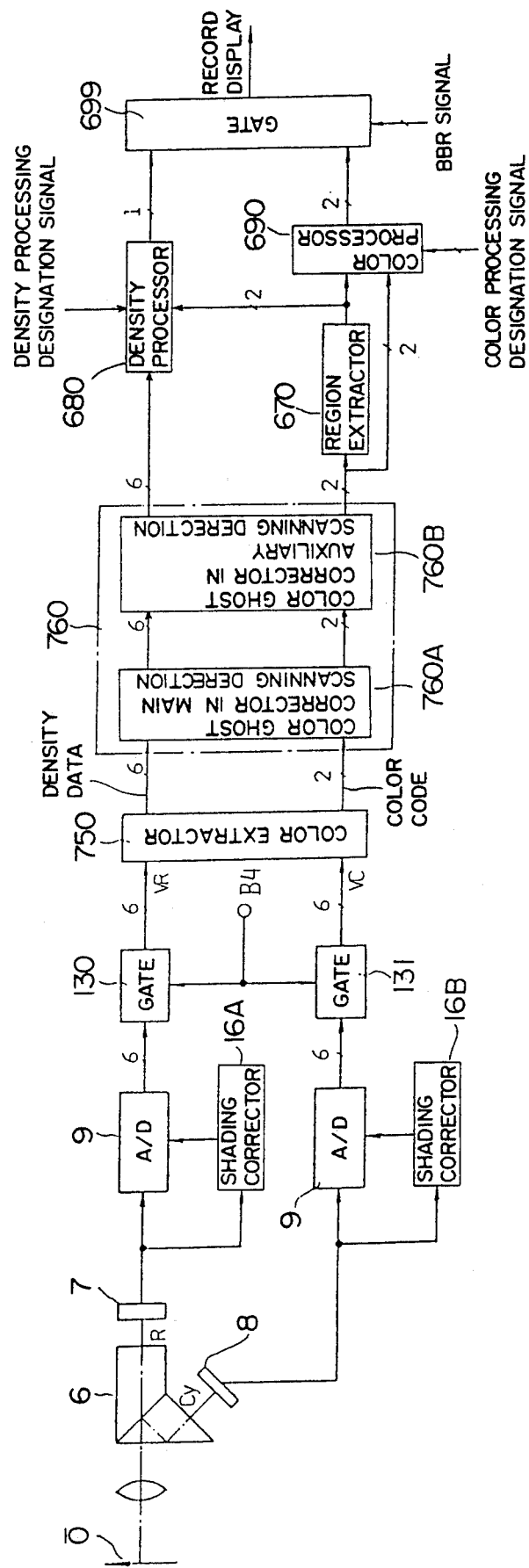
FIG. 58 is a block diagram showing an example of the schematic structure of the image processing apparatus of the present embodiment.

An example of processing the two informations, i.e., the color codes after the color extraction and the density information independently of each other will be described in the following. FIG. 58 is a block diagram showing this example.

The data having its color ghosts corrected are processed in the following manner.

The signal (i.e., the region signal) indicating the region enclosed with the color marker is outputted from a region extractor 670 and is used for the color processing.

A density processor 680 processes the density information of the image inside/outside of the afore-mentioned region in accordance with the density processing designation signal instructing what image processing should be conducted from the display/control unit.

The density/color signals thus processed are selected in a gate circuit 699 by using the signal (i.e., the BBR signal) designating the color to be recorded/displayed at present, so that only the necessary data are fed to the interface circuit of the recording/display unit.

Next, the color processing will be described in the following. In case the conversion is to be accomplished for all, i.e., in case the color conversions are to be accomplished from red to blue and vice versa, it is sufficient to make a control such that red image data are outputted for the blue recording whereas the blue image data are outputted for the red recording. In case, on the other hand, a partial color conversion is to be executed for a document of black/white, the black information in the region enclosed with the color marker is recorded in the color of the marker. If, for example, the black information of the region enclosed with a red marker is to be outputted in the phase for recording the red color, the inside of the region can be recorded with a partial color conversion.

As in the present embodiment, it will be apparent to those skilled in the art that there is no necessity for limiting the color change to that to the same color of the color marker and the document color to the black. For example, it is possible to make a partial change of red - blue. The color codes are presented in the following Table:

TABLE 1

| | |
|---|---|
| 00 | Black |
| 01 | Blue |
| 10 | Red |
| 11 | White |

With this color codes, in case the marker region is expressed by two region signals of red marker/blue marker, the data, as presented in the following Table, are outputted from the color processor in the case of a) if the following two cases are considered:
a) Black - Red: Designation Code 10; and
b) Black - Blue: Designation Code 01,

TABLE 2

| Input Color Code | Red Marker Region | Color Processing Designation Signal | Output Color Code |
| --- | --- | --- | --- |
| 00 | 00 | 0 | 00 |
| 00 | 00 | 1 | 00 |
| 00 | 10 | 0 | 10 |
| 00 | 10 | 1 | 00 |
| 11 | 00 | 0 | 11 |
| 11 | 00 | 1 | 11 |
| 11 | 10 | 0 | 11 |
| 11 | 10 | 1 | 11 |

Next, the density data processing circuit is exemplified in FIGS. 25 and later. FIG. 25 is a block diagram showing the whole structure of this processing circuit, as will be individually described.

(1) Gamma Correction

This gamma correction is accomplished by looking up the table, as represented by FIG. 59. In FIG. 59, a curve (a) corresponds to $\gamma=1$ for "Input Data=Output Data". On the other hand, a curve (b) corresponds to $\gamma>1$ for white - black. Another curve (c) corresponds to $\gamma<1$ and can be used for a smooth tone. Usually, about eight kinds of correction curves may be prepared depending upon the object of use. Then, a photographic image of wide range can be cared to form a clearly visible image.

A corresponding circuit is shown in FIG. 60. There are stored in the gamma correcting ROM 60 eight kinds of different gamma curve data in the form of tables, one of which is selected by the use of a gamma correction curve selection signal of 3 bits to accomplish the gamma correction of the input data. This ROM 60 is usually exemplified by a bipolar ROM. However, a high-speed static RAM may be used to prepare the correction data with the CPU after the gamma correction curve selection signal has been detected. Then, the data may be written in the static RAM, followed by the gamma correction.

The gamma correction curve selection signal is switched by a not-shown key switch or the like. In this case, however, a blue/red marker may be used as a special color so that the marker region signal can be used as the gamma correction curve selection signal for establishing $\gamma>1$ in the blue marker region and $\gamma<1$ in the red marker region.

Since the gamma correction can be partially accomplished after the region detection, as described above, a clearly visible image can be formed.

(2) Selection of Multivalue Coded Threshold Value

As shown in FIG. 61, a photographic portion Z in a document O is enclosed in a region designation color (of a color marker) b and is detected. After this, the gradation is outputted by binary-coding the non-region designation portion (i.e., the non-marker portion) with the single threshold data, as presented at B in FIG. 62, and by binary-coding the region designation portion (i.e., the marker portion) with the threshold value, as presented at B in the same Figure. Thus, the threshold value can be switched depending upon the designated region portion (or the marker region) so that even the image having letters and a photograph mixed therein can be processed without causing any image deterioration.

Figures 62A, 62B, 63:
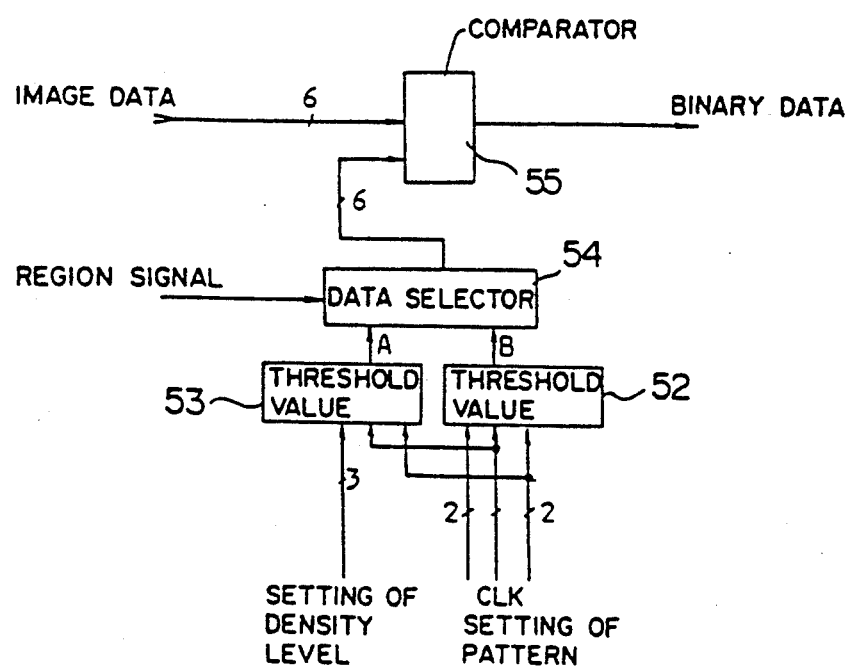
FIGS. 62A and 62B are diagrams showing threshold values for binary coding.
FIG. 63 is a diagram showing a binary coding circuit.

As shown in FIG. 63, moreover, the data at A of FIG. 62 can be stored as a threshold value circuit 52, and the data at B in the same Figure can be stored as a threshold value circuit 53. Since, at this time, the threshold values are incorporated into the matrix of 4×4, the addresses are repeatedly designated by using a cycle counter of 2 bits for designations of lines/columns. If no region designation signal comes, the threshold value circuit 53 is selected by a data selector 54 so that the letter portion is binary-coded by the threshold value circuit 53. If the color marker portion is detected so that the region signal is outputted, the data selector 54 selects the threshold value circuit 52 to reproduce the photographic image. Numeral 44 designates a binary-coding comparator.

Thus, the reproduction of a mixed image can be accomplished without causing any image deterioration. For the threshold value circuit 53, in this case, different threshold values can be selected depending upon the density level designation signal. For the threshold value circuit 52, moreover, a threshold matrix of different patterns can be selected depending upon the pattern setting signal. The threshold value circuits 52 and 53 can be constructed of a bipolar ROM or the like. Incidentally, the gamma conversion can be accomplished simultaneously with the multivalue coding if the data of the threshold value ROM in the threshold value circuits 52 and 53 are devised. Other examples of the threshold values of the threshold value circuit 53 are presented at A and B in FIG. 64, and other examples of the threshold values of the threshold value circuit 52 are presented at C and D in FIG. 64.

(3) Screening

Figure 66:
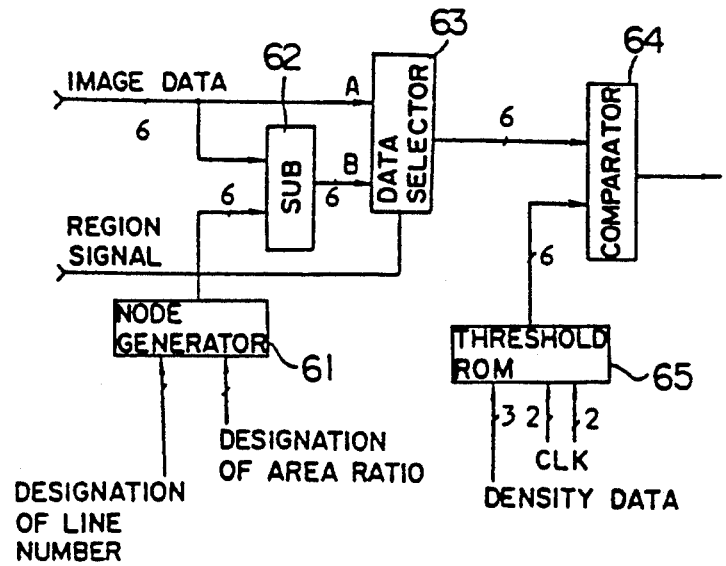
FIG. 66 is a diagram showing a circuit for the screening processing.
Figure 67A:
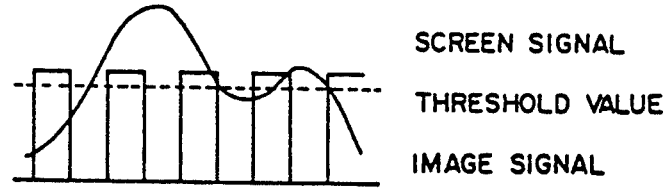
FIGS. 67A to 67D are waveform charts for explaining the screening processing.
Figure 67B:
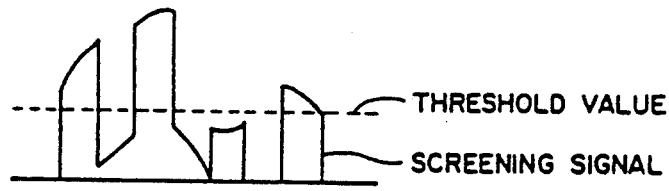
Figure 67C:
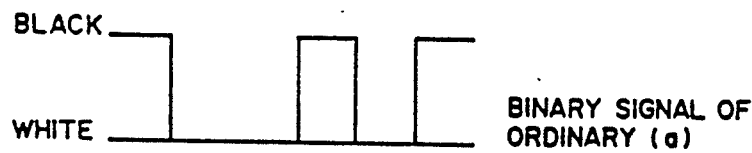
Figure 67D:
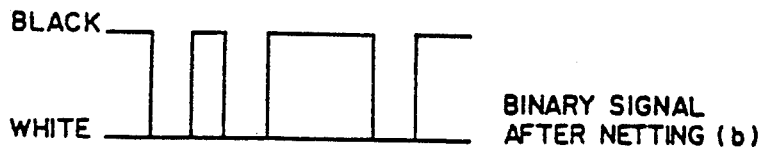

This screening is the "tinting" processing, as shown in FIG. 65, and a special processing for screening a texture, as shown in FIG. 66 and at A to D in FIG. 67.

A node generator 61 outputs a screen pattern signal of constant area ratio with a constant wire number. In response to this screen pattern signal, a SUB circuit 62 screens an image signal. The two image signals thus screened and not are inputted to a data selector 63. In the undesignated region undesignated with the marker, the image data themselves are selected and binary-coded by a comparator 64. Numeral 65 designates a threshold value circuit for generating threshold data.

If the region signal comes, on the other hand, the image data screened are selected by the data selector 63 to generate a screened binary signal, as illustrated at A to D in FIG. 67.

The number of wires to be prepared may be 60 to 100. On the other hand, the area ratio may be 5 to 95% at a step of 5%. The node generator 61 may be exemplified by either the threshold value matrix, as presented at A and B in FIG. 62, or a function generator. The former using the threshold value matrix can be realized more easily. If the pattern (4×4) of FIG. 68 is used with a taking resolution of 16 dots/mm, a screen of 90 degrees can be realized at about 100 wires/inch. If, on the other hand, a pattern shown in FIG. 69 is used, a screen of 45 degrees can be realized at about 70 wires/inch.

Moreover, the area ratio can be varied by increasing or decreasing the number of data of "63" in the matrix of FIG. 68.

Incidentally, the SUN circuit 62 may be constructed of a ROM. In this case, a negative data processing can be accomplished if the output image signal=0 for "image data"- "screen signal" <0.

(4) Magnification

This magnification has been described hereinbefore.

(5) Extraction/Erasure/Smearing-out

An example is shown in FIG. 70, in which: a gate 71 is for extraction control; a gate 72 is for erasure control; and a gate 73 is for smearing-out control.

As has been described hereinbefore, according to the present invention, the image processings of the colors and densities of the region-designated or not portions can be simultaneously accomplished. As a result, the image processing function can be drastically improved.

Figure 55:
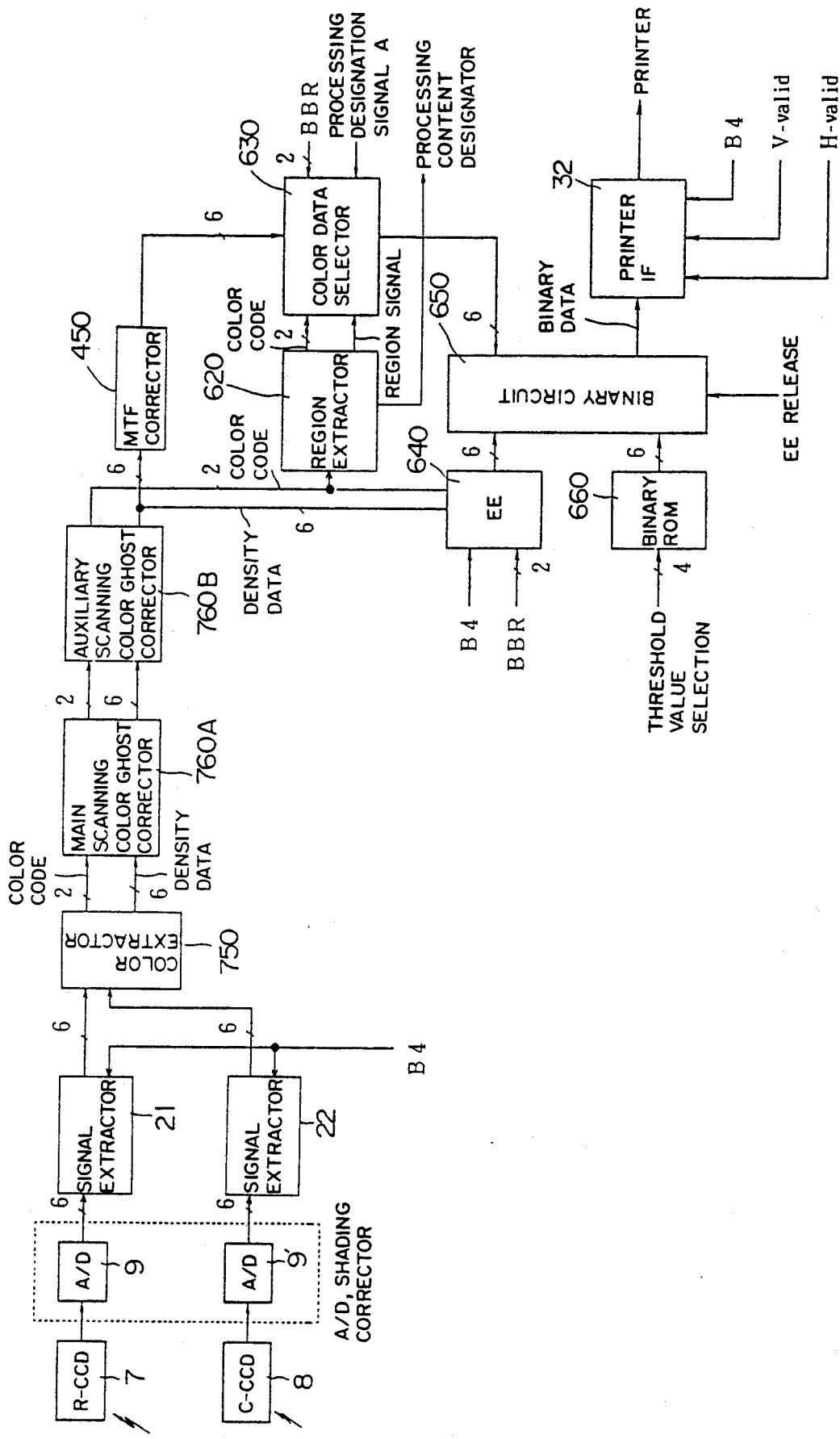
FIG. 55 is a block diagram showing one example of the color image processing apparatus.

Next, one example of a method of conveniently designating the aforementioned image processing content will be described in the following, as shown in FIG. 55. Reference numeral 620 designates an region extractor for extracting the information of the region designated in advance with a color marker from the information contained in the image data. When a specific color code is inputted, the region extractor 620 judges it as the information for designating the region. By the aforementioned method, moreover, the designated region is extracted, and the result is outputted as the region signal. Moreover, the color used for designating the region is discriminated, and the result is sent to the processing content designator. The color code and the region signal of the region thus extracted are inputted to a color data selector 630.

Figure 56:
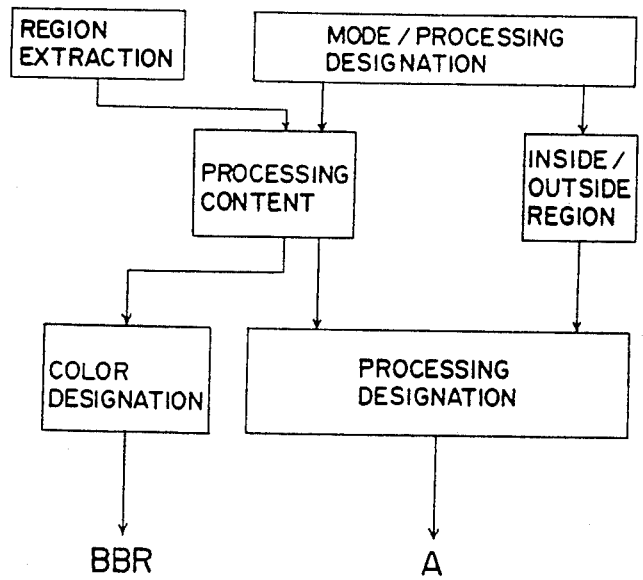
FIG. 56 is block diagrams showing example for generating a color designation signal and a processing designation signal.

This color data selector 630 is receiving the color designation signal BBR and the processing designation signal A and has its inside set in advance with the region designation color and the corresponding processing. Specifically, the marker color and the image processing function are preset in the relation of 1 : 1 such that: the magnififying/reducing processing is accomplished in case the color marker is red; the trimming processing (for extracting only the image of the designated region) is accomplished in the case of yellow; and the masking processing (for not introducing the image in the designated region) is accomplished in the case of blue. FIG. 56 is a block diagram for generating the color designation signal BBR and the processing designation signal A. In the mode/processing designating unit, the signals for designating the following operations are sent to the circuit for designating the inside/outside of the region and the circuit for designating the processing content, respectively:

① Whether the inside or outside of the region; and
② What processing should be accomplished.

The region inside/outside designator sends the signal designating the inside or outside of the region to the processing designation signal generator. The processing content designator receives from the region extractor 620 the signal indicating what color the region is designated in, to finally determine the processing content and sends to the processing designation signal generator the signal instructing the processing content. At the same time, the processing content designator designates whether or not the color conversion to the color designation signal generator. In the case of the color conversion, the processing content designator outputs to the color designation signal generator the signal indicating that color.

The processing designation generator outputs the individually instructed contents as the processing designation signal A. The color designation signal generator outputs a signal designating a recording color, when the color conversion is not designated. When the color conversion is designated, the color designation signal generator outputs a signal designating the recording color if the converted color is identical to the recording color. Otherwise, the color designation signal generator outputs the color designation signal BBR designating the OFF.

Figure 57:
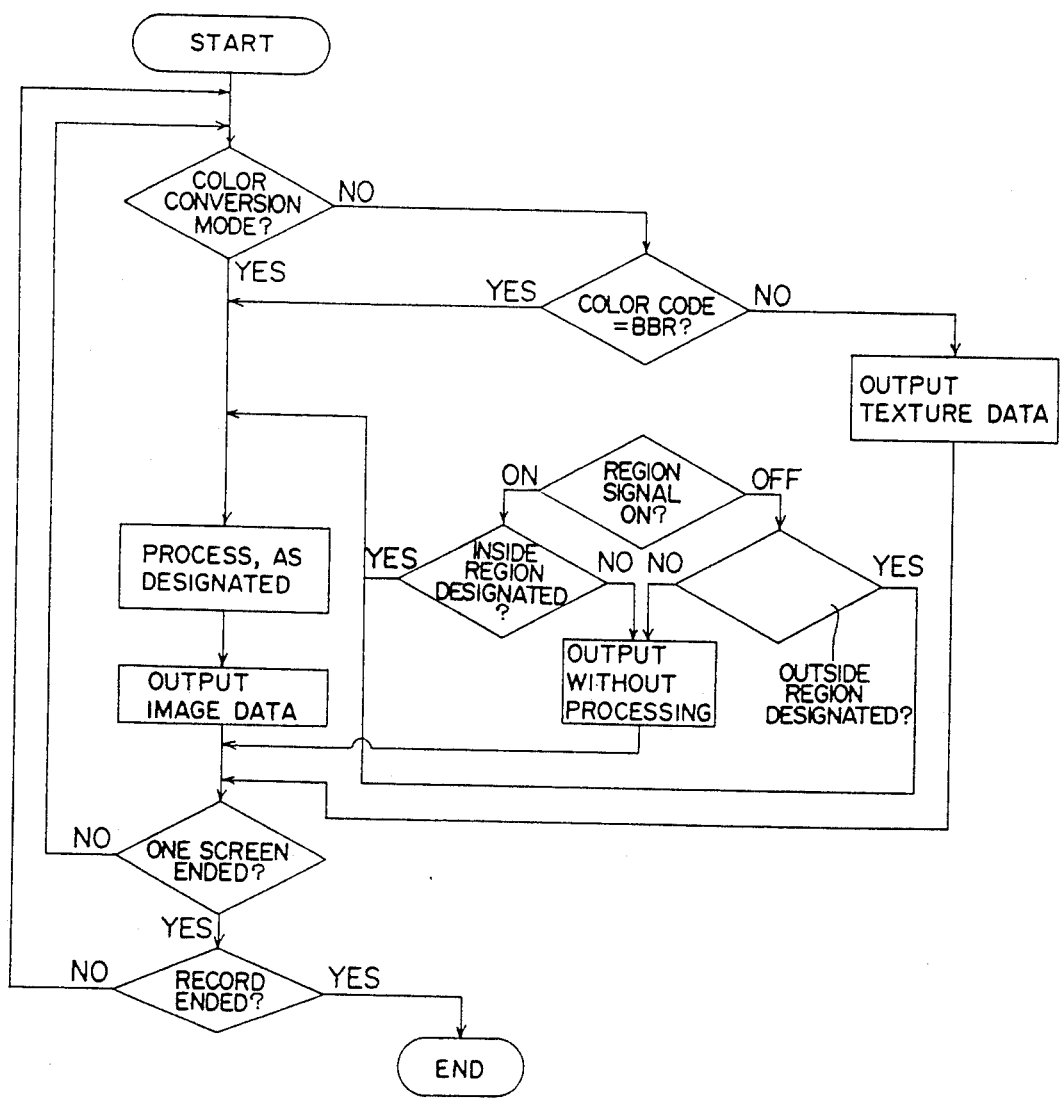
FIG. 57 is flow chart showing example of a color code selector.

The color data selector 630 operates according to the flow chart illustrated in FIG. 57.

(1) It is judged whether or not the color conversion mode is designated. If YES, the routine proceeds to the step (5).

(2) It is judged by the color designation signal BBR whether or not the color code is coincide.

(3) If NO, the image data corresponding to the texture are outputted. The routine proceeds to the step (12).

(4) If YES, the following steps are accomplished.

(5) It is judged whether or not the region signal is ON, i.e., whether or not within the designated region.

(6) It is further judged which of the inside or outside of the region is designated.

(7) If the region designation signal is ON so that the inside of the region is designated and if the region designation is OFF so that the outside of the region is designated, the routine proceeds to the step (8), and otherwise to the step (9).

(8) The density data of 6 bits are processed in accordance with the processing designation signal A. The routine proceeds to the step (10).

(9) The density data inputted are outputted as they are.

(10) The foregoing steps are accomplished one line for all the picture.

(11) The foregoing steps are accomplished the number of the colors to be recorded.

Reference numeral 640 designates an EE circuit for automatic density setting, and numeral 650 designates a binary-encoder for binary-coding in accordance with either the data outputted from the binary-coding ROM 660 or the data from the EE circuit 650. Numeral 32 designates an interface for a laser printer. Incidentally, the aforementioned setting of 1 : 1 between the color of the color marker and the image processing function can be made like the other density change and the MTF correction.

Next, an example of the concrete apparatus, in which the aforementioned region extracting function and image processing function are combined, will be described in the following.

This structure is shown in FIG. 55, from which will be omitted the description of the points shared with those of the foregoing embodiments.

In this color data selector 630, there is selected in accordance with the color designation signal BBR and the processing designation signal A the processing of how the extracted region is colored, whether or not the outside of the region is to be extracted, or whether or not an ordinary processing is to be accomplished without use of the signal from the region extractor 620. In other words, one of the mode for processing the image all over the surface of the document image and the mode for image processing inside or outside of a certain region of the document is roughly selected. In the latter mode, moreover, there are selected the magnification/reduction, the density change, the trimming and the masking.

Figure 71:
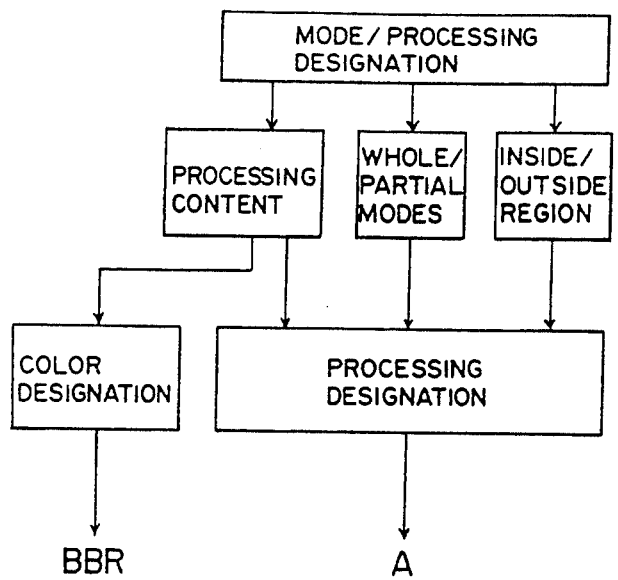
FIG. 71 shows a functional block diagram of a system of the present invention.

FIG. 71 is a block diagram for generating the color designation signal BBR and the processing designation signal A. The mode/processing designator sends the signals for designating the following items to the mode designator, the region inside/outside designator and the processing content designator, respectively:

① Which the mode is for the whole image designation or for the partial designation;
② Which inside or outside of the region; and
③ How processed.

The mode designator and the region inside/outside designator send the signals for designating the mode and the inside or outside of the region, respectively, to the processing designation signal generator.

The processing content designator sends the signal instructing the processing content to the processing designation signal generator and designates the color conversion or not in the color designation signal generator. In the case of the color conversion, the processing content designator outputs the signal for instructing the color to the color designation signal generator.

The processing designation signal generator outputs the instructed contents as the processing designation signal A. The color designation signal generator designates: the recording color, when the color conversion is not designated, and the same color as the recording color after the color conversion, when the color conversion is designated, and otherwise outputs the color designation signal BBR for designating the OFF.

Figure 72:
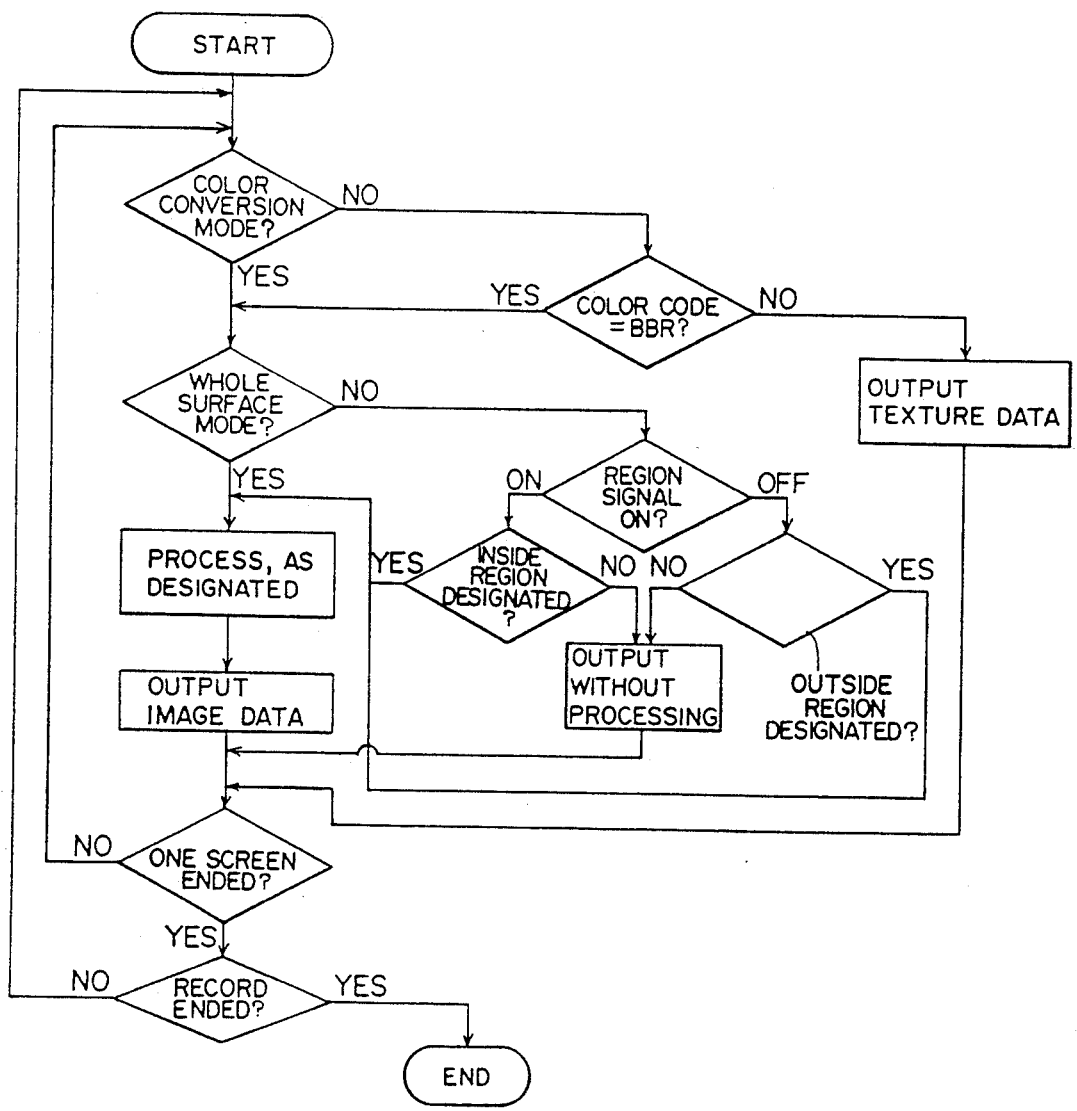
FIG. 72 shows a system flow chart.

The color data selector 630 operates according to the flow chart shown in FIG. 72.

(1) It is judged whether or not the color conversion mode is designated. If YES, the routine proceeds to the step (5).
(2) It is judged by the color designation signal BBR whether or not the color code is coincide.
(3) If NO, the image data corresponding to the texture is outputted. The routine proceeds to the step (12).
(4) If YES, the following steps are accomplished.
(5) It is judged whether or not the whole image designation mode.
(6) If YES, the routine proceeds to the step (10).
(7) If NO, it is judged whether or not the region signal is ON, i.e., within the designation region.
(8) It is judged which inside or outside of the region is designated.
(9) When the region designation signal is ON to designate the inside of the region and when the region designation signal is OFF to designate the outside of the region, the routine proceeds to the step (10) and otherwise to the step (11).
(10) According to the processing designation signal A, the density data of 6 bits are processed. The routine proceeds to the step (12).
(11) The density data inputted are outputted as they are.
(12) All the operations described above are accomplished one line for the whole picture.
(13) The foregoing operations are accomplished by the number of the recording colors.

According to the present embodiment, it is possible to select the modes for processing the whole surface of the image and only the designated portion. When, moreover, two or more processings are to be accomplished, it is possible to handle one as the whole surface processing mode and the other as the partial processing mode.

INDUSTRIAL APPLICABILITY

As has been described hereinbefore, according to the present invention, in the document having the designations mixed with a closed loop of arbitrary shape and by the smearing-out, it is possible to accurately detect the regions designated by the two methods.

When, moreover, the regions designated in two colors are in inclusive relations to each other, their common portions can be detected as the region of one portion.

Even if, furthermore, the regions designated in different colors are overlapped, the region extraction can be accomplished in a predetermined priority.

Furthermore, the instructed image processing (e.g., the magnification/reduction) can be accomplished at the unit of the region which is designated with the closed loop of arbitrary shape or by the smearing-out.

Furthermore, the inside or outside of the closed region designated in a certain color can be recorded practically conveniently in the designated color.

Since, furthermore, the color code of the color signal corresponding to the image inside or outside of the designated region is one after the color conversion, it can be stored directly in a memory or the like and then used to reproduce the original image in the designated color. These color conversion data can also be used as the color signal of the CRT or the like.

Furthermore, the image processings can be accomplished simultaneously as to the color and density of either the region-designated portion or another region. As a result, the image processing function is drastically improved.

We claim:

1. A method of line scanning a document to detect a region which is designated by a closed loop, wherein a plurality of subregions of said region designated by the closed loop are detectable at a plurality of scanning lines and wherein an inside area of said loop is solidly colored with a predetermined color so that said region is designated as a solidly painted region, said method comprising:

(a) scanning a document line by line to detect closed loop markings on the document and to generate present scanning line loop-detection signals P;

(b) extracting, from a preceding scanning line region-indicating signal Q and from said present scanning line loop-detection signals P, continuous signals pn which are common to both said signals Q and P, said preceding scanning line region-indicating signal Q having been memorized in a first memory means;

(c) processing said continuous signals pn to obtain a present scanning line temporary region-indicating signal Q' which corresponds to an interval from a left end of said continuous signals pn to a right end of said continuous signals pn;

(d) processing said present scanning line loop-detection signals P to obtain a present scanning line region-division signal R' which represents a present scanning line region which is outside of said region designated by the closed loop and which is located between subregions of said region designated by the closed loop;

(e) processing said present scanning line loop-detection signals P, said present scanning line temporary region-indicating signal Q' and said present scanning line region-division signal R' to obtain a present scanning line region indicating signal Q''', said present scanning line region-indicating signal Q''' representing all subregions of said region designated by the closed loop at the present scanning line;

(f) memorizing said present scanning line region-indicating signal Q''' in said first memory means as a new preceding scanning line region-indicating signal Q; and (g) repeating said steps of a) to f) for each subsequent scanning line;

(h) processing said present scanning line region-indicating signal Q''' and said present scanning line loop-detection signals P to obtain a present scanning line inside region-indicating signal T which corresponds to an interval between a left end one of said present scanning line loop-detection signals P which is located at a left end of said present scanning line region-indicating signal Q''' and a right end one of said present scanning line loop-detection signals P which is located at a right end of said present scanning line region-indicating signal Q''';

(i) detecting an image of an original to obtain an image signal O;

(j) processing said present scanning line loop-detection signals P, said image signal O and said present scanning line region-indicating signal Q''' to obtain a present scanning line colored region signal P' which indicates said colored region;

(k) processing said present scanning line loop-detection signals P, said present scanning line colored region signal P' and said present scanning line inside region-indicating signal T to obtain a present scanning line division-inhibiting signal S'', said present scanning line division-inhibiting signal S'' inhibiting from dividing at least one of said subregions into separated subregions of said region designated by the closed loop, and said present scanning line division-inhibiting signal S'' being memorized in a second memory means; and (l) processing said present scanning line loop-detection signals P, said present scanning line inside region-indicating signal T and said present scanning line division inhibiting signal S'' to obtain a present scanning line region divisible signal R'', said present scanning line region-divisible R'' indicating at least one of said subregions which can be divided at a following scanning line, and said present scanning line region-divisible signal R'' being memorized in a third memory means;

wherein said step g) repeats said steps of a) to f) and said steps h) to l) for each subsequent scanning line.

2. The method of claim 1, wherein said step j) is conducted by an operation of $P' = P \vee (O \wedge Q''')$.

3. The method of claim 1, wherein said step k) is conducted by an operation of $S'' = S' (P\ T)$, said S' being obtained by extracting a signal continuous to a preceding scanning line division-inhibiting signal S from said present scanning line colored region signal P', said preceding scanning line division inhibiting signal S having been memorized in said second memory means.

4. A method of claim 3, wherein said step l) is conducted by an operation of $R'' = P \wedge T \wedge S$.

5. An apparatus for line scanning a document to detect a region designated by a closed loop, wherein a plurality of subregions of said region are detectable at a plurality of scanning lines and wherein the inside of said loop is solidly colored with a predetermined color so that said region is designated as a solidly colored region, said apparatus comprising:

means for scanning a document line by line to detect closed loop markings on the document and for generating present scanning line loop-detection signals P;

means for extracting, from a preceding scanning line region-indicating signal Q and from said present scanning line loop-detection signals P, continuous signals pn which are common to both said signals Q and P;

means for producing said continuous signals pn to generate a present scanning line temporary region-indicating signal Q' which corresponds to an interval from a left end to a right end of said continuous signals pn, and for processing said present scanning line loop-detection signals P to generate a present scanning line region-division signal R' which corresponds to a present scanning line region which is outside of said region designated by the closed loop and which is located between subregions of said region designated by the closed loop;

means for processing said present scanning line loop-detection signals P, said present scanning line temporary region-indicating signal Q' and said present scanning line region-division signal R' to generate a present scanning line region-indicating signal Q''', said region-indicating signal Q''' representing all of said subregions of said region designated by the closed loop at the present scanning line; and first memory means for memorizing said region-indicating signal Q''' as a new preceding scanning line region-indicating signal Q;

means for processing said present scanning line region-indicating signal Q''' and said present scanning line loop-detection signals P to generate a present scanning line inside region-indicating signal T which indicates an interval between a left end one of said present scanning line loop-detection signals P which is located at a left end of said present scanning line region-designating signal Q''' and a right end one of said present scanning line loop-detection signals P which is located at a right end of said present scanning line region-designating signal Q''';

means for detecting an image of an original to generate an image signal O;

means for processing said present scanning line loop-detection signals P, said image signal O and said present scanning line region indicating signal Q''' to obtain a present scanning line colored region signal P', said present scanning line colored region signal P' indicating said solidly painted region;

means for processing said present scanning line loop-detection signals P, said present scanning line colored region signal P' and said present scanning line inside region signal T to obtain a present scanning line division-inhibiting signal S'', said present scanning line division-inhibiting signal S'' inhibiting from dividing at least one of said subregions into separated subregions of said region designated by the closed loop;

second memory means for memorizing said division inhibiting signal S'';

means for processing said present scanning line loop-detection signals P, said present scanning line inside region-indicating signal T and said present scanning line division-inhibiting signal S'' to generate a present scanning line region-divisible signal R'' which indicates at least one of said subregions which can be divided at a following scanning line; and third memory means for memorizing said present scanning line region-divisible signal R''.

6. The apparatus of claim 5, wherein said region divisible signal generating means comprises means for conducting an operation of R'' = P ∧ T ∧ $\bar{S}$.

7. The apparatus of claim 5, wherein said colored region signal generating means comprises means for conducting an operation of p' = P ∨ (O ∧ Q''').

8. The apparatus of claim 5, wherein said division-inhibiting signal generating means comprises means for conducting an operation of S'' = S' ∨ (P ∧ $\bar{T}$), wherein S' is a signal obtained by extracting a signal continuous to a preceding scanning line division-inhibiting signal S from said present scanning line colored region signal P', said present scanning line division-inhibiting signal S having been memorized in said second memory means.

9. The apparatus of claim 5, wherein said region division signal generating means comprises means for processing said present scanning line loop-detection signals P to detect an interval between a left end one and a right end one of said present scanning line loop-detection signals P respectively continuous to a preceding scanning line region divisible signal R to generate said present scanning line region division signal R', said preceding scanning line region divisible signal R having been memorized in said third memory means.

* * * * *